US010433329B2

United States Patent
Guan et al.

(10) Patent No.: US 10,433,329 B2
(45) Date of Patent: Oct. 1, 2019

(54) METHODS FOR SENDING AND RECEIVING FEEDBACK INFORMATION, USER EQUIPMENT, AND ACCESS NETWORK DEVICE

(71) Applicant: HUAWEI TECHNOLOGIES CO., LTD., Shenzhen, Guangdong (CN)

(72) Inventors: Lei Guan, Beijing (CN); Yongxia Lyu, Beijing (CN); Zhiyu Yan, Shenzhen (CN); Jiehua Xiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/866,741

(22) Filed: Jan. 10, 2018

(65) Prior Publication Data

US 2018/0132265 A1 May 10, 2018

Related U.S. Application Data

(63) Continuation of application No. PCT/CN2015/086679, filed on Aug. 11, 2015.

(30) Foreign Application Priority Data

Aug. 10, 2015 (WO) ................ PCT/CN2015/086542

(51) Int. Cl.
*H04W 72/12* (2009.01)
*H04W 76/00* (2018.01)
(Continued)

(52) U.S. Cl.
CPC ....... *H04W 72/1273* (2013.01); *H04L 1/0071* (2013.01); *H04L 1/1864* (2013.01);
(Continued)

(58) Field of Classification Search
CPC ......... H04W 72/1273; H04W 72/0406; H04W 72/085; H04W 76/00; H04W 24/10;
(Continued)

(56) References Cited

U.S. PATENT DOCUMENTS 9,184,896 B2 * 11/2015 Oizumi ................ H04L 1/1854
9,215,135 B2 * 12/2015 Oizumi ................ H04L 1/0061
(Continued)

FOREIGN PATENT DOCUMENTS

CN 101789851 A 7/2010
CN 101958775 A 1/2011
(Continued)

OTHER PUBLICATIONS

3GPP TS 36.213 V12.6.0 (Jun. 2015),3rd Generation Partnership Project;Technical Specification Group Radio Access Network;Evolved Universal Terrestrial Radio Access (E-UTRA);Physical layer procedures(Release 12),total 241 pages.
(Continued)

*Primary Examiner* — Mounir Moutaouakil
(74) *Attorney, Agent, or Firm* — Fish & Richardson P.C.

(57) ABSTRACT

Embodiments of the present disclosure provide methods for sending and receiving feedback information, user equipment, and an access network device, relate to the field of communications technologies. In one embodiment, UE receives, in a downlink subframe in a preconfigured downlink subframe subset, downlink data that is sent by an access network device by using a downlink shared channel and a DAI index indicator and a DAI total quantity indicator that are sent by using a downlink control channel. The UE determines an uplink subframe for sending feedback information corresponding to the downlink shared channel. The UE determines a codebook of the feedback information according to the downlink assignment index DAI index
(Continued)

indicator and the DAI total quantity indicator. The UE performs channel coding on the feedback information according to the codebook. The UE sends the channel coded feedback information.

8 Claims, 24 Drawing Sheets

(51) Int. Cl.
　　*H04W 72/04*　　(2009.01)
　　*H04W 72/08*　　(2009.01)
　　*H04L 1/00*　　(2006.01)
　　*H04L 1/18*　　(2006.01)
　　*H04W 24/10*　　(2009.01)
(52) U.S. Cl.
　　CPC ..... *H04W 72/0406* (2013.01); *H04W 72/085* (2013.01); *H04W 76/00* (2013.01); *H04L 1/0073* (2013.01); *H04L 1/1812* (2013.01); *H04W 24/10* (2013.01)
(58) Field of Classification Search
　　CPC ... H04L 1/1864; H04L 1/0071; H04L 1/0073; H04L 1/1812
　　See application file for complete search history.

(56) References Cited

U.S. PATENT DOCUMENTS

| | | | | |
|---|---|---|---|---|
| 9,686,064 | B2* | 6/2017 | He | H04L 1/1861 |
| 9,722,737 | B2* | 8/2017 | Fu | H04L 1/1607 |
| 2012/0099491 | A1 | 4/2012 | Lee et al. | |
| 2012/0106407 | A1 | 5/2012 | Papasakellariou et al. | |
| 2014/0105076 | A1* | 4/2014 | Yang | H04W 72/0413 370/280 |
| 2014/0286208 | A1 | 9/2014 | Papasakellariou et al. | |
| 2015/0063179 | A1 | 3/2015 | Yang et al. | |
| 2018/0102892 | A1* | 4/2018 | Lunttila | H04L 1/1607 |
| 2018/0123769 | A1* | 5/2018 | Pelletier | H04L 5/001 |
| 2018/0167934 | A1* | 6/2018 | Seo | H04L 1/0026 |
| 2018/0176939 | A1* | 6/2018 | Guan | H04B 7/0626 |
| 2019/0141727 | A1* | 5/2019 | Si | H04W 72/1268 |

FOREIGN PATENT DOCUMENTS

| | | |
|---|---|---|
| EP | 2654231 A1 | 10/2013 |
| EP | 2709299 A2 | 3/2014 |
| JP | 2013542692 A | 11/2013 |
| JP | 2014519252 A | 8/2014 |
| WO | 2012165795 A2 | 12/2012 |

OTHER PUBLICATIONS

3GPP TS 36.212 V12.5.0 (Jun. 2015),3rd Generation Partnership Project;Technical Specification Group Radio Access Network;Evolved Universal Terrestrial Radio Access (E-UTRA);Multiplexing and channel coding(Release 12),total 94 pages.

International Search Report issued in International Application No. PCT/CN2015/086679 dated May 11, 2016, 6 pages.

Extended European Search Report issued in European Application No. 15900730.1 dated May 30, 2018, 10 pages.

Japanese Office Action issued in Japanese Application No. 2018-506430 dated Feb. 12, 2019, 13 pages.

* cited by examiner

| t/subframe | | | |
|---|---|---|---|
| 1 | 4 | 3 | 1 |
| 2 | X | 4 | 2 |
| 3 | 1 | 1 | 3 |
| 4 | X | 2 | 4 |
| 1 | 2 | 3 | 1 |
| 2 | X | 4 | X |
| 3 | X | X | X |
| X | X | X | X |
| X | X | X | X |
| X | X | X | X |

FIG. 5

| t/subframe | | | |
|---|---|---|---|
| 1/3 | 4/3 | 3/2 | 1/1 |
| 2/3 | X | 4/2 | 2/1 |
| 3/3 | 1/3 | 1/2 | 3/1 |
| 4/3 | X | 2/2 | 4/1 |
| 1/3 | 2/3 | 3/2 | 1/1 |
| 2/3 | X | 4/2 | X |
| 3/3 | X | X | X |
| X | X | X | X |
| X | X | X | X |
| X | X | X | X |

FIG. 6

| t/subframe | | | |
|---|---|---|---|
| 1/3 | 4/2 | 3/4 | 1/1 |
| 2/3 | X | 4/4 | 2/1 |
| 3/3 | 1/2 | 1/4 | 3/1 |
| 4/3 | X | 2/4 | 4/1 |
| 1/3 | 2/2 | 3/4 | 1/1 |
| 2/3 | X | 4/4 | X |
| 3/3 | X | X | X |
| X | X | X | X |
| X | X | X | X |
| X | X | X | X | f/carrier (vertical axis)

FIG. 7

| t/subframe | | | |
|---|---|---|---|
| 1/2 | 4/1 | 3/3 | 1/1 |
| 2/2 | X | 4/3 | 2/1 |
| 3/2 | 1/1 | 1/3 | 3/1 |
| 4/2 | X | 2/3 | 4/1 |
| 1/2 | 2/1 | 3/3 | 1/1 |
| 2/2 | X | 4/3 | X |
| 3/2 | X | X | X |
| X | X | X | X |
| X | X | X | X |
| X | X | X | X | f/carrier (vertical axis)

FIG. 8

| t/subframe | | | |
|---|---|---|---|
| 1/2 | 4/4 | 3/1 | 1/1 |
| 2/2 | X | 4/1 | 2/1 |
| 3/2 | 1/4 | 1/1 | 3/1 |
| 4/2 | X | 2/1 | 4/1 |
| 1/2 | 2/4 | 3/1 | 1/1 |
| 2/2 | X | 4/1 | X |
| 3/2 | X | X | X |
| X | X | X | X |
| X | X | X | X |
| X | X | X | X |

(left axis: f/carrier)

FIG. 9

| t/subframe | | | |
|---|---|---|---|
| 1/1 | 4/1 | X | 1/1 |
| 2/1 | X | X | 2/1 |
| 3/1 | 1/1 | X | 3/1 |
| 4/1 | X | X | 4/1 |
| 1/1 | 2/1 | 3/1 | 1/1 |
| 2/1 | X | 4/1 | 2/2 |
| 3/1 | X | X | 3/3 |
| X | X | X | 4/4 |
| X | X | X | X |
| X | X | X | X | f/carrier

FIG. 12

| t/subframe | | | |
|---|---|---|---|
| 1/1 | 4/2 | X | 1/1 |
| 2/1 | X | X | 2/1 |
| 3/1 | 1/3 | X | 3/1 |
| 4/1 | X | X | 4/1 |
| 1/2 | 2/4 | 3/3 | 1/1 |
| 2/3 | X | 4/4 | 2/2 |
| 3/4 | X | X | 3/3 |
| X | X | X | 4/4 |
| X | X | X | X |
| X | X | X | X | f/carrier

FIG. 13

| t/subframe | | | |
|---|---|---|---|
| 1/1 | 4/4 | X | 1/1 |
| 2/2 | X | X | 2/2 |
| 3/3 | 1/1 | X | 3/3 |
| 4/4 | X | X | 4/4 |
| 1/1 | 2/2 | 3/3 | 1/1 |
| 2/2 | X | 4/4 | 2/2 |
| 3/3 | X | X | 3/3 |
| X | X | X | 4/4 |
| X | X | X | X |
| X | X | X | X | f/carrier

FIG. 14

| t/subframe | | | |
|---|---|---|---|
| 1/2 | 4/2 | X | 1/1 |
| 2/3 | X | X | 2/2 |
| 3/4 | 1/3 | X | 3/3 |
| 4/1 | X | X | 4/4 |
| 1/2 | 2/4 | 3/3 | 1/1 |
| 2/3 | X | 4/4 | 2/2 |
| 3/4 | X | X | 3/3 |
| X | X | X | 4/4 |
| X | X | X | X |
| X | X | X | X | f/carrier

FIG. 15

METHODS FOR SENDING AND RECEIVING FEEDBACK INFORMATION, USER EQUIPMENT, AND ACCESS NETWORK DEVICE

CROSS-REFERENCE TO RELATED APPLICATION

This application is a continuation of International Application No. PCT/CN2015/086679, filed on Aug. 11, 2015, which claims priority to International Application No. PCT/CN2015/086542, filed on Aug. 10, 2015. The disclosures of the aforementioned applications are hereby incorporated by reference in their entireties.

TECHNICAL FIELD

The present invention relates to the field of communications technologies, and in particular, to methods for sending and receiving feedback information, user equipment, and an access network device.

BACKGROUND

With development of mobile communications technologies, LTE (Long Term Evolution, Long Term Evolution) keeps improving data transmission capabilities and data transmission speeds of wireless networks by means of new technologies and modulation methods. To improve a data transmission rate of UE, LTE currently supports a CA (Carrier Aggregation, carrier aggregation) technology. In the CA technology, specifically, an access network device configures multiple carriers for UE that supports carrier aggregation, to perform uplink communication and downlink communication, to enable the UE to support transmission at a higher data rate.

When CA is being performed, an access network device sends multiple synchronous carriers to UE, and the UE detects a PDCCH (Physical Downlink Control Channel, physical downlink control channel) of each carrier, where the PDCCH carries scheduling information of a PDSCH (Physical Downlink Shared Channel, physical downlink shared channel). After the UE receives the PDSCH, if decoding is correct, the UE feeds back an ACK (ACKnowledge, acknowledgment) to the access network device on a PUCCH (Physical Uplink Control Channel, physical uplink control channel), and if decoding is incorrect, the UE feeds back a NACK (NACKnowledge, non-acknowledgment) to the access network device on the PUCCH. When the ACK/NACK is fed back to the access network device, an ACK/NACK codebook needs to be generated. The ACK/NACK codebook is a bit stream of the ACK/NACK before coding being arranged according to a particular order. For an ACK/NACK bit corresponding to a downlink subframe of the PDSCH actually received by the UE, the ACK or NACK may be set according to a feedback of an ACK or a NACK for correct or incorrect reception. For an ACK/NACK bit corresponding to a downlink subframe that is not scheduled or not received, a NACK needs to be padded.

However, with continuous development of LTE technologies, a relatively large quantity of carriers may need to be configured for UE, but there are not necessarily many carriers that are actually scheduled by the UE. An example in which there are two mainstream TDD uplink/downlink configurations in a current network is used. An uplink subframe 2 of one carrier supports a feedback of 4 ACK/NACK bits. Therefore, an uplink subframe 2 for which 32 carriers are configured supports a feedback of 128 ACK/NACK bits. However, the UE may actually schedule only 10 carriers, that is, a downlink subframe actually scheduled by the UE corresponds to 40 ACK/NACK bits. During generation of an ACK/NACK codebook, NACK padding needs to be performed for 128−40=88 ACK/NACK bits that correspond to a downlink subframe that is not scheduled; further the generated ACK/NACK codebook needs to be sent to an access network device. It can be learnt that in a manner of using a currently determined ACK/NACK codebook, a large amount of NACK padding occurs, occupying a relatively large quantity of PUCCH resources, and resulting in low uplink resource utilization.

SUMMARY

Embodiments of the present invention provide methods for sending and receiving feedback information, user equipment, and an access network device, so as to resolve a problem of low utilization of uplink resources that are used to send feedback information.

According to a first aspect, an embodiment of the present invention provides a method for sending feedback information, including:

receiving, by user equipment UE in a downlink subframe in a preconfigured downlink subframe set, downlink data that is sent by an access network device by using a downlink shared channel, and a downlink assignment index DAI index indicator and a DAI total quantity indicator that are sent by the access network device by using a downlink control channel;

determining, by the UE, an uplink subframe used to send feedback information corresponding to the downlink shared channel, where the preconfigured downlink subframe set is a set that is associated with the uplink subframe and that consists of all downlink subframes of all carriers preconfigured for the UE;

determining, by the UE, a codebook of the feedback information according to the DAI index indicator and the DAI total quantity indicator, where the codebook corresponds to all or some downlink subframes in a real-time scheduling downlink subframe subset, the real-time scheduling downlink subframe subset is a set that consists of downlink subframes actually scheduled by the access network device, and the real-time scheduling downlink subframe subset belongs to the preconfigured downlink subframe set; or a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK; however, it should be noted that, regardless of whether a padding NACK is included, a quantity of bits in the HARQ-ACK codebook needs to be less than a quantity of bits in a HARQ-ACK corresponding to the preconfigured downlink subframe set; optionally, the padding bit may be located after locations of bits in the HARQ-ACK corresponding to the downlink subframe in the real-time scheduling downlink subframe subset;

performing, by the UE, channel coding on the feedback information according to the codebook; and sending, by the UE in the uplink subframe, the feedback information on which channel coding has been performed to the access network device.

With reference to the first aspect, in a first possible embodiment, the downlink shared channel includes a first downlink shared channel, or includes the first downlink shared channel and a second downlink shared channel, where the first downlink shared channel is a dynamic scheduling downlink shared channel scheduled by the downlink control channel, and the second downlink shared channel is a semi-persistent scheduling SPS downlink shared channel that is not scheduled by the downlink control channel.

With reference to the first possible embodiment of the first aspect, in a second possible embodiment, the method further includes:

detecting, by the UE, a special downlink control channel, where the special downlink control channel is used to instruct the UE to terminate reception of downlink data on the second downlink shared channel.

With reference to the second possible embodiment of the first aspect, in a third possible embodiment, the sending, by the UE in the uplink subframe, the feedback information on which channel coding has been performed to the access network device includes:

determining, by the UE, a physical resource according to resource indicator information sent by the access network device;

mapping, by the UE, the encoded feedback information to the physical resource; and sending, by the UE, the mapped feedback information to the access network device by using the physical resource in the uplink subframe.

With reference to any one of the first aspect or the foregoing possible embodiments of the first aspect, in a fourth possible embodiment, a value of a DAI index indicator corresponding to each downlink subframe in the real-time scheduling downlink subframe subset is: a count value obtained by performing an accumulative count on the subframes in the real-time scheduling downlink subframe subset in a preset order.

With reference to the fourth possible embodiment of the first aspect, in a fifth possible embodiment, the preset order is an order obtained by arranging downlink subframes having a same sequence number in the real-time scheduling downlink subframe subset in a first preset order to obtain a first order combination corresponding to each subframe sequence number and then arranging the first order combination corresponding to each subframe sequence number in a second preset order, where the first preset order is an ascending order of carrier sequence numbers or a descending order of carrier sequence numbers, and the second preset order is a front-to-back order of subframe moments or a back-to-front order of subframe moments.

With reference to the fifth possible embodiment of the first aspect, in a sixth possible embodiment, in the real-time scheduling downlink subframe subset, a value of a DAI total quantity indicator of each downlink subframe in the first order combination corresponding to a current subframe sequence number is: a total quantity of first information scheduled in the downlink subframes in the first order combination corresponding to the current subframe sequence number.

With reference to the fifth possible embodiment of the first aspect, in a seventh possible embodiment, in the real-time scheduling downlink subframe subset, a value of a DAI total quantity indicator of each downlink subframe in the first order combination corresponding to a current subframe sequence number is: a sum of a current quantity and a historical quantity, where the current quantity is a total quantity of first information scheduled in the downlink subframes in the first order combination corresponding to the current subframe sequence number, and the historical quantity is a total quantity of first information scheduled in each downlink subframe in the first order combinations separately corresponding to subframe sequence numbers of all downlink subframes before a subframe moment of the current subframe sequence number in the real-time scheduling downlink subframe subset.

With reference to the fifth possible embodiment of the first aspect, in an eighth possible embodiment, in the real-time scheduling downlink subframe subset, a value of a DAI total quantity indicator of each downlink subframe in the first order combination corresponding to a current subframe sequence number is: a sum of a current quantity and a future quantity, where the current quantity is a total quantity of first information scheduled in the downlink subframes in the first order combination corresponding to the current subframe sequence number, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

With reference to the fifth possible embodiment of the first aspect, in a ninth possible embodiment, in the real-time scheduling downlink subframe subset, a value of a DAI total quantity indicator of each downlink subframe in the first order combination corresponding to a current subframe sequence number is: a sum of a current quantity, a historical quantity, and a future quantity, where the current quantity is a total quantity of first information scheduled in the downlink subframes in the first order combination corresponding to the current subframe sequence number, the historical quantity is a total quantity of first information scheduled in each downlink subframe in the first order combinations separately corresponding to sequence numbers of all subframes before a subframe moment of the current subframe sequence number in the real-time scheduling downlink subframe subset, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

In another possible embodiment, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to the preconfigured downlink subframe set. Optionally, the padding bit may be located after locations of bits in the HARQ-ACK corresponding to the downlink subframe in the real-time scheduling downlink subframe subset.

With reference to any one of the sixth possible embodiment to the ninth possible embodiment of the first aspect, in a tenth possible embodiment, the first information is any one of the following information:

the downlink shared channel;

a transport block on the downlink shared channel; and a transport block corresponding to a transmission mode configured for a downlink carrier to which the downlink shared channel belongs.

With reference to any one of the sixth possible embodiment to the tenth possible embodiment of the first aspect, in an eleventh possible embodiment, a value of the DAI total quantity indicator further includes a quantity of the special downlink control channels detected by the UE.

With reference to the sixth possible embodiment or the eighth possible embodiment or the tenth possible embodiment or the eleventh possible embodiment of the first aspect, in a twelfth possible embodiment, the determining, by the UE, a codebook of the feedback information according to the DAI index indicator and the DAI total quantity indicator includes:

determining, by the UE, the codebook of the feedback information according to the DAI index indicator and a DAI total quantity indicator, received by the UE in a downlink subframe in the preconfigured downlink subframe set, of each downlink subframe.

With reference to the seventh possible embodiment or the ninth possible embodiment or the tenth possible embodiment or the eleventh possible embodiment of the first aspect, in a thirteenth possible embodiment, the determining, by the UE, a codebook of the feedback information according to the DAI index indicator and the DAI total quantity indicator includes:

determining, by the UE, the codebook of the feedback information according to the DAI index indicator and a DAI total quantity indicator, received by the UE in a downlink subframe in the preconfigured downlink subframe set, of the last downlink subframe.

With reference to the fifth possible embodiment of the first aspect, in a fourteenth possible embodiment, values of DAI total quantity indicators corresponding to the last, the second-to-last, . . . , and the $X^{th}$-to-last downlink subframes that are arranged in the preset order in the real-time scheduling downlink subframe subset are respectively preset values $A_X, A_{X-1}, \ldots ,$ and $A_1$, and values of DAI total quantity indicators corresponding to the other downlink subframes in the real-time scheduling downlink subframe subset are all set to a preset value $A_0$, where X is a natural number greater than 1.

With reference to the fifth possible embodiment of the first aspect, in a fifteenth possible embodiment, values of DAI total quantity indicators corresponding to the last, the second-to-last, . . . , and the $X^{th}$-to-last downlink subframes that are arranged in the first preset order among the downlink subframes having the same sequence number in the real-time scheduling downlink subframe subset are respectively: preset values $A_X, A_{X-1}, \ldots ,$ and $A_1$, and values of DAI total quantity indicators corresponding to the other downlink subframes in the downlink subframes having the same sequence number are all set to a preset value $A_0$, where X is a natural number greater than 1.

With reference to the fifth possible embodiment of the first aspect, in a sixteenth possible embodiment, a value of a DAI total quantity indicator corresponding to each downlink subframe in the real-time scheduling downlink subframe subset is: a count value obtained by performing a count on subframes in the real-time scheduling downlink subframe subset in a reverse order of the preset order in a preset count manner.

With reference to the fifth possible embodiment of the first aspect, in a seventeenth possible embodiment, a value of a DAI total quantity indicator of each downlink subframe of downlink subframes having a same sequence number in the real-time scheduling downlink subframe subset that are arranged in a reverse order of the first preset order is: a count value obtained by performing, starting from a preset value, a count on downlink subframes having a same sequence number in the real-time scheduling downlink subframe subset in a reverse order of the first preset order in a preset count manner.

With reference to the sixteenth possible embodiment or the seventeenth possible embodiment of the first aspect, in an eighteenth possible embodiment, the preset count manner is an accumulative count or a descending count.

With reference to any one of the third possible embodiment to the eighteenth possible embodiment of the first aspect, in a nineteenth possible embodiment, the sending, by the UE, the mapped feedback information to the access network device by using the physical resource in the uplink subframe includes:

obtaining, by the UE, a correspondence between at least two downlink subframes received in the preconfigured downlink subframe set and at least two candidate parameters of the physical resource, where the candidate parameter is a sequence of a demodulation reference signal DMRS part and/or a sequence of an information part of the physical resource;

determining, by the UE, a first parameter corresponding to the last downlink subframe received in the preconfigured downlink subframe set, where the first parameter is one of the at least two candidate parameters; and sending, by the UE on the physical resource, the mapped feedback information according to the first parameter.

With reference to any one of the third possible embodiment to the eighteenth possible embodiment of the first aspect, in a twentieth possible embodiment, the sending, by the UE, the mapped feedback information to the access network device by using the physical resource in the uplink subframe includes:

sending, by the UE, display signaling and the mapped feedback information to the access network device by using the physical resource in the uplink subframe, where the display signaling is used to indicate, to the access network device, the last downlink subframe that is detected by the UE in the preconfigured downlink subframe set.

With reference to any one of the first aspect or the foregoing possible embodiments of the first aspect, in a twenty-first possible embodiment, before the performing, by the UE, channel coding on the feedback information according to the codebook, the method further includes:

adding, by the UE, a cyclic redundancy check CRC bit to the codebook of the feedback information.

According to a second aspect, an embodiment of the present invention provides a method for receiving feedback information, including:

sending, by an access network device, downlink data to user equipment UE by using a downlink shared channel, and sending a downlink assignment index DAI index indicator and a DAI total quantity indicator to the UE by using a downlink control channel scheduled in a downlink subframe in a real-time scheduling downlink subframe subset, so that the UE determines a codebook of feedback information according to the DAI index indicator and the DAI total quantity indicator, where the real-time scheduling downlink subframe subset is a set that consists of downlink subframes actually scheduled by the access network device, the codebook of the feedback information corresponds to all or some downlink subframes in the real-time scheduling downlink subframe subset, and the codebook of the feedback information is a basis for the UE to perform channel coding on the feedback information; or a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK; however, it should be noted that, regardless of whether a padding NACK is included, a bit quantity of the HARQ-ACK codebook needs to be less than a quantity of bits in a HARQ-ACK corresponding to a preconfigured downlink subframe set; optionally, the padding bit may be located after locations of bits in the HARQ-ACK corresponding to the downlink subframe in the real-time scheduling downlink subframe subset; and receiving, by the access network device in an uplink subframe, the feedback information that is sent by the UE and on which channel coding has been performed.

With reference to the second aspect, in a first possible embodiment, the downlink shared channel includes a first downlink shared channel, or includes the first downlink shared channel and a second downlink shared channel, where the first downlink shared channel is a dynamic scheduling downlink shared channel scheduled by the downlink control channel, and the second downlink shared channel is a semi-persistent scheduling SPS downlink shared channel that is not scheduled by the downlink control channel.

With reference to the first possible embodiment of the second aspect, in a second possible embodiment, the method further includes:

scheduling, by the access network device, a special downlink control channel, where the special downlink control channel is used to enable the access network device to terminate sending of the downlink data by using the second downlink shared channel.

With reference to the second possible embodiment of the second aspect, in a third possible embodiment, the receiving, by the access network device in an uplink subframe, the feedback information that is sent by the UE and on which channel coding has been performed includes:

sending, by the access network device, resource indicator information to the UE, where the resource indicator information is used to indicate a physical resource used to carry the feedback information; and receiving, by the access network device in the physical resource in the uplink subframe, feedback information mapped to the physical resource.

With reference to any one of the second aspect or the foregoing possible embodiments of the second aspect, in a fourth possible embodiment, a value of a DAI index indicator corresponding to each downlink subframe in the real-time scheduling downlink subframe subset is: a count value obtained by performing an accumulative count on the subframes in the real-time scheduling downlink subframe subset in a preset order.

With reference to the fourth possible embodiment of the second aspect, in a fifth possible embodiment, the preset order is an order obtained by arranging downlink subframes having a same sequence number in the real-time scheduling downlink subframe subset in a first preset order to obtain a first order combination corresponding to each subframe sequence number and then arranging the first order combination corresponding to each subframe sequence number in a second preset order, where the first preset order is an ascending order of carrier sequence numbers or a descending order of carrier sequence numbers, and the second preset order is a front-to-back order of subframe moments or a back-to-front order of subframe moments.

With reference to the fifth possible embodiment of the second aspect, in a sixth possible embodiment, in the real-time scheduling downlink subframe subset, a value of a DAI total quantity indicator of each downlink subframe in the first order combination corresponding to a current subframe sequence number is: a total quantity of first information scheduled in the downlink subframes in the first order combination corresponding to the current subframe sequence number.

With reference to the fifth possible embodiment of the second aspect, in a seventh possible embodiment, in the real-time scheduling downlink subframe subset, a value of a DAI total quantity indicator of each downlink subframe in the first order combination corresponding to a current subframe sequence number is: a sum of a current quantity and a historical quantity, where the current quantity is a total quantity of first information scheduled in the downlink subframes in the first order combination corresponding to the current subframe sequence number, and the historical quantity is a total quantity of first information scheduled in each downlink subframe in the first order combinations separately corresponding to subframe sequence numbers of all downlink subframes before a subframe moment of the current subframe sequence number in the real-time scheduling downlink subframe subset.

With reference to the fifth possible embodiment of the second aspect, in an eighth possible embodiment, in the real-time scheduling downlink subframe subset, a value of a DAI total quantity indicator of each downlink subframe in the first order combination corresponding to a current subframe sequence number is: a sum of a current quantity and a future quantity, where the current quantity is a total quantity of first information scheduled in the downlink subframes in the first order combination corresponding to the current subframe sequence number, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

With reference to the fifth possible embodiment of the second aspect, in a ninth possible embodiment, in the real-time scheduling downlink subframe subset, a value of a DAI total quantity indicator of each downlink subframe in the first order combination corresponding to a current subframe sequence number is: a sum of a current quantity, a historical quantity, and a future quantity, where the current quantity is a total quantity of first information scheduled in the downlink subframes in the first order combination corresponding to the current subframe sequence number, the historical quantity is a total quantity of first information scheduled in each downlink subframe in the first order combinations separately corresponding to sequence numbers of all subframes before a subframe moment of the current subframe sequence number in the real-time scheduling downlink subframe subset, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

In another possible embodiment, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to the preconfigured downlink subframe set. Optionally, the padding bit may be located after locations of bits in the HARQ-ACK corresponding to a downlink subframe in the real-time scheduling downlink subframe subset.

With reference to any one of the sixth possible embodiment to the ninth possible embodiment of the second aspect, in a tenth possible embodiment, the first information is any one of the following information:

the downlink shared channel;

a transport block on the downlink shared channel; and a transport block corresponding to a transmission mode configured for a downlink carrier to which the downlink shared channel belongs.

With reference to any one of the sixth possible embodiment to the tenth possible embodiment of the second aspect, in an eleventh possible embodiment, a value of the DAI total quantity indicator further includes a quantity of the special downlink control channels scheduled by the access network device.

With reference to the fifth possible embodiment of the second aspect, in a twelfth possible embodiment, values of DAI total quantity indicators corresponding to the last, the second-to-last, . . . , and the $X^{th}$-to-last downlink subframes that are arranged in the preset order in the real-time scheduling downlink subframe subset are respectively preset values $A_X, A_{X-1}, \ldots ,$ and $A_1$, and values of DAI total quantity indicators corresponding to the other downlink subframes in the real-time scheduling downlink subframe subset are all set to a preset value $A_0$, where X is a natural number greater than 1.

With reference to the fifth possible embodiment of the second aspect, in a thirteenth possible embodiment, values of DAI total quantity indicators corresponding to the last, the second-to-last, . . . , and the $X^{th}$-to-last downlink subframes that are arranged in the first preset order among the downlink subframes having the same sequence number in the real-time scheduling downlink subframe subset are respectively: preset values $A_X, A_{X-1}, \ldots ,$ and $A_1$, and values of DAI total quantity indicators corresponding to the other downlink subframes in the downlink subframes having the same sequence number are all set to a preset value $A_0$, where X is a natural number greater than 1.

With reference to the fifth possible embodiment of the second aspect, in a fourteenth possible embodiment, a value of a DAI total quantity indicator corresponding to each downlink subframe in the real-time scheduling downlink subframe subset is: a count value obtained by performing a count on subframes in the real-time scheduling downlink subframe subset in a reverse order of the preset order in a preset count manner.

With reference to the fifth possible embodiment of the second aspect, in a fifteenth possible embodiment, a value of a DAI total quantity indicator of each downlink subframe of downlink subframes having a same sequence number in the real-time scheduling downlink subframe subset that are arranged in a reverse order of the first preset order is: a count value obtained by performing, starting from a preset value, a count on downlink subframes having a same sequence number in the real-time scheduling downlink subframe subset in a reverse order of the first preset order in a preset count manner.

With reference to the fourteenth possible embodiment or the fifteenth possible embodiment of the second aspect, in a sixteenth possible embodiment, the preset count manner is an accumulative count or a descending count.

With reference to any one of the third possible embodiment to the sixteenth possible embodiment of the second aspect, in a seventeenth possible embodiment, after the receiving, by the access network device in the physical resource in the uplink subframe, feedback information mapped to the physical resource, the method further includes:

detecting, by the access network device, a first parameter in the uplink subframe, where the first parameter is a sequence of a demodulation reference signal DMRS part and/or a sequence of an information part of the physical resource;

determining, by the access network device according to the first parameter, the last downlink subframe that is received by the UE in the preconfigured downlink subframe set; and determining, by the access network device according to the last downlink subframe, that the feedback information corresponds to all or some downlink subframes in the real-time scheduling downlink subframe subset.

With reference to any one of the third possible embodiment to the sixteenth possible embodiment of the second aspect, in an eighteenth possible embodiment, the receiving, by the access network device in the physical resource in the uplink subframe, feedback information mapped to the physical resource includes:

receiving, by the access network device in the physical resource in the uplink subframe, display signaling and the feedback information mapped to the physical resource, where the display signaling is used to indicate, to the access network device, the last downlink subframe that is detected by the UE in the preconfigured downlink subframe set.

With reference to the eighteenth possible embodiment of the second aspect, in a nineteenth possible embodiment, after the receiving, by the access network device in the physical resource in the uplink subframe, display signaling and the feedback information mapped to the physical resource, the method further includes:

determining, by the access network device according to the display signaling, the last downlink subframe that is received by the UE in the real-time scheduling downlink subframe subset; and determining, by the access network device according to the last downlink subframe, that the codebook of the feedback information corresponds to all or some downlink subframes in the real-time scheduling downlink subframe subset.

With reference to any one of the second aspect or the first possible embodiment to the seventeenth possible embodiment of the second aspect, in a twentieth possible embodiment, the feedback information on which channel coding has been performed carries a cyclic redundancy check CRC bit, and after the receiving, by the access network device in an uplink subframe, the feedback information that is sent by the UE and on which channel coding has been performed, the method further includes:

decoding, by the access network device, the feedback information on which channel coding has been performed; and performing, by the access network device, CRC detection on the decoded feedback information, and determining whether the feedback information is decoded correctly.

According to a third aspect, an embodiment of the present invention provides user equipment UE, where the UE includes:

a receiving unit, configured to receive, in a downlink subframe in a preconfigured downlink subframe set, downlink data that is sent by an access network device by using a downlink shared channel, and a downlink assignment index DAI index indicator and a DAI total quantity indicator that are sent by the access network device by using a downlink control channel;

a determining unit, configured to: determine an uplink subframe used to send feedback information corresponding to the downlink shared channel, where the preconfigured downlink subframe set is a set that is associated with the uplink subframe and that consists of all downlink subframes of all carriers preconfigured for the UE; and determine a codebook of the feedback information according to the DAI index indicator and the DAI total quantity indicator, where the codebook corresponds to all or some downlink subframes in a real-time scheduling downlink subframe subset, the real-time scheduling downlink subframe subset is a set that consists of downlink subframes actually scheduled by the access network device, and the real-time scheduling downlink subframe subset belongs to the preconfigured downlink subframe set; or a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK; however, it should be noted that, regardless of whether a padding NACK is included, a quantity of bits in the HARQ-ACK codebook needs to be less than a quantity of bits in a HARQ-ACK corresponding to the preconfigured downlink subframe set; optionally, the padding bit may be located after locations of bits in the HARQ-ACK corresponding to a downlink subframe in the real-time scheduling downlink subframe subset;

an encoding unit, configured to perform channel coding on the feedback information according to the codebook determined by the determining unit; and a sending unit, configured to send, in the uplink subframe, the feedback information on which channel coding has been performed to the access network device.

With reference to the third aspect, in a first possible embodiment, the downlink shared channel includes a first downlink shared channel, or includes the first downlink shared channel and a second downlink shared channel, where the first downlink shared channel is a dynamic scheduling downlink shared channel scheduled by the downlink control channel, and the second downlink shared channel is a semi-persistent scheduling SPS downlink shared channel that is not scheduled by the downlink control channel.

With reference to the first possible embodiment of the third aspect, in a second possible embodiment, the UE further includes:

a detection unit, configured to detect a special downlink control channel, where the special downlink control channel is used to instruct the UE to terminate reception of downlink data on the second downlink shared channel.

With reference to the second possible embodiment of the third aspect, in a third possible embodiment, the sending unit includes: a determining module, a mapping module, and a sending module, where the determining module is configured to determine a physical resource according to resource indicator information sent by the access network device;

the mapping module is configured to map the encoded feedback information to the physical resource; and the sending module is configured to send the mapped feedback information to the access network device by using the physical resource in the uplink subframe.

With reference to any one of the third aspect or the foregoing possible embodiments of the third aspect, in a fourth possible embodiment, a value of a DAI index indicator corresponding to each downlink subframe in the real-time scheduling downlink subframe subset is: a count value obtained by performing an accumulative count on the subframes in the real-time scheduling downlink subframe subset in a preset order.

With reference to the fourth possible embodiment of the third aspect, in a fifth possible embodiment, the preset order is an order obtained by arranging downlink subframes having a same sequence number in the real-time scheduling downlink subframe subset in a first preset order to obtain a first order combination corresponding to each subframe sequence number and then arranging the first order combination corresponding to each subframe sequence number in a second preset order, where the first preset order is an ascending order of carrier sequence numbers or a descending order of carrier sequence numbers, and the second preset order is a front-to-back order of subframe moments or a back-to-front order of subframe moments.

With reference to the fifth possible embodiment of the third aspect, in a sixth possible embodiment, in the real-time scheduling downlink subframe subset, a value of a DAI total quantity indicator of each downlink subframe in the first order combination corresponding to a current subframe sequence number is: a total quantity of first information scheduled in the downlink subframes in the first order combination corresponding to the current subframe sequence number.

With reference to the fifth possible embodiment of the third aspect, in a seventh possible embodiment, in the real-time scheduling downlink subframe subset, a value of a DAI total quantity indicator of each downlink subframe in the first order combination corresponding to a current subframe sequence number is: a sum of a current quantity and a historical quantity, where the current quantity is a total quantity of first information scheduled in the downlink subframes in the first order combination corresponding to the current subframe sequence number, and the historical quantity is a total quantity of first information scheduled in each downlink subframe in the first order combinations separately corresponding to subframe sequence numbers of all downlink subframes before a subframe moment of the current subframe sequence number in the real-time scheduling downlink subframe subset.

With reference to the fifth possible embodiment of the third aspect, in an eighth possible embodiment, in the real-time scheduling downlink subframe subset, a value of a DAI total quantity indicator of each downlink subframe in the first order combination corresponding to a current subframe sequence number is: a sum of a current quantity and a future quantity, where the current quantity is a total quantity of first information scheduled in the downlink subframes in the first order combination corresponding to the current subframe sequence number, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

With reference to the fifth possible embodiment of the third aspect, in a ninth possible embodiment, in the real-time scheduling downlink subframe subset, a value of a DAI total quantity indicator of each downlink subframe in the first order combination corresponding to a current subframe sequence number is: a sum of a current quantity, a historical quantity, and a future quantity, where the current quantity is a total quantity of first information scheduled in the downlink subframes in the first order combination corresponding to the current subframe sequence number, the historical quantity is a total quantity of first information scheduled in each downlink subframe in the first order combinations separately corresponding to sequence numbers of all subframes before a subframe moment of the current subframe sequence number in the real-time scheduling downlink subframe subset, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

In another possible embodiment, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to the preconfigured downlink subframe set. Optionally, the padding bit may be located after locations of bits in the HARQ-ACK corresponding to a downlink subframe in the real-time scheduling downlink subframe subset.

With reference to any one of the sixth possible embodiment to the ninth possible embodiment of the third aspect, in a tenth possible embodiment, the first information is any one of the following information:
  the downlink shared channel;
  a transport block on the downlink shared channel; and
  a transport block corresponding to a transmission mode configured for a downlink carrier to which the downlink shared channel belongs.

With reference to any one of the sixth possible embodiment to the tenth possible embodiment of the third aspect, in an eleventh possible embodiment, a value of the DAI total quantity indicator further includes a quantity of the special downlink control channels that are detected by the detection unit.

With reference to the sixth possible embodiment or the eighth possible embodiment or the tenth possible embodiment or the eleventh possible embodiment of the third aspect, in a twelfth possible embodiment, the determining unit is further configured to determine the codebook of the feedback information according to the DAI index indicator and a DAI total quantity indicator, received by the receiving unit in a downlink subframe in the preconfigured downlink subframe set, of each downlink subframe.

With reference to the seventh possible embodiment or the ninth possible embodiment or the tenth possible embodiment or the eleventh possible embodiment of the third aspect, in a thirteenth possible embodiment, the determining unit is further configured to determine the codebook of the feedback information according to the DAI index indicator and a DAI total quantity indicator, received by the receiving unit in a downlink subframe in the preconfigured downlink subframe set, of the last downlink subframe.

With reference to the fifth possible embodiment of the third aspect, in a fourteenth possible embodiment, values of DAI total quantity indicators corresponding to the last, the second-to-last, . . . , and the $X^{th}$-to-last downlink subframes that are arranged in the preset order in the real-time scheduling downlink subframe subset are respectively preset values $A_X, A_{X-1}, \ldots,$ and $A_1$, and values of DAI total quantity indicators corresponding to the other downlink subframes in the real-time scheduling downlink subframe subset are all set to a preset value $A_0$, where X is a natural number greater than 1.

With reference to the fifth possible embodiment of the third aspect, in a fifteenth possible embodiment, values of DAI total quantity indicators corresponding to the last, the second-to-last, . . . , and the $X^{th}$-to-last downlink subframes that are arranged in the first preset order among the downlink subframes having the same sequence number in the real-time scheduling downlink subframe subset are respectively: preset values $A_X, A_{X-1}, \ldots,$ and $A_1$, and values of DAI total quantity indicators corresponding to the other downlink subframes in the downlink subframes having the same sequence number are all set to a preset value $A_0$, where X is a natural number greater than 1.

With reference to the fifth possible embodiment of the third aspect, in a sixteenth possible embodiment, a value of a DAI total quantity indicator corresponding to each downlink subframe in the real-time scheduling downlink subframe subset is: a count value obtained by performing a count on subframes in the real-time scheduling downlink subframe subset in a reverse order of the preset order in a preset count manner.

With reference to the fifth possible embodiment of the third aspect, in a seventeenth possible embodiment, a value of a DAI total quantity indicator of each downlink subframe of downlink subframes having a same sequence number in the real-time scheduling downlink subframe subset that are arranged in a reverse order of the first preset order is: a count value obtained by performing, starting from a preset value, a count on downlink subframes having a same sequence number in the real-time scheduling downlink subframe subset in a reverse order of the first preset order in a preset count manner.

With reference to the sixteenth possible embodiment or the seventeenth possible embodiment of the third aspect, in an eighteenth possible embodiment, the preset count manner is an accumulative count or a descending count.

With reference to any one of the third possible embodiment to the eighteenth possible embodiment of the third aspect, in a nineteenth possible embodiment, the sending module includes: an obtaining submodule, a determining submodule, and a sending submodule, where the obtaining submodule is configured to obtain a correspondence between at least two downlink subframes received by the receiving unit in the preconfigured downlink subframe set and at least two candidate parameters of the physical resource, where the candidate parameter is a sequence of a demodulation reference signal DMRS part and/or a sequence of an information part of the physical resource;

the determining submodule is configured to determine a first parameter corresponding to the last downlink subframe received in the preconfigured downlink subframe set, where the first parameter is one of the at least two candidate parameters; and the sending submodule is configured to send, on the physical resource, the mapped feedback information according to the first parameter.

With reference to any one of the third possible embodiment to the eighteenth possible embodiment of the third aspect, in a twentieth possible embodiment, the sending module is further configured to send display signaling and the mapped feedback information to the access network device by using the physical resource in the uplink subframe, where the display signaling is used to indicate, to the access network device, the last downlink subframe that is detected by the UE in the preconfigured downlink subframe set.

With reference to any one of the third aspect or the foregoing possible embodiments of the third aspect, in a twenty-first possible embodiment, the UE further includes:

an addition unit, configured to add a cyclic redundancy check CRC bit to the codebook of the feedback information.

According to a fourth aspect, an embodiment of the present invention provides an access network device, where the access network device includes:

a sending unit, configured to: send downlink data to user equipment UE by using a downlink shared channel, and send a downlink assignment index DAI index indicator and a DAI total quantity indicator to the UE by using a downlink control channel scheduled in a downlink subframe in a real-time scheduling downlink subframe subset, so that the UE determines a codebook of feedback information according to the DAI index indicator and the DAI total quantity indicator, where the real-time scheduling downlink subframe subset is a set that consists of downlink subframes actually scheduled by the access network device, the codebook of the feedback information corresponds to all or some downlink subframes in the real-time scheduling downlink subframe subset, and the codebook of the feedback information is a basis for the UE to perform channel coding on the feedback information; or a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK; however, it should be noted that, regardless of whether a padding NACK is included, a bit quantity of the HARQ-ACK codebook needs to be less than a quantity of bits in a HARQ-ACK corresponding to a preconfigured downlink subframe set; optionally, the padding bit may be located after locations of bits in the HARQ-ACK corresponding to a downlink subframe in the real-time scheduling downlink subframe subset; and a receiving unit, configured to receive, in an uplink subframe, the feedback information that is sent by the UE and on which channel coding has been performed.

With reference to the fourth aspect, in a first possible embodiment, the downlink shared channel includes a first downlink shared channel, or includes the first downlink shared channel and a second downlink shared channel, where the first downlink shared channel is a dynamic scheduling downlink shared channel scheduled by the downlink control channel, and the second downlink shared channel is a semi-persistent scheduling SPS downlink shared channel that is not scheduled by the downlink control channel With reference to the first possible embodiment of the fourth aspect, in a second possible embodiment, the access network device further includes:

a scheduling unit, configured to schedule a special downlink control channel, where the special downlink control channel is used to enable the sending unit to terminate sending of the downlink data by using the second downlink shared channel.

With reference to the second possible embodiment of the fourth aspect, in a third possible embodiment, the receiving unit includes: a sending module and a receiving module, where the sending module is configured to send resource indicator information to the UE, where the resource indicator information is used to indicate a physical resource used to carry the feedback information; and the receiving module is configured to receive, in the physical resource in the uplink subframe, the feedback information mapped to the physical resource.

With reference to any one of the fourth aspect or the foregoing possible embodiments of the fourth aspect, in a fourth possible embodiment, a value of a DAI index indicator corresponding to each downlink subframe in the real-time scheduling downlink subframe subset is: a count value obtained by performing an accumulative count on the subframes in the real-time scheduling downlink subframe subset in a preset order.

With reference to the fourth possible embodiment of the fourth aspect, in a fifth possible embodiment, the preset order is an order obtained by arranging downlink subframes having a same sequence number in the real-time scheduling downlink subframe subset in a first preset order to obtain a first order combination corresponding to each subframe sequence number and then arranging the first order combination corresponding to each subframe sequence number in a second preset order, where the first preset order is an ascending order of carrier sequence numbers or a descending order of carrier sequence numbers, and the second preset order is a front-to-back order of subframe moments or a back-to-front order of subframe moments.

With reference to the fifth possible embodiment of the fourth aspect, in a sixth possible embodiment, in the real-time scheduling downlink subframe subset, a value of a DAI total quantity indicator of each downlink subframe in the first order combination corresponding to a current subframe sequence number is: a total quantity of first information scheduled in the downlink subframes in the first order combination corresponding to the current subframe sequence number.

With reference to the fifth possible embodiment of the fourth aspect, in a seventh possible embodiment, in the real-time scheduling downlink subframe subset, a value of a DAI total quantity indicator of each downlink subframe in the first order combination corresponding to a current subframe sequence number is: a sum of a current quantity and a historical quantity, where the current quantity is a total quantity of first information scheduled in the downlink subframes in the first order combination corresponding to the current subframe sequence number, and the historical quantity is a total quantity of first information scheduled in each downlink subframe in the first order combinations separately corresponding to subframe sequence numbers of all downlink subframes before a subframe moment of the current subframe sequence number in the real-time scheduling downlink subframe subset.

With reference to the fifth possible embodiment of the fourth aspect, in an eighth possible embodiment, in the real-time scheduling downlink subframe subset, a value of a DAI total quantity indicator of each downlink subframe in the first order combination corresponding to a current subframe sequence number is: a sum of a current quantity and a future quantity, where the current quantity is a total quantity of first information scheduled in the downlink subframes in the first order combination corresponding to the current subframe sequence number, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

With reference to the fifth possible embodiment of the fourth aspect, in a ninth possible embodiment, in the real-time scheduling downlink subframe subset, a value of a DAI total quantity indicator of each downlink subframe in the first order combination corresponding to a current subframe sequence number is: a sum of a current quantity, a historical quantity, and a future quantity, where the current quantity is a total quantity of first information scheduled in the downlink subframes in the first order combination corresponding to the current subframe sequence number, the historical quantity is a total quantity of first information scheduled in each downlink subframe in the first order combinations separately corresponding to sequence numbers of all subframes before a subframe moment of the current subframe sequence number in the real-time scheduling downlink subframe subset, and the future quantity is a total quantity of first information scheduled in a downlink subframe in the first order combination corresponding to a subframe sequence number of a downlink subframe at a next moment of a subframe having the current subframe sequence number in the real-time scheduling downlink subframe subset.

In another possible embodiment, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to the preconfigured downlink subframe set. Optionally, the padding bit may be located after locations of bits in the HARQ-ACK corresponding to a downlink subframe in the real-time scheduling downlink subframe subset.

With reference to any one of the sixth possible embodiment to the ninth possible embodiment of the fourth aspect, in a tenth possible embodiment, the first information is any one of the following information:
the downlink shared channel;
a transport block on the downlink shared channel; and
a transport block corresponding to a transmission mode configured for a downlink carrier to which the downlink shared channel belongs.

With reference to any one of the sixth possible embodiment to the tenth possible embodiment of the fourth aspect, in an eleventh possible embodiment, a value of the DAI total quantity indicator further includes a quantity of the special downlink control channels scheduled by the scheduling unit.

With reference to the fifth possible embodiment of the fourth aspect, in a twelfth possible embodiment, values of DAI total quantity indicators corresponding to the last, the second-to-last, . . . , and the $X^{th}$-to-last downlink subframes that are arranged in the preset order in the real-time scheduling downlink subframe subset are respectively preset values $A_X, A_{X-1}, \ldots,$ and $A_1$, and values of DAI total quantity indicators corresponding to the other downlink subframes in the real-time scheduling downlink subframe subset are all set to a preset value $A_0$, where X is a natural number greater than 1.

With reference to the fifth possible embodiment of the fourth aspect, in a thirteenth possible embodiment, values of DAI total quantity indicators corresponding to the last, the second-to-last, . . . , and the $X^{th}$-to-last downlink subframes that are arranged in the first preset order among the downlink subframes having the same sequence number in the real-time scheduling downlink subframe subset are respectively: preset values $A_X, A_{X-1}, \ldots,$ and $A_1$, and values of DAI total quantity indicators corresponding to the other downlink subframes in the downlink subframes having the same sequence number are all set to a preset value $A_0$, where X is a natural number greater than 1.

With reference to the fifth possible embodiment of the fourth aspect, in a fourteenth possible embodiment, a value of a DAI total quantity indicator corresponding to each downlink subframe in the real-time scheduling downlink subframe subset is: a count value obtained by performing a count on subframes in the real-time scheduling downlink subframe subset in a reverse order of the preset order in a preset count manner.

With reference to the fifth possible embodiment of the fourth aspect, in a fifteenth possible embodiment, a value of a DAI total quantity indicator of each downlink subframe of downlink subframes having a same sequence number in the real-time scheduling downlink subframe subset that are arranged in a reverse order of the first preset order is: a count value obtained by performing, starting from a preset value, a count on downlink subframes having a same sequence number in the real-time scheduling downlink subframe subset in a reverse order of the first preset order in a preset count manner.

With reference to the fourteenth possible embodiment or the fifteenth possible embodiment of the fourth aspect, in a sixteenth possible embodiment, the preset count manner is an accumulative count or a descending count.

With reference to any one of the third possible embodiment to the sixteenth possible embodiment of the fourth aspect, in a seventeenth possible embodiment, the access network device further includes a detection unit and a determining unit, where
the detection unit is configured to detect a first parameter in the uplink subframe, where the first parameter is a sequence of a demodulation reference signal DMRS part and/or a sequence of an information part of the physical resource; and
the determining unit is configured to: determine, according to the first parameter, the last downlink subframe that is received by the UE in the preconfigured downlink subframe set; and determine, according to the last downlink subframe, that the feedback information corresponds to all or some downlink subframes in the real-time scheduling downlink subframe subset.

With reference to any one of the third possible embodiment to the sixteenth possible embodiment of the fourth aspect, in an eighteenth possible embodiment, the receiving unit is further configured to receive, in the physical resource in the uplink subframe, display signaling and feedback information mapped to the physical resource, where the display signaling is used to indicate, to the access network device, the last downlink subframe that is detected by the UE in the preconfigured downlink subframe set.

With reference to the eighteenth possible embodiment of the fourth aspect, in a nineteenth possible embodiment, the determining unit is further configured to determine, according to the last downlink subframe, that the codebook of the feedback information corresponds to all or some downlink subframes in the real-time scheduling downlink subframe subset.

With reference to any one of the fourth aspect or the first possible embodiment to the seventeenth possible embodiment of the fourth aspect, in a twentieth possible embodiment, the feedback information on which channel coding has been performed carries a cyclic redundancy check CRC bit, and the access network device further includes a decoding unit, where the decoding unit is configured to decode the feedback information on which channel coding has been performed; and the detection unit is further configured to: perform CRC detection on the decoded feedback information, to determine whether the feedback information is decoded correctly.

By means of the methods for sending and receiving feedback information, the user equipment, and the access network device that are provided in the embodiments of the present invention, UE receives, in a preconfigured downlink subframe set, downlink data that is sent by an access network device by using a downlink shared channel, determines an uplink subframe used to send feedback information corresponding to the downlink shared channel, then determines a codebook of the feedback information according to a DAI index indicator and a DAI total quantity indicator, where the codebook of the feedback information corresponds to all or some downlink subframes in a real-time scheduling downlink subframe subset, subsequently performs channel coding on the feedback information according to the codebook, and finally sends, in the uplink subframe, the feedback information on which channel coding has been performed to the access network device. Compared with low uplink resource utilization caused by that a large quantity of NACKs need to be padded to encode feedback information according to a preconfigured downlink subframe set in the prior art, in the present invention, a codebook of feedback information of a downlink shared channel to which received downlink data belongs may be determined according to a DAI index indicator and a DAI total quantity indicator. Because the determined codebook of the feedback information corresponds to all or some downlink subframes in a real-time scheduling downlink subframe subset, UE needs to feed back only feedback information of a downlink shared channel in a downlink subframe that is actually scheduled by an access network, and does not need to perform NACK padding on a downlink shared channel that is not scheduled, thereby improving uplink resource utilization.

BRIEF DESCRIPTION OF DRAWINGS

FIG. 5 is a schematic diagram of a DAI index indicator according to an embodiment of the present invention;

FIG. 6 is a schematic diagram of a DAI index indicator and a DAI total quantity indicator according to an embodiment of the present invention;

FIG. 7 is a schematic diagram of another DAI index indicator and another DAI total quantity indicator according to an embodiment of the present invention;

FIG. 8 is a schematic diagram of another DAI index indicator and another DAI total quantity indicator according to an embodiment of the present invention;

FIG. 9 is a schematic diagram of another DAI index indicator and another DAI total quantity indicator according to an embodiment of the present invention;

FIG. 12 is a schematic diagram of another DAI index indicator and another DAI total quantity indicator according to an embodiment of the present invention;

FIG. 13 is a schematic diagram of another DAI index indicator and another DAI total quantity indicator according to an embodiment of the present invention;

FIG. 14 is a schematic diagram of another DAI index indicator and another DAI total quantity indicator according to an embodiment of the present invention;

FIG. 15 is a schematic diagram of another DAI index indicator and another DAI total quantity indicator according to an embodiment of the present invention;

DESCRIPTION OF EMBODIMENTS

Figure 1:
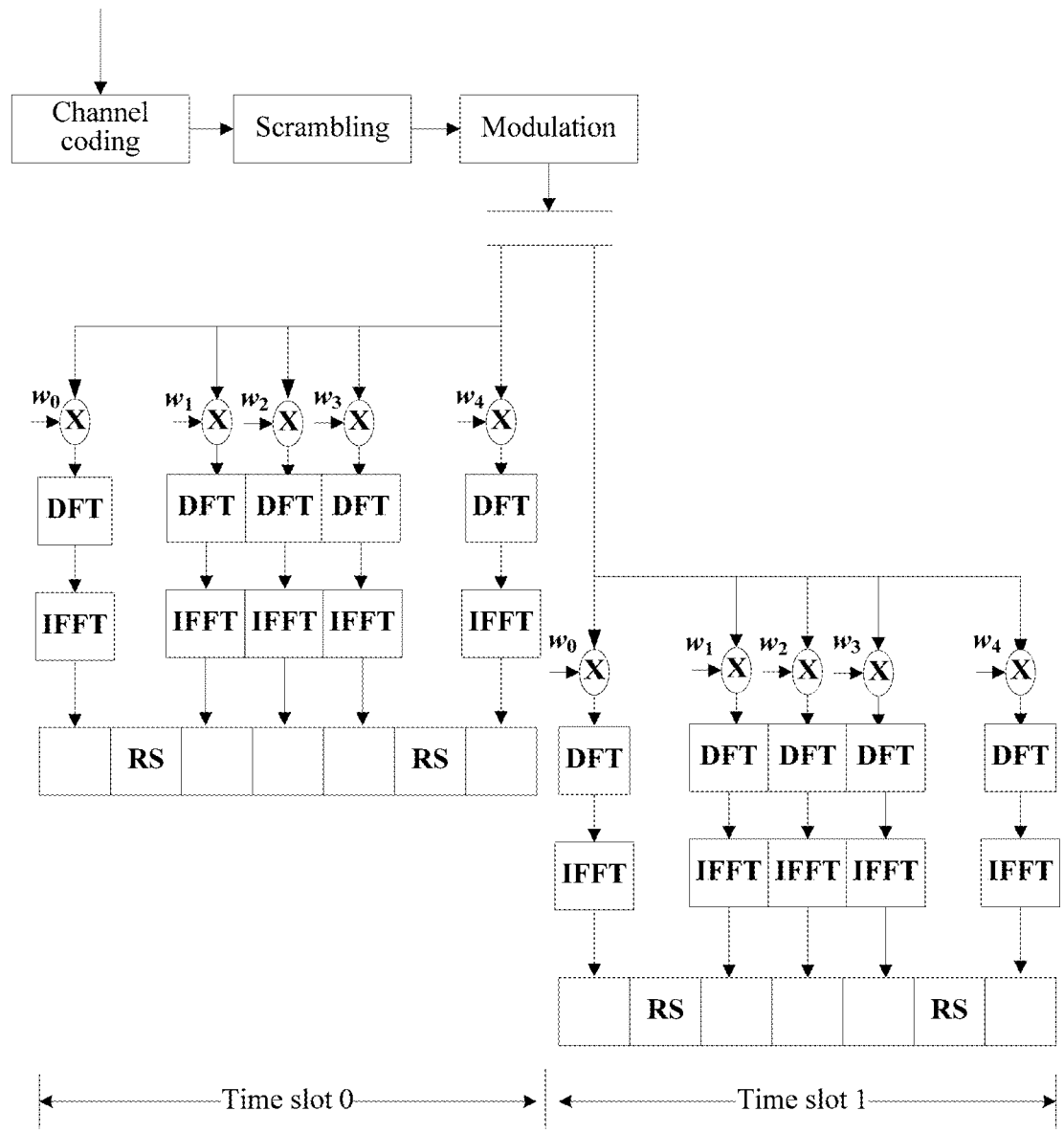
FIG. 1 is a schematic structural diagram of a channel in a PUCCH format 3 according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A downlink and an uplink of an LTE system are respectively based on OFDMA (Orthogonal Frequency Division Multiplexing Access, orthogonal frequency division multiple access) and SC-FDMA (Single Carrier-Frequency Division Multiplexing Access, single carrier frequency division multiple access). A time-frequency resource is divided into an OFDM or SC-FDMA symbol (which is referred to as a time-domain symbol below) in a time domain dimension and a subcarrier in a frequency domain dimension. A minimum resource granularity is referred to as one RE (Resource Element, resource element). The RE represents a time-frequency lattice including one time-domain symbol in a time domain and one subcarrier in a frequency domain.

In the LTE system, service transmission is scheduled based on a base station. A basic time unit of scheduling is one subframe. One subframe includes multiple time-domain symbols. In a specific scheduling procedure, the base station sends scheduling information of a PDSCH (Physical Downlink Shared Channel, physical downlink shared channel) or a PUSCH (Physical Uplink Shared Channel, physical uplink shared channel) on a control channel. The control channel may be a PDCCH (Physical Downlink Control Channel, physical downlink control channel) or an EPDCCH (Enhanced Physical Downlink Control Channel, enhanced physical downlink control channel). The scheduling information includes control information such as resource allocation information or an encoding adjustment manner. Further, UE detects the control channel in a subframe, and receives a downlink data channel or sends an uplink data channel according to the scheduling information carried in the detected control channel.

LTE supports two duplex modes: FDD (Frequency Duplexing Division, frequency division duplexing) and TDD (Time Duplexing Division, time division duplexing). For an FDD system, downlink transmission and uplink transmission are performed on different carriers. For a TDD system, uplink transmission and downlink transmission are performed on one carrier but at different moments. One TDD carrier specifically includes a downlink subframe, an uplink subframe, and a special subframe. The special subframe includes three parts: a DwPTS (Downlink Pilot Time Slot, downlink pilot time slot), a GP (Guard Period, guard period), and an UpPTS (Uplink Pilot Time Slot, uplink pilot time slot). The GP is mainly used to compensate for a device conversion time period and a propagation delay from a downlink to an uplink. In addition, downlink data can be transmitted in the DwPTS, but uplink data cannot be transmitted in the UpPTS. Therefore, the special subframe may be considered as a downlink subframe. LTE currently supports seven different TDD uplink/downlink configurations. As shown in Table 1, D denotes the downlink subframe, S denotes the special subframe, and U denotes the uplink subframe.

A HARQ (Hybrid Automatic Repeat Request, hybrid automatic repeat request) mechanism is used in LTE. A downlink is used as an example. After UE receives information carried on a PDSCH, if the information is decoded correctly, the UE feeds back ACK information on a PUCCH. If the information is decoded incorrectly, the UE feeds back NACK information on the PUCCH. For FDD, after receiving, in a subframe n-4, information carried on a PDSCH, the UE feeds back ACK information or NACK information in a subframe n.

TABLE 1

| Uplink/downlink configuration | Period of conversion from a downlink to an uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

Different TDD uplink/downlink configurations in an LTE system

TABLE 1-continued

Different TDD uplink/downlink configurations in an LTE system

| Uplink/downlink configuration | Period of conversion from a downlink to an uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For TDD, a time sequence relationship between a PDSCH and ACK information or NACK information corresponding to the PDSCH is shown in Table 2. A subframe marked with a number is an uplink subframe n used to feed back the ACK information or the NACK information, and the marked number represents that ACK information or NACK information corresponding to a PDSCH in a downlink subframe set n-k (k belongs to K) needs to be fed back in the uplink subframe n. For example, K={7, 6} in a subframe, whose number is n=2, for which an uplink/downlink configuration is 1 represents that the uplink subframe n=2 is used to feed back ACK information or NACK information that corresponds to a PDSCH in the two downlink subframes n-7 and n-6. Specifically, n-7 is a downlink subframe 5, and n-6 is a downlink subframe 6.

LTE further supports a CA technology. That is, the base station configures multiple carriers for the UE to improve a data transmission rate of the UE. When CA is performed, the multiple carriers sent by the base station are synchronous in time, and the UE may detect respectively a PDCCH for scheduling each carrier and a corresponding PDSCH. A specific detection process for each carrier is similar to the foregoing case of the single carrier, and details are no longer described herein. The LTE system supports FDD CA, TDD CA, and FDD+TDD CA. The TDD CA further includes TDD CA of one uplink/downlink configuration and TDD CA of different uplink/downlink configurations. It should be noted that, one primary carrier and at least one secondary carrier are provided in a CA mode, and a PUCCH that carries ACK information or NACK information can be configured only on a primary carrier of the UE.

A PUCCH sending mode in the CA mode includes two modes: a channel selection mode and a PUCCH format 3. In the channel selection mode, a PUCCH format 1a/1b is used to feed back ACK information or NACK information. However, the channel selection mode supports CA of a maximum of two carriers. In the PUCCH format 3 (PF3) mode, a transmission manner of DFT-S-OFDM (Discrete Fourier Transform-Spread-OFDM, discrete Fourier transform spread orthogonal frequency division multiplexing) is used. A channel structure in the transmission manner is shown in FIG. 1. The current PF3 can support transmission of a maximum of 22 original information bits.

Specifically, RM (Reed Muller, Reed Muller) channel coding is performed on bits (for example, 20 bits) of original ACK information or NACK information to generate 48 encoded bits, scrambling is then performed, and modulation is performed to obtain 24 QPSK (Quadrature Phase Shift Keying, orthogonal phase shift keying) symbols. The 24 QPSK are separately placed in two time slots of one subframe. In this way, each time slot has 12 QPSK symbols. Specifically, the 12 QPSK symbols are placed in 12 continuous subcarriers on one time-domain symbol of the time slot, that is, occupy 12 subcarriers on one time-domain symbol in one RB (Resource Block, resource block). Subsequently, for each time slot, OCC (Orthogonal Cover Code, orthogonal cover code) spreading is performed in a time domain by a length of 5, and five time-domain symbols in one RB are occupied. Different UEs may perform code division multiplexing on one RB by using different OCCs, and the rest two symbols are used to carry an RS (Reference Signal, reference signal). Finally, DFT (Discrete Fourier Transform, discrete Fourier transform) precoding is performed, and a result of precoding is sent to a base station.

A mainstream TDD uplink/downlink configuration 2 in a current network is used as an example. An uplink subframe 2 of one carrier may support a feedback of four bits of ACK information or NACK information. CA of the TDD uplink/downlink configuration 2 with five carriers may support a feedback of 20 bits of ACK information or NACK infor-

TABLE 2

Time sequence relationship between a PDSCH and an ACK/NACK corresponding to the PDSCH in a TDD system

| Uplink/downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | mation. In this case, it may be considered that a preconfigured downlink subframe set associated with the uplink subframe 2 includes the foregoing downlink subframes 4, 5, 6, and 8 of the five carriers configured for the UE. In the PF3 mode, generation of a codebook of ACK information or NACK information that needs to be fed back in the uplink subframe 2 is determined based on the preconfigured downlink subframe set associated with the uplink subframe 2. The codebook of the ACK information or NACK information is a bit stream of original bits that are of the ACK information or NACK information before coding and that are arranged according to a particular order. A size of the codebook of the ACK information or NACK information in the example is 20. A specific order may be an order of subframes followed by carriers, that is, bits of ACK information or NACK information that correspond to subframes 4, 5, 6, and 8 of a carrier 1 are arranged first, bits of ACK information or NACK information that correspond to subframes 4, 5, 6, and 8 of a carrier 2 are then arranged, and bits of ACK information or NACK information that correspond to subframes of the remaining carriers are arranged in the foregoing manner. In particular, in a downlink subframe that is not scheduled, or at a position of a bit of ACK information or NACK information corresponding to a downlink subframe in which no downlink data is received by the UE, NACK information needs to be padded.

Further, it should be noted that, in a CA scenario in which more carriers are introduced (which is referred to as super CA below), a feedback of ACK information or NACK information with more bits needs to be supported. For example, CA of 10 carriers needs to be supported. When CA is performed by using 10 carriers in the TDD uplink/downlink configuration 2, a 40-bit ACK/NACK needs to be fed back. In another scenario, still CA of a maximum of 5 carriers is supported. However, multiple carriers are configured into a TDD uplink/downlink configuration 5. For example, a primary carrier belongs to the uplink/downlink configuration 2, and 4 secondary carriers belong to the uplink/downlink configuration 5. With reference to Table 2, an uplink subframe 2 of one primary carrier in the uplink/downlink configuration 2 may support a feedback of four bits of ACK information or NACK information, and an uplink subframe 2 of one secondary carrier in the uplink/downlink configuration 2 may support a feedback of nine bits of ACK information or NACK information. Therefore, a total of 4+9*4=40 bits of ACK information or NACK information need to be fed back.

For super CA, although a relatively large quantity of carriers are configured for the UE, there are not necessarily many carriers and/or downlink subframes that are actually scheduled in a subframe, for example, a TDD uplink/downlink configuration 2 with 32 carriers configured. Therefore, a preconfigured downlink subframe set associated with an uplink subframe 2 includes 128 downlink subframes. However, a quantity of actually scheduled downlink subframes may be far less than 128. For example, only 10 carriers are scheduled, that is, a size of ACK information or NACK information is less than 40 bits. In this case, if a current manner of determining a codebook of ACK information or NACK information based on a preconfigured downlink subframe set is still used, a large amount of NACK information is padded, resulting in low uplink resource utilization.

Figure 2:
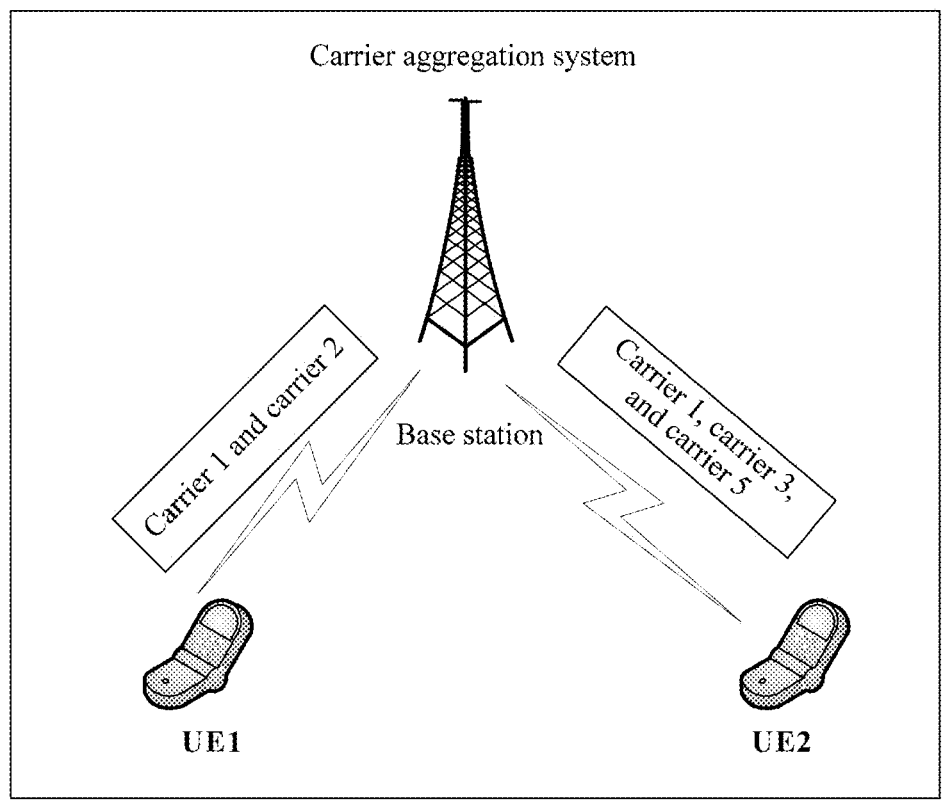
FIG. 2 is a schematic diagram of a logical structure of a carrier aggregation system according to an embodiment of the present invention.

To improve uplink resource utilization, an embodiment of the present invention provides a method for sending feedback information. The method is mainly applied to a current CA system. As shown in FIG. 2, the CA system includes an access network device and UE. In FIG. 2, an example in which the access network device is a base station is used. It should be noted that, in the CA system, CA of more carriers may be introduced, or current CA of five carriers may be kept.

Figure 3:
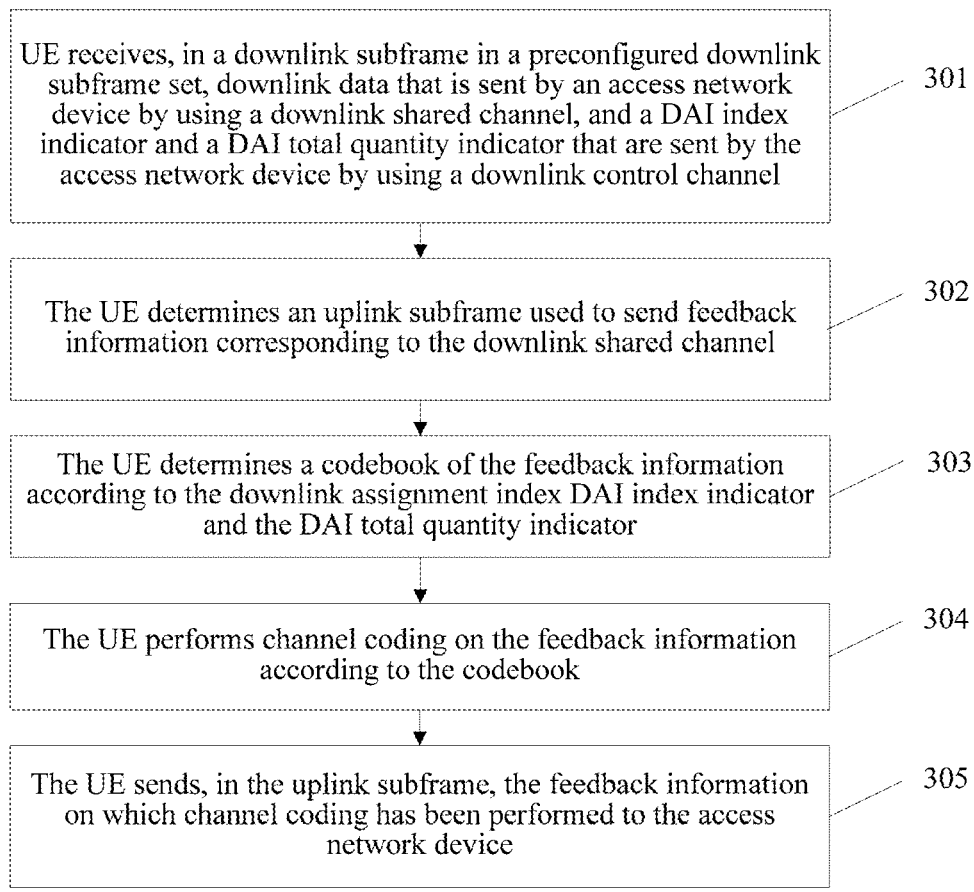
FIG. 3 is a flowchart of a method for sending feedback information according to an embodiment of the present invention.

An embodiment of the present invention provides a method for sending feedback information. The method is applied to UE. As shown in FIG. 3, the method includes the following steps.

301: The UE receives, in a downlink subframe in a preconfigured downlink subframe set, downlink data that is sent by an access network device by using a downlink shared channel and a DAI index indicator and a DAI total quantity indicator that are sent by the access network device by using a downlink control channel.

In a case in which an uplink/downlink configuration is determined, there is a one-to-one correspondence between an uplink subframe and a preconfigured downlink subframe set. The preconfigured downlink subframe set is a set that is associated with the uplink subframe and that consists of all downlink subframes of all carriers preconfigured for the UE.

It should be noted that, in a scenario of super CA, a base station configures multiple carriers for the UE. The multiple carriers may be FDD carriers or TDD carriers. Each carrier includes multiple downlink subframes. For TDD, different carriers may have a same uplink/downlink configuration or different uplink/downlink configurations. An example in which 10 TDD carriers of a same uplink/downlink configuration 2 are configured for the UE is used. As may be known according to Table 2, an uplink subframe 2 of a primary carrier is associated with downlink subframes 4, 5, 6, and 8 of the 10 carriers. Therefore, a preconfigured downlink subframe set associated with the uplink subframe 2 is a set that consists of 40 downlink subframes: downlink subframes 4, 5, 6, and 8 of the 10 carriers. The preconfigured downlink subframe set is referred to as a preconfigured downlink subframe set 1. An uplink subframe 7 of the primary carrier is associated with downlink subframes 9, 0, 1, and 3 of the 10 carriers. Therefore, a preconfigured downlink subframe set associated with the uplink subframe 7 is a set that consists of 40 downlink subframes: downlink subframes 9, 0, 1, and 3 of the 10 carriers. The preconfigured downlink subframe set is referred to as a preconfigured downlink subframe set 2.

In this embodiment of the present invention, the downlink subframe includes a normal downlink subframe, and further includes a special subframe in a TDD system.

It should be further noted that, the downlink shared channel that is used to carry the downlink data received by the UE includes a first downlink shared channel, or includes a first downlink shared channel and a second downlink shared channel.

The first downlink shared channel is a dynamic downlink shared channel scheduled by the downlink control channel. Multiple first downlink shared channels may be respectively scheduled by independent downlink control channels, or may be scheduled by one downlink control channel. Alternatively, some first downlink shared channels may be respectively scheduled by independent downlink control channels, and the rest first downlink shared channels are scheduled by one downlink control channel. In this embodiment of the present invention, an example in which each first downlink shared channel is scheduled by an independent downlink control channel is used.

The second downlink shared channel is an SPS (Semi-Persistent scheduling, semi-persistent scheduling) downlink shared channel that is not scheduled by the downlink control channel. After an SPS mechanism is activated, the SPS downlink shared channel does not need to be scheduled by the downlink control channel when data transmission is initially performed by means of HARQ. Instead, downlink data is sent within a preconfigured period. For example, downlink data is sent once every 20 milliseconds. If initial transmission of downlink data fails on the SPS downlink shared channel, the access network device needs to perform retransmission scheduling on the SPS downlink shared channel, and after retransmission scheduling is performed, the downlink shared channel is turned into a first downlink shared channel. The first downlink shared channel needs to be scheduled by the downlink control channel.

In this step, that the UE receives, in a downlink subframe in a preconfigured downlink subframe set, downlink data that is sent by an access network device by using a downlink shared channel may specifically include the following steps.

Step 1: The UE detects the downlink control channel.

The UE may detect a downlink control channel in each downlink subframe in the preconfigured downlink subframe set, or may detect a downlink control channel in only some downlink subframes in the preconfigured downlink subframe set.

Step 2: The UE determines a first downlink shared channel scheduled by the detected downlink control channel.

The downlink control channel and the first downlink shared channel scheduled by the downlink control channel are generally in one downlink subframe.

Step 3: The UE receives downlink data on the first downlink shared channel, and receives downlink data on a second downlink shared channel according to a preconfigured period.

It may be understood that, after receiving the downlink data on the downlink shared channels, the UE needs to feed back ACK information or NACK information of these downlink shared channels, that is, feedback information corresponding to the downlink shared channels.

It should be further noted that, the DAI index indicator and the DAI total quantity indicator may be carried on an independent downlink control channel, or may be carried on a downlink control channel used to schedule a downlink shared channel. In this embodiment of the present invention, the DAI index indicator and the DAI total quantity indicator are preferably carried on a downlink control channel used to schedule a downlink shared channel.

302: The UE determines an uplink subframe used to send feedback information corresponding to the downlink shared channel.

The feedback information includes ACK information and NACK information. When the UE correctly receives the downlink data on the downlink shared channel, the feedback information corresponding to the downlink shared channel is the ACK information. When the UE does not correctly receive the downlink data on the downlink shared channel, the feedback information corresponding to the downlink shared channel is the NACK information.

For example, when an uplink/downlink configuration is 2, the UE receives the downlink data on a downlink shared channel of a downlink subframe 4. It can be learnt from Table 2 that, in a case in which the uplink/downlink configuration is 2, the uplink subframe n=2 is used to feed back four downlink subframes: n-8, n-7, n-4, and n-6, where n-8, n-7, n-4, and n-6 are respectively downlink subframes 4, 5, 6, and 8. Therefore, it is determined that an uplink subframe corresponding to the downlink subframes 4 is the uplink subframe 2, and, the uplink subframe used to send the feedback information corresponding to the downlink shared channel is the uplink subframe 2.

If in the foregoing step 301, the UE receives, in a downlink subframe 4 of the preconfigured downlink subframe set 1, downlink data that is sent by the access network device by using a downlink shared channel 1, and also receives, in a downlink subframe 3 of the preconfigured downlink subframe set 2, downlink data that is sent by the access network device by using a downlink shared channel 2, in step 302, the UE may determine that an uplink subframe used to send feedback information of the downlink shared channel 1 is the uplink subframe 2, and an uplink subframe used to send feedback information of the downlink shared channel 2 is an uplink subframe 7.

303: The UE determines a codebook of the feedback information according to the DAI index indicator and the DAI total quantity indicator.

In an implementation manner, the codebook of the feedback information corresponds to all or some downlink subframes in a real-time scheduling downlink subframe subset, the real-time scheduling downlink subframe subset is a set that consists of downlink subframes actually scheduled by the access network device, and the real-time scheduling downlink subframe subset belongs to the preconfigured downlink subframe set.

Still, the example in which 10 TDD carriers of a same uplink/downlink configuration 2 are configured for the UE is used. A preconfigured downlink subframe set associated with the uplink subframe 2 is a set that consists of 40 downlink subframes: downlink subframes 4, 5, 6, and 8 of the 10 carriers. The access network device actually schedules downlink subframes 4 of the carriers 1 to 7, downlink subframes 5 of the carriers 1, 3, and 5, downlink subframes 6 of the carriers 1 to 6, and downlink subframes 8 of the carriers 1 to 5. Therefore, a set that consists of the downlink subframes 4 of the carriers 1 to 7, the downlink subframes 5 of the carriers 1, 3, and 5, the downlink subframes 6 of the carriers 1 to 6, and the downlink subframes 8 of the carriers 1 to 5 is a real-time scheduling downlink subframe subset associated with the uplink subframe 2. The codebook of the feedback information that needs to be sent in the uplink subframe 2 corresponds to all or some downlink subframes in the real-time scheduling downlink subframe subset associated with the uplink subframe 2.

After the UE receives the downlink data that is sent by the access network device by using the downlink shared channel, the UE determines, according to the time sequence relationship specified in Table 2, feedback information that needs to be sent in each uplink subframe. The UE may determine feedback information of a downlink shared channel to which the received downlink data belongs. However, the UE may miss a downlink control channel in detection. Therefore, not only the feedback information of the downlink shared channel to which the received downlink data belongs needs to be determined, but also a downlink control channel that is missed in detection needs to be determined according to the DAI index indicator and the DAI total quantity indicator. The feedback information corresponding to the downlink shared channel scheduled by the downlink control channel that is missed in detection is NACK. Subsequently, the UE may generate, according to the DAI index indicator and the DAI total quantity indicator, a codebook of the feedback information that needs to be sent in each uplink subframe.

The codebook of the feedback information is a bit stream that consists of 1 and 0, where "1" represents ACK information, and "0" represents NACK information.

In this embodiment of the present invention, because the codebook of the feedback information corresponds to all or some downlink subframes in the real-time scheduling downlink subframe subset, the UE needs to feed back ACK information or NACK information of a downlink data channel in only an actually scheduled downlink subframe, and does not need to feed back feedback information corresponding to a downlink data channel in downlink subframes that are not scheduled, that is, NACK padding does not need to be performed in these downlink subframes that are not scheduled.

In another implementation manner, an example in which the feedback information is ACK or NACK information is used. For ease of description, the ACK information or the NACK information is collectively referred to as an HARQ-ACK. Optionally, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to a preconfigured downlink subframe set. Optionally, the padding bit may be located after locations of bits in the HARQ-ACK corresponding to the downlink subframe in the real-time scheduling downlink subframe subset. The real-time scheduling downlink subframe subset is a set that consists of downlink subframes actually scheduled by the access network device, and the real-time scheduling downlink subframe subset belongs to the preconfigured downlink subframe set. In this embodiment, when the base station schedules downlink data in a downlink subframe, it is possible that the base station cannot accurately determine a quantity of downlink subframes that are in the real-time scheduling downlink subframe subset and in which downlink data is actually scheduled for the UE. Therefore, in this case, a quantity of bits in one HARQ-ACK codebook may be pre-estimated. When the quantity of downlink subframes that are in the real-time scheduling downlink subframe subset and in which the downlink data is actually scheduled is eventually less than the pre-estimated quantity of bits in the codebook, the UE and the base station both determine that at least one NACK is padded at the end of the codebook. A specific quantity of padded NACKs is the pre-estimated quantity of bits in the codebook minus the quantity of downlink subframes that are in the real-time scheduling downlink subframe subset and in which the downlink data is actually scheduled or a quantity of transport blocks in the downlink subframe.

304: The UE performs channel coding on the feedback information according to the codebook.

After the UE determines the codebook of the feedback information, the UE needs to perform channel coding according to the codebook. A type of the channel coding may be linear block coding, convolutional coding, or the like, and the present invention does not limit the type of channel coding. If existing block coding, for example, Reed Muller coding, is used, generally, a CRC (Cyclical Redundancy Check, cyclic redundancy check) does not need to be performed before the coding. If the convolutional coding is used, the UE may add a CRC bit to the codebook of the feedback information before coding.

305. The UE sends, in the uplink subframe, the feedback information on which channel coding has been performed to the access network device.

In the method for sending feedback information provided in this embodiment of the present invention, UE receives, in a preconfigured downlink subframe set, downlink data that is sent by an access network device by using a downlink shared channel, determines an uplink subframe used to send feedback information corresponding to the downlink shared channel, then determines a codebook of the feedback information according to a DAI index indicator and a DAI total quantity indicator, where the codebook of the feedback information corresponds to all or some downlink subframes in a real-time scheduling downlink subframe subset, subsequently performs channel coding on the feedback information according to the codebook, and finally sends, in the uplink subframe, the feedback information on which channel coding has been performed to the access network device. Compared with low uplink resource utilization caused by that a large quantity of NACKs need to be padded to encode feedback information according to a preconfigured downlink subframe set in the prior art, in the present invention, a codebook of feedback information of a downlink shared channel to which received downlink data belongs may be determined according to a DAI index indicator and a DAI total quantity indicator. Because the determined codebook of the feedback information corresponds to all or some downlink subframes in a real-time scheduling downlink subframe subset, UE needs to feed back only feedback information of a downlink shared channel in a downlink subframe that is actually scheduled by an access network, and does not need to perform NACK padding on a downlink shared channel that is not scheduled, thereby improving uplink resource utilization.

With reference to the foregoing descriptions, because a case in which a downlink shared channel includes a first downlink channel and a second downlink shared channel exists, after the SPS mechanism is activated, the UE may periodically receive downlink data carried on the second downlink shared channel. To enable or disable the SPS mechanism according to an actual need, in another implementation manner provided in this embodiment of the present invention, in a process in which the UE periodically receives the downlink data carried on the second downlink channel, the UE further needs to detect a special downlink control channel. The special downlink control channel is used to instruct the UE to terminate reception of downlink data on the second downlink shared channel. Therefore, after detecting the special downlink control channel, the UE terminates reception of downlink data on the second downlink shared channel.

After detecting the special downlink control channel, the UE also needs to feed back ACK information or NACK information. Therefore, the real-time scheduling downlink subframe subset further includes a downlink subframe of the special downlink control channel.

Figure 4:
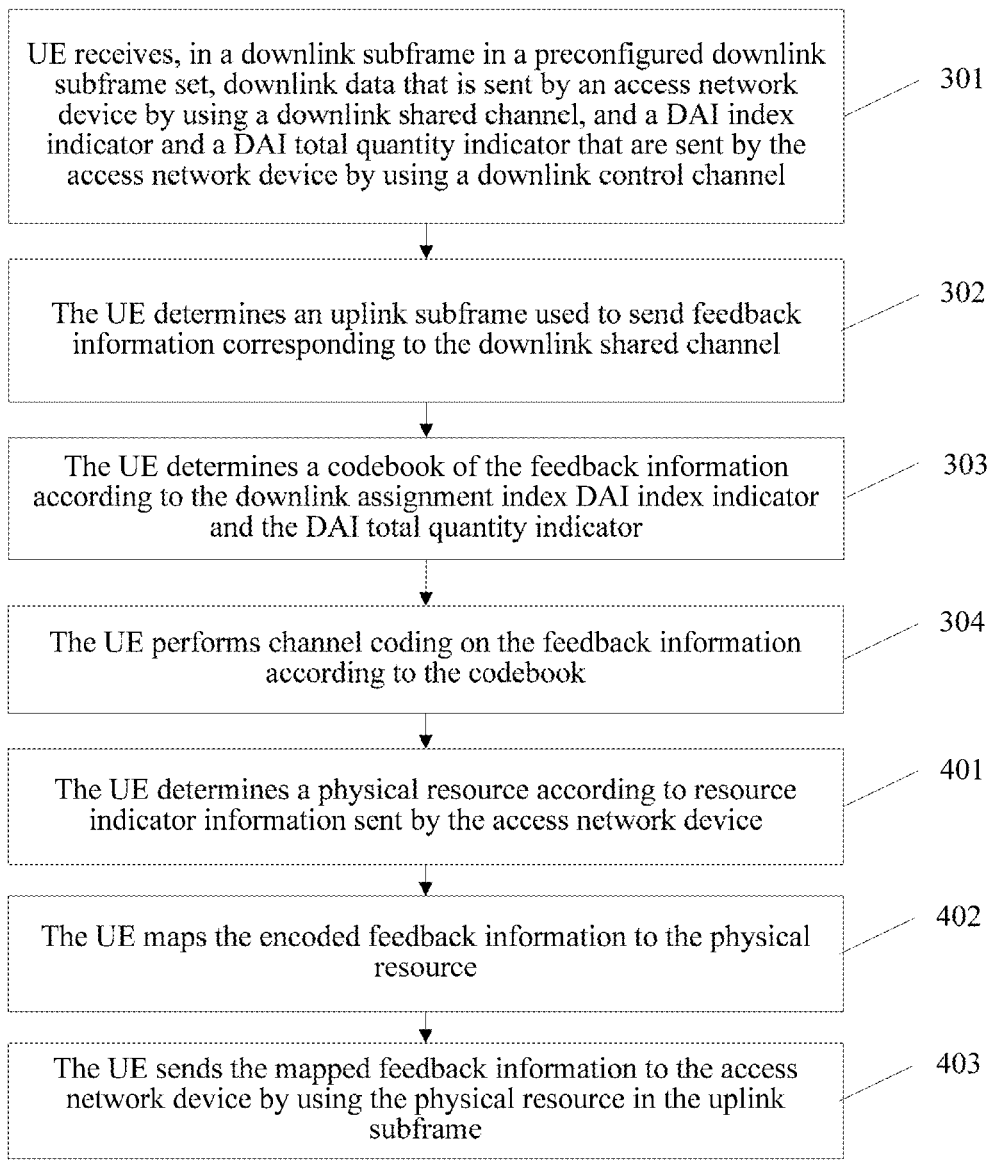
FIG. 4 is a flowchart of another method for sending feedback information according to an embodiment of the present invention.

With reference to the method procedure shown in FIG. 3, when sending the feedback information to the access network device, the UE needs to determine a physical resource used to carry the feedback information. Therefore, a method for sending the feedback information by the UE is described in another implementation manner provided in this embodiment of the present invention. As shown in FIG. 4, the foregoing step 305 of sending, by the UE in the uplink subframe, the feedback information on which channel coding has been performed to the access network device may be specifically implemented as step 401 to step 403.

401: The UE determines a physical resource according to resource indicator information sent by the access network device.

The physical resource may be a PUCCH resource or a PUSCH resource. An example in which the physical resource is a PUCCH resource is used for description below.

First, the UE receives higher layer signaling, for example, RRC (Radio Resource Control, radio resource control) signaling, sent by the access network device, and obtains, from the RRC signaling, a PUCCH resource set configured for the UE by the access network device. The PUCCH resource set includes at least two PUCCH resources. The PUCCHs in the PUCCH resource set may have a same format, or may include at least two PUCCH formats. Subsequently, after obtaining the resource set, the UE receives the resource indicator information sent by the access network device. Finally, according to the resource indicator information, the UE determines, from the PUCCH resource set, a physical resource used to carry the feedback information.

402: The UE maps the encoded feedback information to the physical resource.

403: The UE sends the mapped feedback information to the access network device by using the physical resource in the uplink subframe.

The method for determining, by the UE, the codebook of the feedback information according to the DAI index indicator and the DAI total quantity indicator in the foregoing step 302 is described below. This embodiment of the present invention provides one value result of the DAI index indicator and nine value results of the DAI total quantity indicator, and the value results are described below one by one with reference to the accompanying drawings.

The value result of the DAI index indicator:

A value of a DAI index indicator corresponding to each downlink subframe in the real-time scheduling downlink subframe subset is: a count value obtained by performing an accumulative count on the subframes in the real-time scheduling downlink subframe subset in a preset order.

The preset order is an order obtained by arranging downlink subframes having a same sequence number in the real-time scheduling downlink subframe subset in a first preset order to obtain a first order combination corresponding to each subframe sequence number and arranging the first order combination corresponding to each subframe sequence number in a second preset order. The first preset order is an ascending order of carrier sequence numbers or a descending order of carrier sequence numbers, and the second preset order is a front-to-back order of subframe moments or a back-to-front order of subframe moments.

For example, as shown in FIG. 5, the preconfigured downlink subframe set includes downlink subframes 4, 5, 6, and 8 of a carrier 1 to a carrier 10. The real-time scheduling downlink subframe subset includes 21 downlink subframes: the downlink subframes 4 of the carrier 1 to the carrier 7, the downlink subframes 5 of the carrier 1, the carrier 3, and the carrier 5, the downlink subframes 6 of the carrier 1 to the carrier 6, and the downlink subframes 8 of the carrier 1 to the carrier 5. In FIG. 5, four columns from left to right respectively represent the downlink subframes 4, the downlink subframes 5, the downlink subframes 6, and the downlink subframes 8, and 10 rows from top to bottom respectively represent the carrier 1 to the carrier 10.

With reference to FIG. 5, the downlink subframes whose sequence numbers are 4 in the real-time scheduling downlink subframe subset are arranged in an ascending order of carrier sequence numbers, to obtain a first order combination corresponding to the downlink subframes 4. The first order combination includes the downlink subframes 4 of the carrier 1 to the carrier 7, and corresponds to the first column in FIG. 5.

Similarly, a first order combination corresponding to the downlink subframes 5 includes the downlink subframes 5 of the carrier 1, the carrier 3, and the carrier 5, and corresponds to the second column in FIG. 5.

A first order combination corresponding to the downlink subframes 6 includes the downlink subframes 6 of the carrier 1 to the carrier 6, and corresponds to the third column in FIG. 5.

A first order combination corresponding to the downlink subframes 7 includes the downlink subframes 8 of the carrier 1 to the carrier 5, and corresponds to the fourth column in FIG. 5.

Subsequently, the first order combinations separately corresponding to the downlink subframes 4, the downlink subframes 5, the downlink subframes 6, and the downlink subframes 8 are arranged according to a front-to-back order of subframe moments, to eventually obtain a result of arranging the 21 downlink subframes in the real-time scheduling downlink subframe subset in the preset order: the downlink subframe 4 of the carrier 1, the downlink subframe 4 of the carrier 2, the downlink subframe 4 of the carrier 3, . . . , the downlink subframe 4 of the carrier 7, the downlink subframe 5 of the carrier 1, the downlink subframe 5 of the carrier 3, the downlink subframe 5 of the carrier 5, the downlink subframe 6 of the carrier 1, the downlink subframe 6 of the carrier 2, . . . , the downlink subframe 6 of the carrier 6, the downlink subframe 8 of the carrier 1, the downlink subframe 8 of the carrier 2, . . . , and the downlink subframe 8 of the carrier 5.

Further, the value of the DAI index indicator corresponding to each downlink subframe in the real-time scheduling downlink subframe subset is: a count value obtained by performing an accumulative count on each downlink subframe according to the result of the foregoing arrangement. That is, according to the foregoing arrangement, values of DAI index indicators of the downlink subframe 4 of the carrier 1 to the downlink subframe 8 of the carrier 5 are respectively 1, 2, 3, . . . , and 21.

However, two bits are generally used for a DAI index indicator, and there are only four states: 00, 01, 10, and 11. Count values for an accumulative count corresponding to the four states are respectively 1, 2, 3, and 4. That is, only 4 values can be used to perform a count for a DAI index having two bits. Therefore, when a value for an actual accumulative count is greater than 4, a cyclic count may be performed, that is, 1, 2, 3, 4, 1(5), 2(6), 3(7), 4(8), . . . , and may be specifically represented by using a formula $Y=(X-1) \mod 4+1$, where X is an actually accumulated count value, for example, 1 to 8 described above, and Y is a value obtained after a cyclic modulo operation, that is, the foregoing corresponding 1, 2, 3, 4, 1, 2, 3, 4, . . . . Values of the DAI index indicators shown in FIG. 5 are values obtained after a cyclic modulo operation.

It should be noted that, the present invention does not limit a count manner in the example. For example, a cyclic accumulative count may further start from 0. In this case, according to the order in the foregoing example, the values of the DAI index indicators are respectively 0, 1, 2, 3, 0, 1, 2, 3, . . . .

The UE may determine, according to the DAI index indicators, whether some actually scheduled downlink shared channels are missed in detection. For example, if the UE continuously detects downlink shared channels in two downlink subframes whose DAI index indicators are 1 and 3, the UE may confirm that between moments of the two downlink subframes, the access network device further schedules a downlink shared channel in another downlink subframe. However, the UE misses the downlink shared channel in detection. For example, if the UE detects a downlink shared channel in the downlink subframe 4 of the carrier 1 and a downlink shared channel in the downlink subframe 4 of the carrier 3, and the two DAI index indicators are respectively 1 and 3, it may be determined that the UE misses, in detection, a downlink shared channel in a downlink subframe whose DAI index indicator is 2, that is, a downlink shared channel in the downlink subframe 4 of the carrier 2. Because the UE does not receive downlink data on the downlink shared channel, during generation of a codebook of feedback information, it is determined that feedback information corresponding to the downlink shared channel in the downlink subframe 4 of the carrier 2 is NACK information.

However, the UE cannot discover, according to two-bit DAI index indicators, that four continuous downlink shared channels are missed in detection. For example, values of DAI index indicators of downlink subframes to which two downlink shared channels continuously detected by the UE belong are respectively 2 and 3. In this case, even if the access network device actually schedules downlink shared channels in another four downlink subframes whose values of DAI index indicators are respectively 3, 4, 1, and 2, because the values 2 and 3 of the DAI index indicators detected by the UE are continuous, the UE cannot discover that the UE misses these channels in detection. Generally, a probability that the UE continuously misses four downlink shared channels in detection is relatively low.

In addition, if the UE misses, in detection, one or more downlink shared channels that are scheduled in a downlink subframe at the last moment in the real-time scheduling downlink subframe subset, the UE cannot discover the foregoing situation by using a DAI index indicator. Therefore, the UE needs to determine, by using both a DAI total quantity indicator and a DAI index indicator, whether last several downlink shared channels are missed in detection. In this embodiment of the present invention, nine value results of the DAI total quantity indicator are provided below. In the following method, the first information may be any one of the following information:

1. a downlink shared channel;
2. a transport block on a downlink shared channel; and
3. a transport block corresponding to a transmission mode configured for a downlink carrier to which a downlink shared channel belongs.

The nine value results of the DAI total quantity indicator are provided below.

A value result 1 of the DAI total quantity indicator:

In the real-time scheduling downlink subframe subset, a value of a DAI total quantity indicator of each downlink subframe in a first order combination corresponding to a current subframe sequence number is: a total quantity of first information scheduled in the downlink subframes in the first order combination corresponding to the current subframe sequence number.

A value of the DAI index indicator and the first value of the DAI total quantity indicator are shown in FIG. 6, where the value of the DAI index indicator is on the left side of "/", and the value of the DAI total quantity indicator is on the right side of "/". For example, a value of a DAI index indicator of the downlink subframe 4 of the carrier 1 is 1, and a value of a DAI total quantity indicator is 2.

In FIG. 6, the example in which the preconfigured downlink subframe set includes the downlink subframes 4, 5, 6, and 8 of the carrier 1 to the carrier 10, and the real-time scheduling downlink subframe subset includes the downlink subframes 4 of the carrier 1 to the carrier 7, the downlink subframes 5 of the carrier 1, the carrier 3, and the carrier 5, the downlink subframes 6 of the carrier 1 to the carrier 6, and the downlink subframes 8 of the carrier 1 to the carrier 5 is still used. In FIG. 6, the four columns from left to right sequentially represent the downlink subframes 4, the downlink subframes 5, the downlink subframes 6, and the downlink subframes 8, and the 10 rows from top to bottom sequentially represent the carrier 1 to the carrier 10.

In FIG. 6, it can be learnt that a quantity of first information scheduled in downlink subframes in a first order combination corresponding to the downlink subframes 4 is three. Specifically, it may be understood that a total quantity of first information scheduled in the downlink subframes 4 of the carrier 1 to the carrier 7 is three, and therefore, a value of a DAI total quantity indicator of each downlink subframe in the first order combination corresponding to the downlink subframes 4 is 3. A value of a DAI total quantity indicator of each downlink subframe in a first order combination corresponding to the downlink subframes 5 is 3. A value of a DAI total quantity indicator of each downlink subframe in a first order combination corresponding to the downlink subframes 6 is 2. A value of a DAI total quantity indicator of each downlink subframe in a first order combination corresponding to the downlink subframes 8 is 1.

It should be further noted that, if two bits are also used for the DAI total quantity indicator, a cyclic modulo operation also needs to be performed on an actual value of the DAI total quantity indicator. A formula of the cyclic modulo operation is: $Y=(X-1) \bmod 4+1$, where X is an actual value of the DAI total quantity, Y is a value obtained after the cyclic modulo operation. For example, assuming that a value of a DAI total quantity indicator of the downlink subframe 4 of the carrier 1 is 9, a value obtained after the cyclic modulo operation is 3.

For this embodiment of the present invention, the UE may determine, according to the value of the DAI index indicator and the value result 1 of the DAI total quantity indicator, whether first information scheduled in a downlink subframe in the real-time scheduling downlink subframe subset is missed in detection, so as to restore a codebook of more complete feedback information.

A value result 2 of the DAI total quantity indicator:

In the real-time scheduling downlink subframe subset, a value of a DAI total quantity indicator of each downlink subframe in a first order combination corresponding to a current subframe sequence number is: a sum of a current quantity and a historical quantity. The current quantity is a total quantity of first information scheduled in the downlink subframes in the first order combination corresponding to the current subframe sequence number. The historical quantity is a total quantity of first information scheduled in each downlink subframe in first order combinations separately corresponding to subframe sequence numbers of all downlink subframes before a subframe moment of the current subframe sequence number in the real-time scheduling downlink subframe subset.

A value of the DAI index indicator and the second value of the DAI total quantity indicator are shown in FIG. 7, where the value of the DAI index indicator is on the left side of "/", and the value of the DAI total quantity indicator is on the right side of "/". Using an example in which the current subframe sequence number is 6, when a value of a DAI total quantity indicator of each downlink subframe in a first order combination corresponding to the subframe sequence number 6 is determined, the current quantity is a total quantity of first information scheduled in downlink subframes in the first order combination corresponding to the downlink subframes 6, and the historical quantity is a total quantity of first information that is scheduled in downlink subframes in a first order combination corresponding to the downlink subframes 4 and downlink subframes in a first order combination corresponding to the downlink subframes 5.

It should be noted that, because no other downlink subframe exists before a moment of the downlink subframes 4 in the real-time scheduling downlink subframe subset, a value of a DAI total quantity indicator of each downlink subframe in the first order combination corresponding to the downlink subframes 4 is a total quantity of first information scheduled in the downlink subframes in the first order combination corresponding to the downlink subframes 4.

For example, a total quantity of first information scheduled in the downlink subframes in the first order combination corresponding to the downlink subframes 4 is three, a total quantity of first information scheduled in downlink subframes in a first order combination corresponding to the downlink subframes 5 is three, a total quantity of first information scheduled in downlink subframes in a first order combination corresponding to the downlink subframes 6 is two, and a total quantity of first information scheduled in downlink subframes in a first order combination corresponding to the downlink subframes 8 is one.

Further, as may be known according to the method for determining the value of the DAI total quantity indicator, a value of a DAI total quantity indicator of each downlink subframe in the first order combination corresponding to the downlink subframes 4 is 3, a value of a DAI total quantity indicator of each downlink subframe in the first order combination corresponding to the downlink subframes 5 is 3+3=6, a value of a DAI total quantity indicator of each downlink subframe in the first order combination corresponding to the downlink subframes 6 is 3+3+2=8, and a value of a DAI total quantity indicator of each downlink subframe in the first order combination corresponding to the downlink subframes 8 is 3+3+2+1=9.

In FIG. 7, an example in which two bits are used for a DAI total quantity indicator is also used. A formula Y=(X−1) mod 4+1 is used to perform a cyclic modulo operation on the actual values of the DAI total quantity indicators. In this case, Y4=3, Y5=(6−1) mod 4+1=2, Y6=(8−1) mod 4+1=4, and Y8=(9−1) mod 4+1=1.

For this embodiment of the present invention, the UE may determine, according to the value of the DAI index indicator and the value result 1 of the DAI total quantity indicator, whether first information scheduled in a downlink subframe that is not at the last moment in the real-time scheduling downlink subframe subset is missed in detection, so as to restore a codebook of more complete feedback information.

A value result 3 of the DAI total quantity indicator:

In the real-time scheduling downlink subframe subset, a value of a DAI total quantity indicator of each downlink subframe in a first order combination corresponding to a current subframe sequence number is: a sum of a current quantity and a future quantity. The current quantity is a total quantity of first information scheduled in the downlink subframes in the first order combination corresponding to the current subframe sequence number. The future quantity is a total quantity of first information scheduled in downlink subframes in a first order combination corresponding to a subframe sequence number of a downlink subframe at a next moment of a subframe with the current subframe sequence number in the real-time scheduling downlink subframe subset.

A value of the DAI index indicator and the third value of the DAI total quantity indicator are shown in FIG. 8. The value of the DAI index indicator is on the left side of "/", and the value of the DAI total quantity indicator is on the right side of "/". Using an example in which the current subframe sequence number is 6, when a value of a DAI total quantity indicator of each downlink subframe in a first order combination corresponding to the subframe sequence number 6 is determined, the current quantity is a total quantity of first information scheduled in downlink subframes in the first order combination corresponding to the downlink subframes 6. The future quantity is a total quantity of first information scheduled in downlink subframes in a first order combination corresponding to the downlink subframes 8.

It should be noted that, because no other downlink subframe exists after a moment of the downlink subframes 8 in the real-time scheduling downlink subframe subset, a value of a DAI total quantity indicator of each downlink subframe in the first order combination corresponding to the downlink subframes 8 includes only a total quantity of first information scheduled in the downlink subframes in the first order combination corresponding to the downlink subframes 8.

For example, a total quantity of first information scheduled in downlink subframes in a first order combination corresponding to the downlink subframes 4 is three, a total quantity of first information scheduled in downlink subframes in a first order combination corresponding to the downlink subframes 5 is three, a total quantity of first information scheduled in the downlink subframes in the first order combination corresponding to the downlink subframes 6 is two, and a total quantity of first information scheduled in the downlink subframes in the first order combination corresponding to the downlink subframes 8 is one.

Further, as may be known according to the method for determining the value of the DAI total quantity indicator, a value of a DAI total quantity indicator of each downlink subframe in the first order combination corresponding to the downlink subframes 4 is 3+3=6, a value of a DAI total quantity indicator of each downlink subframe in the first order combination corresponding to the downlink subframes 5 is 3+2=5, a value of a DAI total quantity indicator of each downlink subframe in the first order combination corresponding to the downlink subframes 6 is 2+1=3, and a value of a DAI total quantity indicator of each downlink subframe in the first order combination corresponding to the downlink subframes 8 is 1.

In FIG. 8, an example in which two bits are used for a DAI total quantity indicator is also used. A formula Y=(X−1) mod 4+1 is used to perform a cyclic modulo operation on the actual values of the DAI total quantity indicators. In this case, Y4=(6−1) mod 4+1=2, Y5=(5−1) mod 4+1=1, Y6=3, and Y8=1.

For this embodiment of the present invention, according to the value result 3 of the DAI total quantity indicator, the UE may not only discover that first information scheduled in a downlink subframe in a first order combination corresponding to a downlink subframe that is not at the last moment in the real-time scheduling downlink subframe subset is missed in detection, but also may discover that first information scheduled in a downlink subframe in a first order combination corresponding to a downlink subframe at the last moment is missed in detection, so as to restore a codebook of more complete feedback information. With reference to FIG. 8, if first information scheduled in the downlink subframes 8 of the carrier 1 to the carrier 5 is all missed by the UE in detection, the UE cannot obtain the value of the DAI total quantity indicator corresponding to the downlink subframes 8. When the UE determines, by detecting the first information, that a total quantity scheduled in the downlink subframes in the first order combination corresponding to the downlink subframes 6 is two, but the value of the DAI total quantity indicator that is corresponding to the downlink subframes 6 and that is received by the UE is 3, it may be inferred that the UE misses first information in one downlink subframe in detection. That is, it may be determined that first information scheduled in a downlink subframe in a first order combination corresponding to a downlink subframe at the last moment in the real-time scheduling downlink subframe subset is missed in detection.

A value result 4 of the DAI total quantity indicator:

In the real-time scheduling downlink subframe subset, a value of a DAI total quantity indicator of each downlink subframe in a first order combination corresponding to a current subframe sequence number is: a sum of a current quantity, a historical quantity, and a future quantity. The current quantity is a total quantity of first information scheduled in the downlink subframes in the first order combination corresponding to the current subframe sequence number. The historical quantity is a total quantity of first information scheduled in each downlink subframe in first order combinations separately corresponding to all subframe sequence numbers before a subframe moment of the current subframe sequence number in the real-time scheduling downlink subframe subset. The future quantity is a total quantity of first information scheduled in downlink subframes in a first order combination corresponding to a subframe sequence number of a downlink subframe at a next moment of a subframe with the current subframe sequence number in the real-time scheduling downlink subframe subset.

A value of the DAI index indicator and the fourth value of the DAI total quantity indicator are shown in FIG. 9. The value of the DAI index indicator is on the left side of "/", and the value of the DAI total quantity indicator is on the right side of "/". Using an example in which the current subframe sequence number is 6, when a value of a DAI total quantity indicator of each downlink subframe in a first order combination corresponding to the subframe sequence number 6 is determined, the current quantity is a total quantity of first information scheduled in downlink subframes in the first order combination corresponding to the downlink subframes 6, the historical quantity is a total quantity of first information that is scheduled in downlink subframes in a first order combination corresponding to the downlink subframes 4 and downlink subframes in a first order combination corresponding to the downlink subframes 5, and the future quantity is a total quantity of first information scheduled in downlink subframes in a first order combination corresponding to the downlink subframes 7.

It should be noted that, because no other downlink subframe exists before a moment of the downlink subframes 4 in the real-time scheduling downlink subframe subset, a value of a DAI total quantity indicator of each downlink subframe in the first order combination corresponding to the downlink subframes 4 is a sum of a total quantity of first information scheduled in the downlink subframes in the first order combination corresponding to the downlink subframes 4, and a total quantity of first information scheduled in downlink subframes in the first order combination corresponding to the downlink subframes 5.

In addition, because no other downlink subframe exists after a moment of the downlink subframes 8 in the real-time scheduling downlink subframe subset, a value of a DAI total quantity indicator of each downlink subframe in a first order combination corresponding to the downlink subframes 8 is a sum of a total quantity of first information scheduled in the downlink subframes in the first order combination corresponding to the downlink subframes 7, and a total quantity of first information scheduled in the downlink subframes in the first order combination corresponding to the downlink subframes 8.

For example, a total quantity of first information scheduled in downlink subframes in the first order combination corresponding to the downlink subframes 4 is three, a total quantity of first information scheduled in downlink subframes in the first order combination corresponding to the downlink subframes 5 is three, a total quantity of first information scheduled in downlink subframes in the first order combination corresponding to the downlink subframes 6 is two, and a total quantity of first information scheduled in downlink subframes in the first order combination corresponding to the downlink subframes 8 is one.

Further, as may be known according to the method for determining the value of the DAI total quantity indicator, a value of a DAI total quantity indicator of each downlink subframe in the first order combination corresponding to the downlink subframes 4 is 3+3=6, a value of a DAI total quantity indicator of each downlink subframe in the first order combination corresponding to the downlink subframes 5 is 3+3+2=8, a value of a DAI total quantity indicator of each downlink subframe in the first order combination corresponding to the downlink subframes 6 is 3+2+1=6, and a value of a DAI total quantity indicator of each downlink subframe in the first order combination corresponding to the downlink subframes 8 is 2+1=3.

In FIG. 9, an example in which two bits are used for a DAI total quantity indicator is also used. The formula $Y=(X-1) \bmod 4+1$ is used to perform a cyclic modulo operation on the actual values of the DAI total quantity indicators. In this case, $Y4=(6-1) \bmod 4+1=2$, $Y5=(8-1) \bmod 4+1=4$, $Y6=(6-1) \bmod 4+1=2$, and $Y8=3$.

For this embodiment of the present invention, because the value of the DAI total quantity indicator includes both the historical quantity and the future quantity, the UE may discover, according to the value result 4 of the DAI total quantity indicator, that first information scheduled in a downlink subframe in a first order combination corresponding to a downlink subframe that is not at the last moment in the real-time scheduling downlink subframe subset is missed in detection, and that first information scheduled in a downlink subframe in a first order combination corresponding to a downlink subframe at the last moment is missed in detection, so as to restore a codebook of more complete feedback information.

It should be noted that, according to the foregoing value results 1 to 4 of the DAI total quantity indicator, when the value of the DAI total quantity indicator is determined, the downlink shared channel involved in the first information described above may include or not include a second downlink shared channel. This is not limited in the present invention. Because the second downlink shared channel is not scheduled in real time, but instead, a period of sending data and a subframe location are predetermined, whether the DAI total quantity indicator is counted does not affect a result.

It should be further noted that, if the access network device needs to send data by using a special downlink control channel, the value of the DAI total quantity indicator further includes a quantity of special downlink control channels. Generally, the quantity of special downlink control channels is one.

Figure 10:
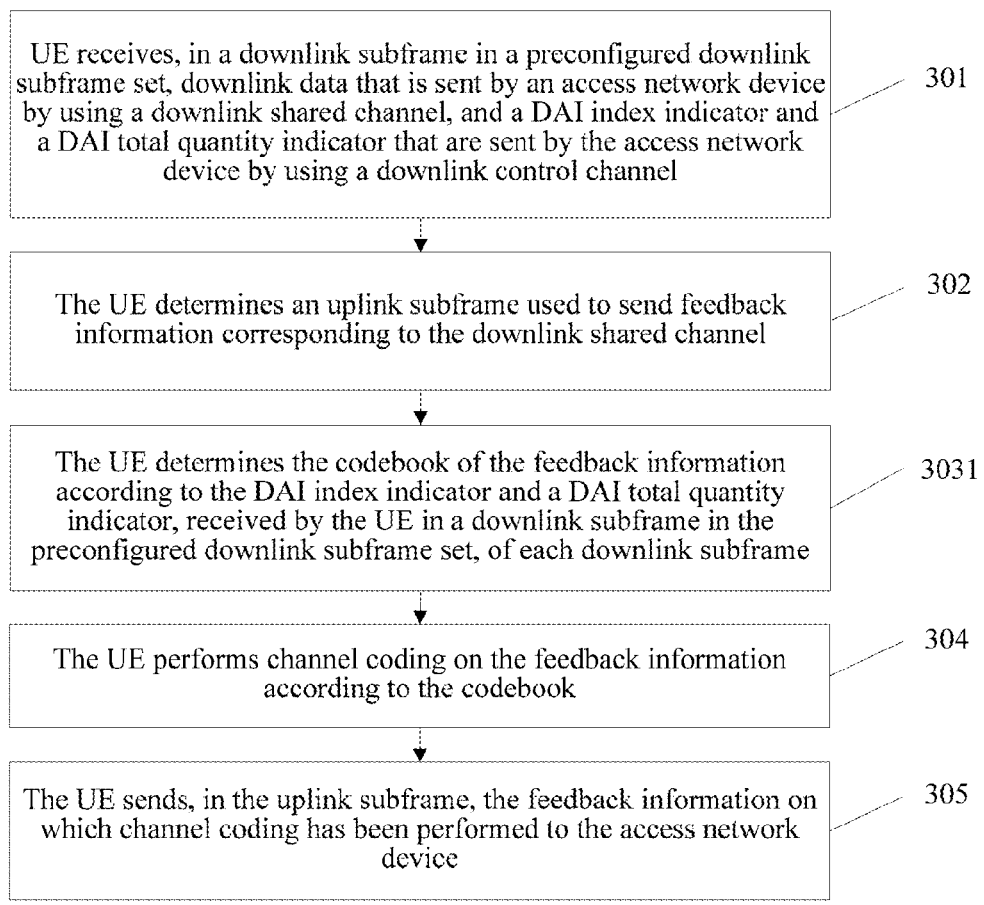
FIG. 10 is a flowchart of another method for sending feedback information according to an embodiment of the present invention.

In another implementation manner provided in this embodiment of the present invention, when the value result 1 or the result 3 of the DAI total quantity indicator is used, as shown in FIG. 10, the foregoing step 303 of determining, by the UE, a codebook of feedback information according to the DAI index indicator and the DAI total quantity indicator may be specifically implemented as step 3031.

3031: The UE determines the codebook of the feedback information according to the DAI index indicator and a DAI total quantity indicator, received by the UE in a downlink subframe in the preconfigured downlink subframe set, of each downlink subframe.

For the foregoing result 1 and result 3, because a historical quantity is not considered when a value of the DAI total quantity indicator is determined, the UE needs to determine the codebook of the feedback information according to the DAI total quantity indicator, received in the downlink subframe in the preconfigured downlink subframe set, of each downlink subframe. Moreover, the ACK/NACK codebook sent by the UE to the access network device corresponds to some downlink subframes in the real-time scheduling downlink subframe subset by means of the result 1 or the result 3. For example, if the UE misses all PDCCHs in the subframe 8 in detection, the UE may determine ACK/NACK codebooks corresponding to the subframes 4, 5, and 6, and further send feedback information corresponding to the codebooks to the access network device.

Figure 11:
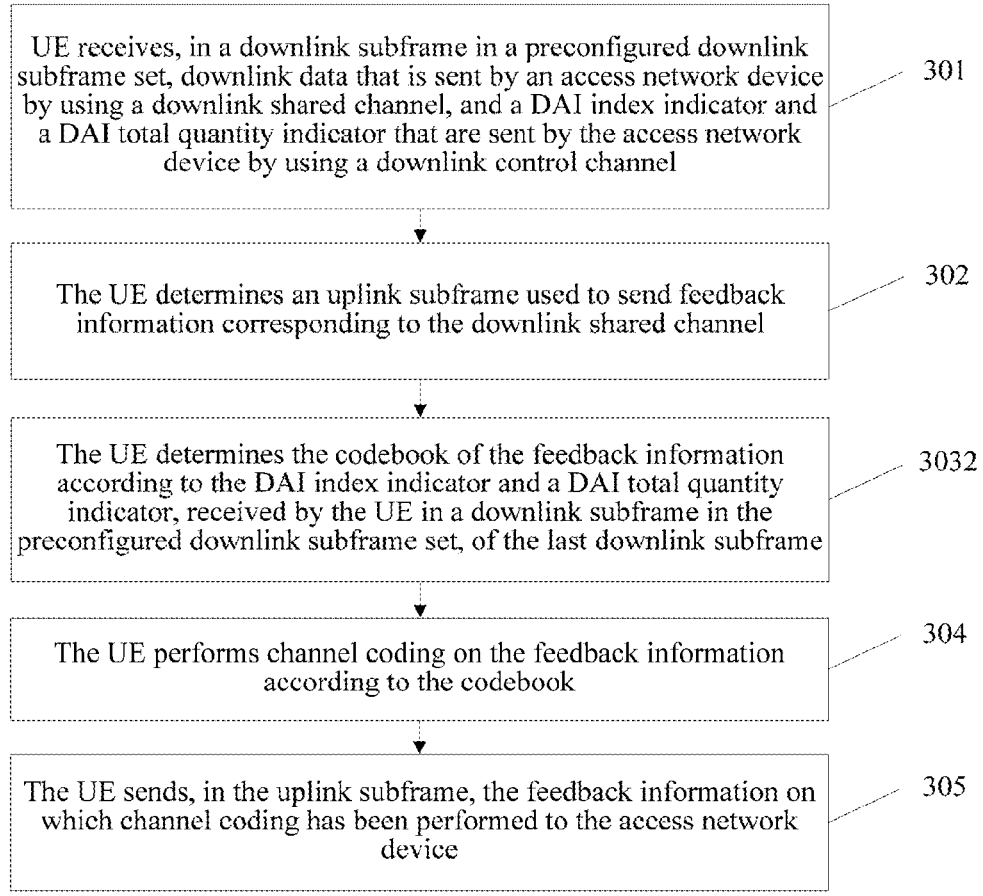
FIG. 11 is a flowchart of another method for sending feedback information according to an embodiment of the present invention.

In another implementation manner provided in this embodiment of the present invention, when the value result 2 or the value result 4 of the DAI total quantity indicator is used, as shown in FIG. 11, the foregoing step 303 of determining, by the UE, a codebook of feedback information according to the DAI index indicator and the DAI total quantity indicator may be specifically implemented as step 3032.

3032: The UE determines the codebook of the feedback information according to the DAI index indicator and a DAI total quantity indicator, received by the UE in a downlink subframe in the preconfigured downlink subframe set, of the last downlink subframe.

For the foregoing result 2 and result 4, in the real-time scheduling downlink subframe subset, a value of a DAI total quantity indicator of each downlink subframe includes a total quantity of first information scheduled in a downlink subframe before a moment of the downlink subframe. Therefore, the UE can determine, only according to a DAI total quantity indicator of the last received downlink subframe, whether first information is missed in detection, so as to generate a codebook of feedback information. The ACK/NACK codebook sent by the UE to the access network device corresponds to some downlink subframes in the real-time scheduling downlink subframe subset by means of the result 2 or result 4. For example, if the UE misses all PDCCHs in the subframe 8 in detection, the UE may determine the ACK/NACK codebooks corresponding to the subframes 4, 5, and 6, and further send feedback information corresponding to the codebooks to the access network device.

The value results 5 to 8 of the DAI total quantity indicator continue to be described below. For the value results 5 to 8 of the DAI total quantity indicator, an example in which the real-time scheduling downlink subframe subset includes the downlink subframes 4 of the carrier 1 to the carrier 7, the downlink subframes 5 of the carrier 1, the carrier 3, and the carrier 5, the downlink subframes 6 of the carrier 5 and the carrier 6, and the downlink subframes 8 of the carrier 1 to the carrier 8 is used for description.

A value result 5 of the DAI total quantity indicator:

Values of DAI total quantity indicators corresponding to the last, the second-to-last, . . . , and the $X^{th}$-to-last downlink subframes that are arranged in a preset order in the real-time scheduling downlink subframe subset are respectively preset values $A_X, A_{X-1}, \ldots ,$ and $A_1$, and values of DAI total quantity indicators corresponding to the other downlink subframes in the real-time scheduling downlink subframe subset are all set to a preset value $A_0$, where X is a natural number greater than 1.

A value of the DAI index indicator and the fifth value of the DAI total quantity indicator are shown in FIG. 12. The value of the DAI index indicator is on the left side of "/", and the value of the DAI total quantity indicator is on the right side of "/". In FIG. 12, using X=4 as an example, values of DAI total quantity indicators corresponding to the last to the fourth-to-last downlink subframes that are arranged in a preset order in the real-time scheduling downlink subframe subset are respectively 4, 3, 2, and 1. Values of DAI total quantity indicators corresponding to the other downlink subframes in the real-time scheduling downlink subframe subset are 1.

When two bits are used for the DAI total quantity indicator, X is generally set to 4. In this case, values of DAI total quantity indicators corresponding to the last to the fourth-to-last downlink subframes arranged in a preset order in the real-time scheduling downlink subframe subset are respectively 4, 3, 2, and 1, or are respectively 1, 2, 3, and 4. Alternatively, X may be set to 3, and preset values A3, A2, A1 are respectively 4, 3, and 2, or are respectively 2, 3, and 4. This embodiment of the present invention is not limited to the above listed values of X and preset values $A_X, A_{X-1}, \ldots , A_1,$ and $A_0$, and X and the preset values $A_X, A_{X-1}, \ldots , A_1,$ and $A_0$ may further be other preset values.

For this embodiment of the present invention, the UE may discover, according to the DAI index indicator, an error event of missing a subframe other than a trailing subframe in the real-time scheduling downlink subframe subset in detection, and may discover, according to the DAI total quantity indicator, an error event of missing the trailing subframe in the real-time scheduling downlink subframe subset in detection. For example, if the UE misses the downlink subframe 8 of the carrier 7 in detection, and detects that the value of the DAI total quantity indicator of the downlink subframe 8 of the carrier 6 is 2 and that the value of the DAI total quantity indicator of the downlink subframe 8 of the carrier 8 is 4, the UE may determine that the access network device further schedules the downlink subframe 8 of the carrier 7, but the downlink subframe 8 of the carrier 7 is missed in detection, so as to determine that feedback information corresponding to the downlink subframe 8 of the carrier 7 is NACK information. Therefore, the order of the feedback information corresponding to the detected first information may be determined according to the DAI index indicator and the DAI total quantity indicator, and the feedback information of the first information that is missed in detection is determined, so as to restore a codebook of more complete feedback information.

A value result 6 of the DAI total quantity indicator:

Values of DAI total quantity indicators corresponding to the last, the second-to-last, . . . , and the $X^{th}$-to-last downlink subframes that are arranged in a first preset order among downlink subframes having a same sequence number in the real-time scheduling downlink subframe subset are respectively: preset values $A_X, A_{X-1}, \ldots ,$ and $A_1$, and values of DAI total quantity indicators corresponding to the other downlink subframes of the downlink subframes having the same sequence number are all set to a preset value $A_0$, where X is a natural number greater than 1.

A value of the DAI index indicator and the sixth value of the DAI total quantity indicator are shown in FIG. 13. The value of the DAI index indicator is on the left side of "/", and the value of the DAI total quantity indicator is on the right side of "/". In FIG. 13, an example in which X=4 and the first preset order is an ascending order of carrier sequence numbers is used. It may be understood that, the first order combination is obtained by arranging downlink subframes having a same sequence number in the first preset order, and values of DAI total quantity indicators corresponding to the last to the fourth-to-last downlink subframes in a first order combination corresponding to each downlink subframe are respectively 4, 3, 2, and 1. Because a first order combination corresponding to the downlink subframes 5 includes downlink subframes 5 of only three carriers, values of DAI total quantity indicators corresponding to the last to the third-to-last downlink subframes are respectively 4, 3, and 2. A first order combination corresponding to the downlink subframes 6 includes downlink subframes 6 of only two carriers. Therefore, a value of a DAI total quantity indicator of the downlink subframe 6 of the carrier 6 is 4, and a value of a DAI total quantity indicator of the downlink subframe 6 of the carrier 5 is 5.

In addition, after the downlink subframes having the same sequence number are arranged in the first preset order, values of DAI total quantity indicators of downlink subframes other than the last to the $X^{th}$-to-last downlink subframes may be set to 1, or may be set to another predefined value.

For this embodiment of the present invention, the UE may discover, according to the DAI index indicator, an error event of missing a subframe other than a trailing subframe in the real-time scheduling downlink subframe subset in detection, and discover, according to the DAI total quantity indicators corresponding to the last, the second-to-last, . . . , and the $X^{th}$-to-last downlink subframes of the downlink subframes having the same sequence number that are arranged in the first preset order, an error event of missing the trailing subframe in the real-time scheduling downlink subframe subset in detection. Therefore, a codebook of more complete feedback information may be restored according to the DAI index indicator and the DAI total quantity indicator.

It should be further noted that, in FIG. 13, assuming that the UE misses the downlink subframes 8 of the carrier 6 to the carrier 8 in detection, but the UE receives a DAI total quantity indicator corresponding to the downlink subframe 6 of the carrier 6, the UE may restore, according to the DAI total quantity indicator, a codebook of feedback information of the downlink subframe 6 of the carrier 6 and that of a downlink subframe before the downlink subframe 6 in the real-time scheduling downlink subframe subset, then feed back these codebooks to a base station, and temporarily discard a codebook of feedback information corresponding to a downlink subframe in a first order combination corresponding to the downlink subframes 8.

A value result 7 of the DAI total quantity indicator:

A value of a DAI total quantity indicator corresponding to each downlink subframe in the real-time scheduling downlink subframe subset is: a count value obtained by performing a count on the subframes in the real-time scheduling downlink subframe subset in a reverse order of the preset order in a preset count manner.

The preset count manner may be an ascending count or a descending count.

A value of the DAI index indicator and the seventh value of the DAI total quantity indicator are shown in FIG. 14. The value of the DAI index indicator is on the left side of "/", and the value of the DAI total quantity indicator is on the right side of "/". In FIG. 14, an example in which the preset count manner is a descending count is used. With reference to the foregoing descriptions of the preset order, a result of arranging 20 downlink subframes in the real-time scheduling downlink subframe subset in the reverse order of the preset order is: the downlink subframe 8 of the carrier 8, the downlink subframe 8 of the carrier 7, . . . , the downlink subframe 8 of the carrier 1, the downlink subframe 6 of the carrier 6, the downlink subframe 6 of the carrier 5, the downlink subframe 5 of the carrier 5, the downlink subframe 5 of the carrier 3, the downlink subframe 5 of the carrier 1, the downlink subframe 4 of the carrier 7, the downlink subframe 4 of the carrier 6, . . . , and the downlink subframe 4 of the carrier 1.

Further, the value of the DAI total quantity indicator corresponding to each downlink subframe in the real-time scheduling downlink subframe subset is: a count value obtained by performing a descending count on each downlink subframe according to the foregoing arrangement result. That is, in the foregoing order, the values of the DAI total quantity indicators of the downlink subframe 8 of the carrier 8 to the downlink subframe 4 of the carrier 1 are respectively 20, 19, 18, . . . , and 1.

When two bits are used for the DAI total quantity indicator, a formula Y=(X−1) mod 4+1 is used to perform a cyclic modulo operation on the actual values of the DAI total quantity indicators. Specific values obtained after a cyclic modulo operation are shown in FIG. 14.

For this embodiment of the present invention, the UE may discover, according to the DAI index indicator, an error event of missing a subframe other than a trailing subframe in the real-time scheduling downlink subframe subset in detection. Subsequently, an ascending count or a descending count starts from the last downlink subframe based on the DAI total quantity indicator in a reverse order of a preset order according to an arrangement result. Therefore, the UE may discover, according to the DAI total quantity indicator, an event of missing the trailing subframe in the real-time scheduling downlink subframe subset in detection, or may help discover an error event of missing a subframe other than the trailing subframe in detection. Therefore, a codebook of more complete feedback information may be restored according to a DAI index indicator and a DAI total quantity indicator.

A value result 8 of the DAI total quantity indicator:

A value of a DAI total quantity indicator of each downlink subframe of downlink subframes having a same sequence number in the real-time scheduling downlink subframe subset that are arranged in a reverse order of a first preset order is: a count value obtained by performing, starting from a preset value, a count on the downlink subframes having the same sequence number in the real-time scheduling downlink subframe subset in the reverse order of the first preset order in a preset count manner.

A value of the DAI index indicator and the eighth value of the DAI total quantity indicator are shown in FIG. 15. The value of the DAI index indicator is on the left side of "/", and the value of the DAI total quantity indicator is on the right side of "/". An example in which the preset count manner is a descending count, the reverse order of the first preset order is a descending order of carrier sequence numbers, and the preset value is 8 is used. In the real-time scheduling downlink subframe subset, when downlink subframes whose sequence numbers are 4 are arranged in a descending order of carrier sequence numbers, values of DAI total quantity indicators of the downlink subframes are respectively: 8, 7, 6, 5, 4, 3, and 2. When two bits are used for the DAI total quantity indicator, a formula Y=(X−1) mod 4+1 is used to perform a cyclic modulo operation on the actual values of the DAI total quantity indicators, and specific values obtained after a cyclic modulo operation are 4, 3, 2, 1, 4, 3, and 2. Values of downlink subframes whose sequence numbers are 5, 6, and 8 in the real-time scheduling downlink subframe subset are specifically shown in FIG. 15.

A value result 9 of the DAI total quantity indicator:

The DAI total quantity indicator is used to indicate a quantity of bits in a HARQ-ACK codebook, and may also be referred to as a codebook volume or a codebook size. The codebook volume is less than a quantity of bits in a HARQ-ACK corresponding to the preconfigured downlink subframe set, but is greater than or equal to a quantity of downlink subframes in the real-time scheduling downlink subframe subset or a quantity of transport blocks. When the codebook volume is greater than the quantity of downlink subframes in the real-time scheduling downlink subframe subset or the quantity of transport blocks, the UE and the base station both determine that at least one NACK is padded at the end of the codebook. A specific quantity of padded NACKs is a pre-estimated quantity of bits in the codebook minus a quantity of downlink subframes that are in the real-time scheduling downlink subframe subset and in which downlink data is actually scheduled or the quantity of transport blocks.

For example, an example in which 10 carriers are configured for the UE, each carrier has a TDD uplink/downlink configuration 2, and the uplink subframe 2 corresponds to subframes 4, 5, 6, and 8 of the 10 carriers is still used. When the base station schedules downlink data for the UE in the subframe 4, it is pre-estimated that the quantity of downlink subframes in which downlink data is actually scheduled for the UE and that are in the real-time scheduling downlink subframe subset is X, where X meets the following formula: $[(X-1) \mod 4]+1=2$. Next, the base station performs scheduling for the UE in the subframes 5, 6, and 8. However, eventually, for a particular reason, the quantity of downlink subframes that are in the real-time scheduling downlink subframe subset and in which the downlink data is actually scheduled by the base station for the UE is 20. The foregoing reason includes a control channel capacity, a case in which a priority of another UE is higher than that of the UE or scheduling on an unauthorized carrier further depends on a load on the carrier, or the like. Because eventually the quantity of downlink subframes that are actually scheduled is 20, the actual value of X determined through pre-estimation may be eventually determined to be 22. Therefore, according to this rule, the UE and the base station both understand that in this case, the codebook volume of the HARQ-ACK codebook is 22 bits, where locations of the first 20 bits of the 22 bits correspond to the downlink subframes that are actually scheduled in the real-time scheduling downlink subframe subset, and NACKs are padded at locations of the last two bits. Alternatively, the base station eventually determines that the quantity of downlink subframes in the real-time scheduling downlink subframe subset in which downlink data is actually scheduled for the UE is 16, the foregoing X may be understood as 18, and NACKs are padded at locations of the last two bit of the HARQ-ACK codebook. For this embodiment, the base station may pre-estimate a codebook volume of one HARQ-ACK codebook, then after actual scheduling is performed for the UE in the real-time scheduling downlink subframe set, eventually determine locations of bits in a HARQ-ACK corresponding to downlink data that is actually scheduled in the HARQ-ACK codebook, and perform NACK padding processing at another location, so that a scheduling prediction problem is avoided, and the foregoing flexible parsing of X does not cause any limitation on the quantity of scheduled subframes. Alternatively, N values may be further pre-configured for the quantity of actually scheduled downlink subframes for the UE, where N is greater than 1. Subsequently, the DAI total quantity indicator is then used to dynamically select, from the foregoing N values, one value as a current volume of the HARQ-ACK codebook. In the solution, scheduling prediction may also not be needed. That is, a codebook volume is dynamically selected to perform NACK padding. However, this solution is not as flexible as the method in the foregoing embodiment, for the reason that once the dynamically selected codebook volume is determined, an actually scheduled downlink subframe can no longer be arbitrarily determined in the real-time scheduling downlink subframe subset of a current time.

For this embodiment of the present invention, the UE may discover, according to the DAI index indicator, an error event of missing a subframe other than a trailing subframe in the real-time scheduling downlink subframe subset in detection. DAI total quantity indicators are independently set for downlink subframes at different moments. After downlink subframes at a same moment are arranged in the reverse order of the first order, the downlink subframes are counted according to an arrangement result starting from the last downlink subframe. That is, a value of a DAI total quantity indicator of the last downlink subframe is determined. Therefore, an error event of missing a trailing subframe in detection may be discovered according to a value of a DAI total quantity indicator of the last received downlink subframe. In conclusion, according to the DAI index indicator and the DAI total quantity indicator, a codebook of complete feedback information may be restored, or a codebook of partial feedback information may be restored.

In the method for sending feedback information provided in this embodiment of the present invention, even if UE misses some downlink control channels in detection, the UE also can restore, according to a DAI index indicator and a DAI total quantity indicator, a codebook of feedback information corresponding to a real-time scheduling downlink subframe subset, or restore a codebook of partial feedback information. Because both the DAI index indicator and the DAI total quantity indicator are determined according to the real-time scheduling downlink subframe subset, the UE only needs to determine, according to the DAI index indicator and the DAI total quantity indicator, a codebook of feedback information corresponding to a downlink subframe actually scheduled by an access network device, and does not need to perform NACK padding in a downlink subframe that is not scheduled, thereby improving uplink resource utilization.

It should be noted that, the codebook of the feedback information determined by the UE may be a codebook of feedback information completely corresponding to the real-time scheduling downlink subframe subset, or may be a codebook of feedback information corresponding to some downlink subframes in the real-time scheduling downlink subframe subset. For example, with reference to FIG. 13, if the UE misses, in detection, downlink control channels scheduled in the downlink subframes 8 of the carrier 1 to carrier 8, the UE may determine, according to the DAI index indicator and the DAI total quantity indicator, a codebook of feedback information corresponding to the downlink subframes 4, 5, and 6, and report the codebook of the feedback information to the access network device.

The UE may send a codebook of only partial feedback information to the access network device, but the access network device does not know which downlink subframes the codebook of the partial feedback information specifically corresponds to. To make it convenient for the access network device to confirm, in a process of blind detection, a codebook of feedback information sent by the UE, before performing channel coding on the feedback information according to the codebook, the UE needs to add a CRC bit to the codebook of the feedback information, so that the access network device may confirm, by means of CRC check after decoding, different codebooks fed back by the UE.

Figure 16:
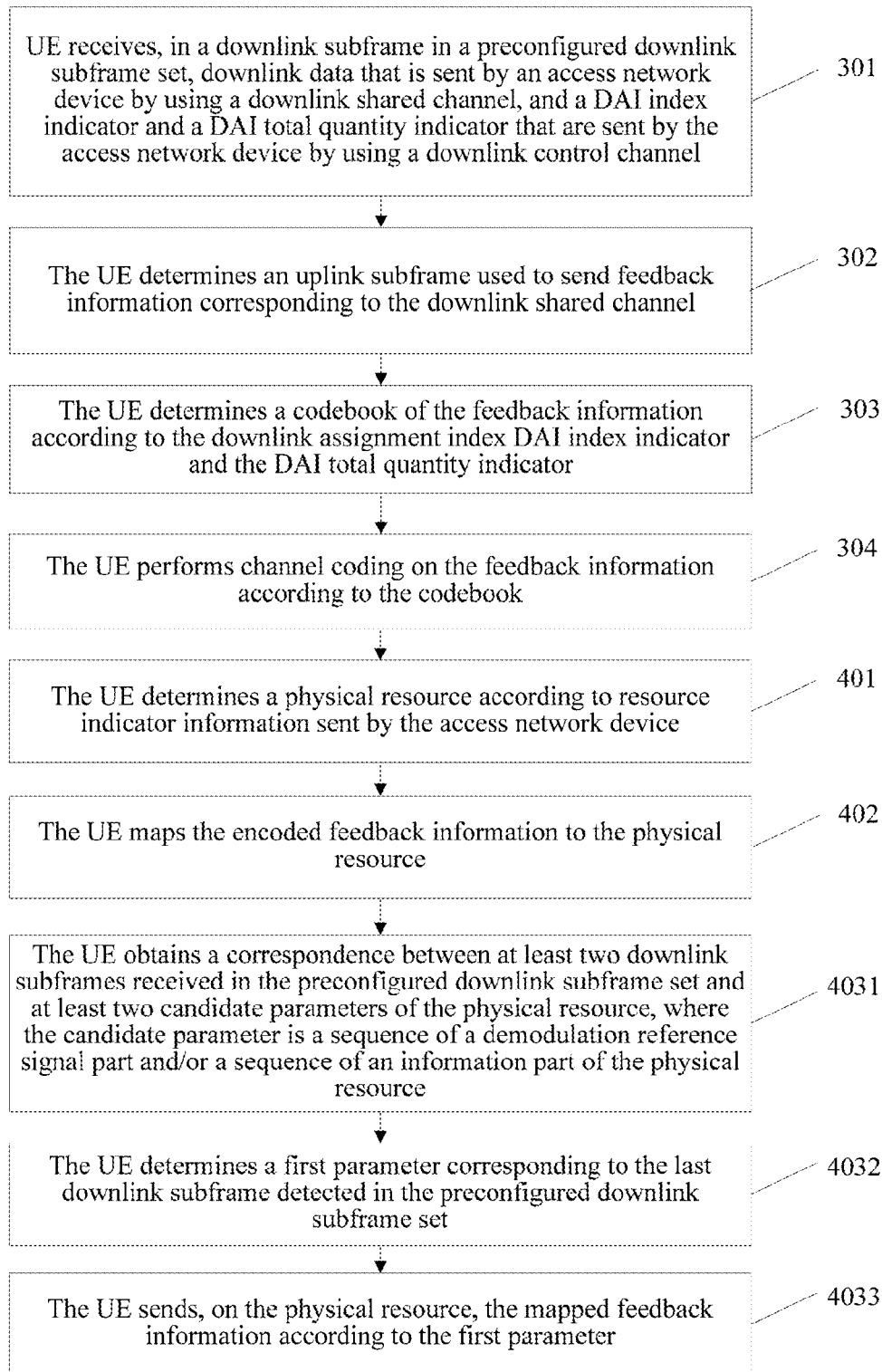
FIG. 16 is a flowchart of another method for sending feedback information according to an embodiment of the present invention.

To prevent the access network device from performing blind detection, in another implementation manner provided in this embodiment of the present invention, as shown in FIG. 16, the foregoing step 403 of sending, by the UE, the mapped feedback information to the access network device by using the physical resource in the uplink subframe may be specifically implemented as step 4031 to step 4033.

4031: The UE obtains a correspondence between at least two downlink subframes received in the preconfigured downlink subframe set and at least two candidate parameters of the physical resource, where the candidate parameter is a sequence of a DMRS (Demodulation Cover Code, demodulation reference signal) part and/or a sequence of an information part of the physical resource.

The sequence of the DMRS part may be a sequence of a DMRS part on a DMRS time-domain symbol of an uplink control channel. The sequence of the information part may be a spreading sequence on a time-domain symbol for transmitting feedback information on the uplink control channel.

4032: The UE determines a first parameter corresponding to the last downlink subframe detected in the preconfigured downlink subframe set.

The first parameter is one of the at least two candidate parameters that are determined in the foregoing step 4031.

It should be noted that, because the access network device schedules only a downlink subframe in the real-time scheduling downlink subframe subset, the last downlink subframe detected by the UE belongs to the real-time scheduling downlink subframe subset.

4033: The UE sends, on the physical resource, the mapped feedback information according to the first parameter.

In the method for sending feedback information provided in this embodiment of the present invention, when UE sends, in an uplink subframe, feedback information on which channel coding has been performed to an access network device, the UE first determines a first parameter corresponding to the last downlink subframe detected in a preconfigured downlink subframe set, and then sends, on a physical resource, mapped feedback information according to the first parameter, so that the access network device learns, by using the first parameter, downlink subframes corresponding to the feedback information sent by the UE, thereby decoding codebooks of feedback information corresponding to these downlink subframes.

Figure 17:
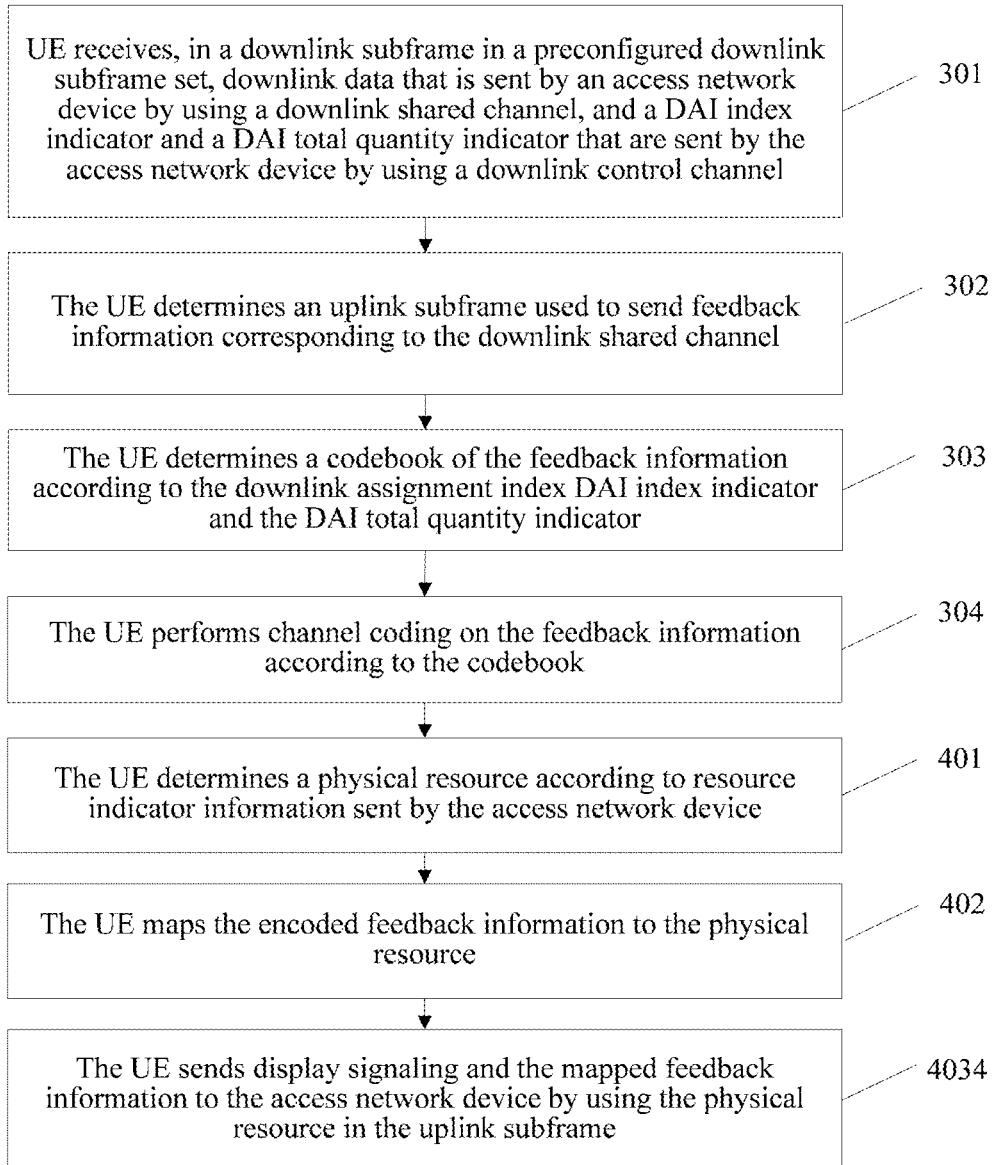
FIG. 17 is a flowchart of another method for sending feedback information according to an embodiment of the present invention.

This embodiment of the present invention further provides another implementation manner, so as to prevent the access network device from performing blind detection. As shown in FIG. 17, the foregoing step 403 of sending, by the UE, the mapped feedback information to the access network device by using the physical resource in the uplink subframe may be specifically implemented as step 4034.

4034: The UE sends display signaling and the mapped feedback information to the access network device by using the physical resource in the uplink subframe.

The display signaling is used to indicate, to the access network device, the last downlink subframe that is detected by the UE in the preconfigured downlink subframe set.

It may be understood that, the UE sends the display signaling to the access network device, so that the access network device may determine downlink subframes corresponding to the received feedback information, and further decode the feedback information corresponding to these downlink subframes. Therefore, even if the UE does not feed back codebooks of feedback information corresponding to all downlink subframes in the real-time scheduling downlink subframe subset, decoding performed on the received feedback information by the access network device is not affected.

This embodiment of the present invention further provides another implementation manner. Specifically, the access network device notifies, by using display signaling, for example, by using a field such as a UL_DAI field in a PDCCH that schedules a PUSCH, the UE of a sequence number of the last currently scheduled subframe. If sequence numbers of the last subframe received by the UE and the subframe notified by using the display signaling are consistent, the UE sends feedback information according to the method in the foregoing embodiment. If the sequence numbers are inconsistent, the UE may not send the feedback information. The access network device may determine, by performing energy detection on a physical resource of the feedback information, whether the UE sends the feedback information.

Figure 18:
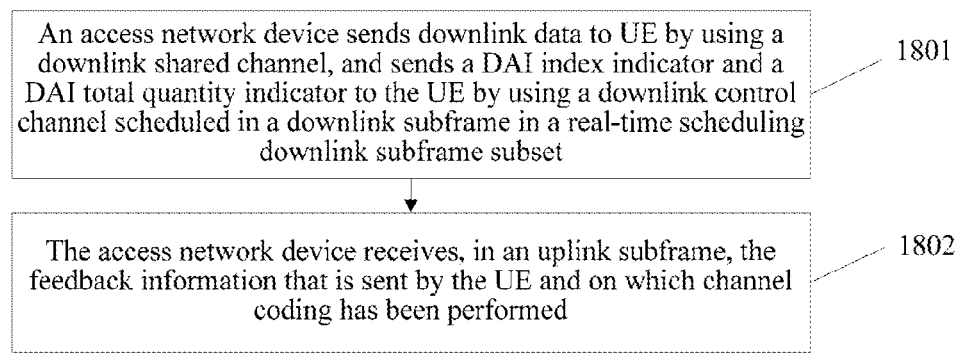
FIG. 18 is a flowchart of a method for receiving feedback information according to an embodiment of the present invention.

To improve uplink resource utilization, an embodiment of the present invention further provides a method for receiving feedback information. The method is applied to an access network device. The access network device may be a base station. It should be noted that, for content in this embodiment that is the same as that in the foregoing embodiment, refer to the foregoing descriptions, and details are no longer described in this embodiment. As shown in FIG. 18, the method includes the following steps:

1801: The access network device sends downlink data to UE by using a downlink shared channel, and sends a DAI index indicator and a DAI total quantity indicator to the UE by using a downlink control channel scheduled in a downlink subframe in a real-time scheduling downlink subframe subset, so that the UE determines a codebook of feedback information according to the DAI index indicator and the DAI total quantity indicator.

1802: The access network device receives, in an uplink subframe, the feedback information that is sent by the UE and on which channel coding has been performed.

It should be noted that, because the codebook of the feedback information corresponds to all or some downlink subframes in the real-time scheduling downlink subframe subset, the access network device can receive ACK information or NACK information of a downlink data channel in only an actually scheduled downlink subframe, and does not need to receive feedback information corresponding to a downlink data channel in a downlink subframe that is not scheduled, that is, NACK padding is not performed in the downlink subframe that is not scheduled.

It may be understood that, because there is a one-to-one correspondence between an uplink subframe and a preconfigured downlink subframe set, and the real-time scheduling downlink subframe subset belongs to the preconfigured downlink subframe set, in this step, the access network device needs to receive the feedback information corresponding to the real-time scheduling downlink subframe subset in an uplink subframe corresponding to the real-time scheduling downlink subframe subset.

For example, an uplink subframe 2 corresponds to a real-time scheduling downlink subframe subset 1, and an uplink subframe 7 corresponds to a real-time scheduling downlink subframe subset 2. In this case, the access network device needs to receive feedback information corresponding to the real-time scheduling downlink subframe subset 1 in the uplink subframe 2, and receive feedback information corresponding to the real-time scheduling downlink subframe subset 2 in the uplink subframe 7.

In another implementation manner, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to a pre-configured downlink subframe set. Optionally, the padding bit may be located after locations of bits in the HARQ-ACK corresponding to the downlink subframe in the real-time scheduling downlink subframe subset. The real-time scheduling downlink subframe subset is a set that consists of downlink subframes actually scheduled by the access network device, and the real-time scheduling downlink subframe subset belongs to the preconfigured downlink subframe set. In this embodiment, when a base station schedules downlink data in a downlink subframe, it is possible that the base station cannot accurately determine a quantity of downlink subframes that are in the real-time scheduling downlink subframe subset and in which downlink data is actually scheduled for the UE. Therefore, in this case, a quantity of bits in one HARQ-ACK codebook may be pre-estimated. When the quantity of downlink subframes that are in the real-time scheduling downlink subframe subset and in which downlink data is actually scheduled is eventually less than the pre-estimated quantity of bits in the codebook, the UE and the base station both determine that at least one NACK is padded at the end of the codebook. A specific quantity of padded NACKs is the pre-estimated quantity of bits in the codebook minus the quantity of downlink subframes that are in the real-time scheduling downlink subframe subset and in which downlink data is actually scheduled or a quantity of transport blocks in the downlink subframe.

In the method for receiving feedback information provided in this embodiment of the present invention, an access network device sends downlink data to UE by using a downlink shared channel, and sends a DAI index indicator and a DAI total quantity indicator to the UE by using a downlink control channel scheduled in a downlink subframe in a real-time scheduling downlink subframe subset, so that the UE determines a codebook of feedback information according to the DAI index indicator and the DAI total quantity indicator. Subsequently, the access network device receives, in an uplink subframe, the feedback information that is sent by the UE and on which channel coding has been performed. Compared with the prior art in which a large quantity of NACKs need to be padded to encode feedback information according to a preconfigured downlink subframe set, causing low uplink resource utilization, in the present invention, after the access network device sends the DAI index indicator and the DAI total quantity indicator to the UE, channel coding is performed on the received feedback information according to the codebook of the feedback information, and the codebook of the feedback information corresponds to all or some downlink subframes in the real-time scheduling downlink subframe subset. Therefore, the access network device needs to receive feedback information corresponding to a downlink shared channel in only an actually scheduled downlink subframe, and does not need to perform NACK padding in a downlink subframe that is not scheduled. Therefore, an uplink resource is not occupied, thereby improving uplink resource utilization.

With reference to the foregoing descriptions, because a case in which a downlink shared channel includes a first downlink channel and a second downlink shared channel exists, after an SPS mechanism is activated, the access network device periodically sends downlink data by using the second downlink shared channel. To disable the SPS mechanism according to an actual case, in another implementation manner provided in this embodiment of the present invention, in a process in which the access network device periodically sends the downlink data by using the second downlink shared channel, the access network device further needs to schedule a special downlink control channel. The special downlink control channel is used to enable the access network device to terminate sending of the downlink data by using the second downlink shared channel.

It should be noted that, if the access network device schedules the special downlink control channel, ACK information or NACK information of the special downlink control channel further needs to be received. Therefore, when the access network device schedules the downlink control channel, the real-time scheduling downlink subframe subset further includes a downlink subframe of the special downlink control channel.

Figure 19:
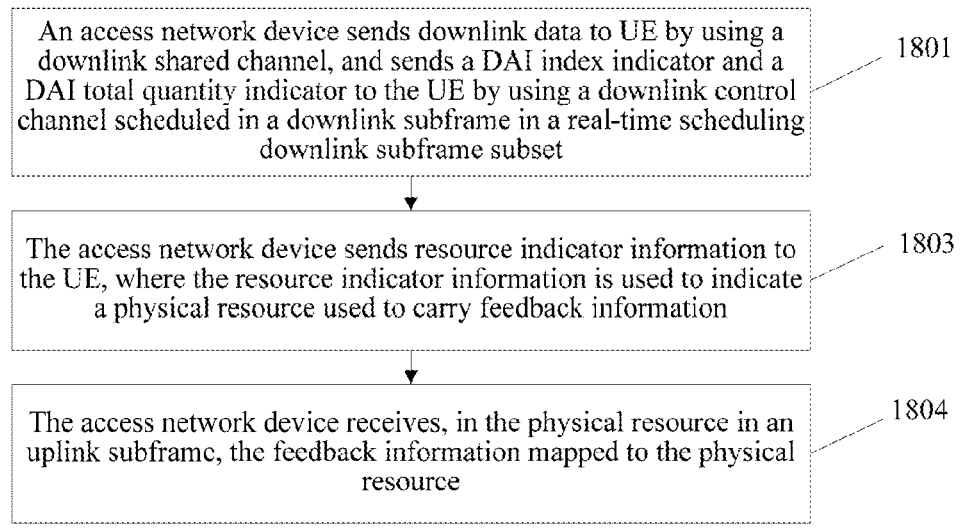
FIG. 19 is a flowchart of another method for receiving feedback information according to an embodiment of the present invention.

With reference to the method procedure shown in FIG. 18, when receiving the feedback information, the access network device needs to specify, for the UE, a physical resource used to carry the feedback information. Therefore, in another implementation manner provided in this embodiment of the present invention, as shown in FIG. 19, the foregoing step 1802 of receiving, by the access network device in an uplink subframe, the feedback information that is sent by the UE and on which channel coding has been performed may be specifically implemented as step 1803 and step 1804.

1803: The access network device sends resource indicator information to the UE, where the resource indicator information is used to indicate a physical resource used to carry the feedback information.

The access network device first sends higher layer signaling, for example, RRC signaling to the UE, where the RRC signaling includes a PUCCH resource set configured for the UE by the access network device, and the PUCCH resource set includes at least two PUCCH resources. The PUCCHs in the PUCCH resource set may have a same format, or may include at least two PUCCH formats. The resource indicator information is sent after the UE is informed of the PUCCH resource set, so that the UE can determine, from the PUCCH resource set, the physical resource used to carry the feedback information.

1804: The access network device receives, in the physical resource in the uplink subframe, the feedback information mapped to the physical resource.

The DAI index indicator and the DAI total quantity indicator that are sent by the access network device to the UE in the foregoing step 1801 are described below. This embodiment of the present invention provides a method for setting a value of the DAI index indicator and eight methods for setting a value of the DAI total quantity indicator, and the methods are described below one by one with reference to the accompanying drawings.

The value of the DAI index indicator:

A value of a DAI index indicator corresponding to each downlink subframe in the real-time scheduling downlink subframe subset is: a count value obtained by performing an accumulative count on the subframes in the real-time scheduling downlink subframe subset in a preset order.

For the preset order, refer to the foregoing descriptions.

A schematic diagram of the value of the DAI index indicator is shown in FIG. 5. In the foregoing embodiment, the DAI index indicator in FIG. 5 is already described, and details are no longer described herein.

For this embodiment of the present invention, because the base station sets a DAI index indicator for each downlink subframe in the real-time scheduling downlink subframe subset, and a relationship between downlink subframes in the real-time scheduling downlink subframe subset can be determined according to the value of the DAI index indicator, the DAI index indicator may be used as a basis for the UE to determine whether some actually scheduled downlink shared channels are missed in detection.

It should be noted that, after the access network device sends the DAI index indicator to the UE, the UE still cannot discover that downlink shared channels in the last or multiple last downlink subframes in the real-time scheduling downlink subframe subset are missed in detection, and the UE also cannot discover that downlink shared channels in four continuous downlink subframes in the real-time scheduling downlink subframe subset are missed in detection. Therefore, the DAI total quantity indicator further needs to be set, and the DAI total quantity indicator needs to be provided to the UE, so that the UE can discover that more downlink shared channels are missed in detection, so as to feed back more complete feedback information.

It should be noted in advance that in the following eight methods for setting the value of the DAI total quantity indicator that are provided in this embodiment of the present invention, for the first information, refer to the foregoing descriptions.

Further, the eight methods for setting the value of the DAI total quantity indicator are described.

A method 1 for setting the DAI total quantity indicator:

In the real-time scheduling downlink subframe subset, a value of a DAI total quantity indicator of each downlink subframe in a first order combination corresponding to a current subframe sequence number is: a total quantity of first information scheduled in the downlink subframes in the first order combination corresponding to the current subframe sequence number.

A value of the DAI index indicator and the first value of the DAI total quantity indicator are shown in FIG. 6. The value of the DAI index indicator and the value of the DAI total quantity indicator that are in FIG. 6 are already described in the foregoing embodiment, and details are no longer described herein.

For this embodiment of the present invention, when the access network device sets the value of the DAI total quantity indicator according to the method 1 for setting the DAI total quantity indicator, only a quantity of first information scheduled in a current downlink subframe needs to be considered, and a quantity of first information scheduled in a downlink subframe at a next moment of a current subframe moment no longer needs to be predicted. Therefore, in this method, the access network device does not need to perform prediction for the downlink subframe at the next moment during scheduling, and complexity of setting the value of the DAI total quantity indicator is low. Moreover, by using the value of the DAI total quantity indicator that is set according to the method 1 for setting the DAI total quantity indicator, the UE can determine whether first information scheduled in a downlink subframe in the real-time scheduling downlink subframe subset is missed in detection, so that the access network device can receive more complete feedback information fed back by the UE.

A method 2 for setting the DAI total quantity indicator:

In the real-time scheduling downlink subframe subset, a value of a DAI total quantity indicator of each downlink subframe in a first order combination corresponding to a current subframe sequence number is: a sum of a current quantity and a historical quantity. The current quantity is a total quantity of first information scheduled in the downlink subframes in the first order combination corresponding to the current subframe sequence number. The historical quantity is a total quantity of first information scheduled in each downlink subframe in first order combinations separately corresponding to subframe sequence numbers of all downlink subframes before a subframe moment of the current subframe sequence number in the real-time scheduling downlink subframe subset.

A value of the DAI index indicator and the second value of the DAI total quantity indicator are shown in FIG. 7. The value of the DAI index indicator and the value of the DAI total quantity indicator that are in FIG. 7 are already described in the foregoing embodiment, and details are no longer described herein.

For this embodiment of the present invention, when the access network device sets the value of the DAI total quantity indicator according to the method 2 for setting the DAI total quantity indicator, only a quantity of first information scheduled in a downlink subframe at a current moment and a quantity of first information scheduled in a downlink subframe before a current subframe moment in the real-time scheduling downlink subframe subset need to be considered, and a quantity of first information scheduled in a downlink subframe at a next moment of the current subframe moment does not need to be predicted. Therefore, in this method, the access network device does not need to perform prediction for a next downlink subframe during scheduling, and complexity of setting the value of the DAI total quantity indicator is low. Moreover, by using the value of the DAI total quantity indicator that is set according to the method 2 for setting the DAI total quantity indicator, the UE can determine whether first information scheduled in a downlink subframe in the real-time scheduling downlink subframe subset is missed in detection, so that the access network device can receive more complete feedback information fed back by the UE.

A method 3 for setting the DAI total quantity indicator:

In the real-time scheduling downlink subframe subset, a value of a DAI total quantity indicator of each downlink subframe in a first order combination corresponding to a current subframe sequence number is: a sum of a current quantity and a future quantity. The current quantity is a total quantity of first information scheduled in the downlink subframes in the first order combination corresponding to the current subframe sequence number. The future quantity is a total quantity of first information scheduled in downlink subframes in a first order combination corresponding to a subframe sequence number of a downlink subframe at a next moment of a subframe with the current subframe sequence number in the real-time scheduling downlink subframe subset.

A value of the DAI index indicator and the third value of the DAI total quantity indicator are shown in FIG. 8. The value of the DAI index indicator and the value of the DAI total quantity indicator that are in FIG. 8 are already described in the foregoing embodiment, and details are no longer described herein.

For this embodiment of the present invention, after the access network device sends, to the UE, the value of the DAI total quantity indicator that is set according to the method 3 for setting the DAI total quantity indicator, the UE may discover that first information scheduled in a downlink subframe in a first order combination corresponding to a downlink subframe that is not at a last moment in the real-time scheduling downlink subframe subset is missed in detection, and discover that first information scheduled in a downlink subframe in a first order combination corresponding to a downlink subframe at a last moment is missed in detection, so that the access network device can receive more complete feedback information fed back by the UE.

A method 4 for setting the DAI total quantity indicator:

In the real-time scheduling downlink subframe subset, a value of a DAI total quantity indicator of each downlink subframe in a first order combination corresponding to a current subframe sequence number is: a sum of a current quantity, a historical quantity, and a future quantity. The current quantity is a total quantity of first information scheduled in the downlink subframes in the first order combination corresponding to the current subframe sequence number. The historical quantity is a total quantity of first information scheduled in each downlink subframe in first order combinations separately corresponding to all subframe sequence numbers before a subframe moment of the current subframe sequence number in the real-time scheduling downlink subframe subset. The future quantity is a total quantity of first information scheduled in downlink subframes in a first order combination corresponding to a subframe sequence number of a downlink subframe at a next moment of a subframe with the current subframe sequence number in the real-time scheduling downlink subframe subset.

A value of the DAI index indicator and the fourth value of the DAI total quantity indicator are shown in FIG. 9. The value of the DAI index indicator and the value of the DAI total quantity indicator that are in FIG. 9 are already described in the foregoing embodiment, and details are no longer described herein.

For this embodiment of the present invention, because the value of the DAI total quantity indicator includes both the historical quantity and the future quantity, after the access network device sends, to the UE, the value of the DAI total quantity indicator that is set according to the method 4 for setting the DAI total quantity indicator, the UE can discover that first information scheduled in a downlink subframe in a first order combination corresponding to a downlink subframe that is not at a last moment in the real-time scheduling downlink subframe subset is missed in detection, and discover that first information scheduled in a downlink subframe in a first order combination corresponding to a downlink subframe at a last moment is missed in detection, so that the access network device can receive more complete feedback information fed back by the UE.

It should be noted that, in the foregoing setting methods 1 to 4 for setting the DAI total quantity indicator, when the value of the DAI total quantity indicator is determined, the downlink shared channel involved in the first information described above may include or not include a second downlink shared channel. This is not limited in the present invention. Because the second downlink shared channel is not scheduled in real time, but instead, a period of sending data and a subframe location are predetermined, whether the DAI total quantity indicator is counted does not affect a result.

It should be further noted that, if the access network device needs to send data by using a special downlink control channel, the value of the DAI total quantity indicator further includes a quantity of special downlink control channels. Generally, the quantity of special downlink control channels is one.

A method 5 for setting the DAI total quantity indicator:

Values of DAI total quantity indicators corresponding to the last, the second-to-last, . . . , and the $X^{th}$-to-last downlink subframes that are arranged in a preset order in the real-time scheduling downlink subframe subset are respectively preset values $A_X$, $A_{X-1}$, . . . , and $A_1$, and values of DAI total quantity indicators corresponding to the other downlink subframes in the real-time scheduling downlink subframe subset are all set to a preset value $A_0$, where X is a natural number greater than 1.

A value of the DAI index indicator and the fifth value of the DAI total quantity indicator are shown in FIG. 12. The value of the DAI index indicator and the value of the DAI total quantity indicator that are in FIG. 12 are already described in the foregoing embodiment, and details are no longer described herein.

For this embodiment of the present invention, after the access network device sends, to the UE, the DAI index indicator and the value of the DAI total quantity indicator that is set according to the method 5 for setting the DAI total quantity indicator, the UE can discover, according to the DAI index indicator, an error event of missing a subframe other than a trailing subframe in the real-time scheduling downlink subframe subset in detection, and discover, according to the DAI total quantity indicator, an error event of missing the trailing subframe in the real-time scheduling downlink subframe subset in detection. Therefore, the UE determines, according to the DAI index indicator and the DAI total quantity indicator, an order of feedback information corresponding to the detected first information, and determines feedback information of the first information that is missed in detection. Further, a codebook of more complete feedback information is restored, and the access network device can receive more complete feedback information.

A method 6 for setting the DAI total quantity indicator:

Values of DAI total quantity indicators corresponding to the last, the second-to-last, . . . , and the $X^{th}$-to-last downlink subframes that are arranged in a first preset order among downlink subframes having a same sequence number in the real-time scheduling downlink subframe subset are respectively: preset values $A_X$, $A_{X-1}$, . . . , and $A_1$, and values of DAI total quantity indicators corresponding to the other downlink subframes of the downlink subframes having the same sequence number are all set to a preset value $A_0$, where X is a natural number greater than 1.

A value of the DAI index indicator and the sixth value of the DAI total quantity indicator are shown in FIG. 13. The value of the DAI index indicator and the value of the DAI total quantity indicator that are in FIG. 13 are already described in the foregoing embodiment, and details are no longer described herein.

For this embodiment of the present invention, after the access network device sends, to the UE, the DAI index indicator and the value of the DAI total quantity indicator that is set according to the method 6 for setting the DAI total quantity indicator, the UE can discover, according to the DAI index indicator, an error event of missing a subframe other than a trailing subframe in the real-time scheduling downlink subframe subset in detection, and discover, according to the DAI total quantity indicators corresponding to the last, the second-to-last, . . . , and the $X^{th}$-to-last downlink subframes of the downlink subframes having the same sequence number that are arranged in the first preset order, an error event of missing the trailing subframe in the real-time scheduling downlink subframe subset in detection. Therefore, a codebook of more complete feedback information is restored, and the access network device can receive more complete feedback information.

It should be further noted that, in FIG. 13, assuming that the UE misses downlink subframes 8 of a carrier 6 to a carrier 8 in detection, but the UE receives a DAI total quantity indicator corresponding to a downlink subframe 6 of the carrier 6, the UE may restore, according to the DAI total quantity indicator, a codebook of feedback information of the downlink subframe 6 of the carrier 6 and that of a downlink subframe before the downlink subframe 6 in the real-time scheduling downlink subframe subset, then feed back these codebooks to a base station, and temporarily discard a codebook of feedback information corresponding to a downlink subframe in a first order combination corresponding to the downlink subframes 8. Therefore, the access network device may fail in receiving the codebook of the feedback information corresponding to the downlink subframe in the first order combination corresponding to the downlink subframes 8.

A method 7 for setting the DAI total quantity indicator:

A value of a DAI total quantity indicator corresponding to each downlink subframe in the real-time scheduling downlink subframe subset is: a count value obtained by performing a count on the subframes in the real-time scheduling downlink subframe subset in a reverse order of the preset order in a preset count manner.

The preset count manner may be an ascending count or a descending count.

A value of the DAI index indicator and the seventh value of the DAI total quantity indicator are shown in FIG. 14. The value of the DAI index indicator and the value of the DAI total quantity indicator that are in FIG. 14 are already described in the foregoing embodiment, and details are no longer described herein.

For this embodiment of the present invention, after the access network device sends, to the UE, the DAI index indicator and the value of the DAI total quantity indicator that is set according to the method 7 for setting the DAI total quantity indicator, the UE can discover, according to the DAI index indicator, an error event of missing a subframe other than a trailing subframe in the real-time scheduling downlink subframe subset in detection. Subsequently, an ascending count or a descending count starts from the last downlink subframe based on the DAI total quantity indicator in a reverse order of a preset order according to an arrangement result. Therefore, the UE may discover, according to the DAI total quantity indicator, an event of missing the trailing subframe in the real-time scheduling downlink subframe subset in detection, or may help discover an error event of missing a subframe other than the trailing subframe in detection. Further, a codebook of more complete feedback information is restored, and the access network device can receive more complete feedback information.

A method 8 for setting the DAI total quantity indicator:

A value of a DAI total quantity indicator of each downlink subframe of downlink subframes having a same sequence number in the real-time scheduling downlink subframe subset that are arranged in a reverse order of a first preset order is: a count value obtained by performing, starting from a preset value, a count on the downlink subframes having the same sequence number in the real-time scheduling downlink subframe subset in the reverse order of the first preset order in a preset count manner.

A value of the DAI index indicator and the eighth value of the DAI total quantity indicator are shown in FIG. 15. The value of the DAI index indicator and the value of the DAI total quantity indicator that are in FIG. 15 are already described in the foregoing embodiment, and details are no longer described herein.

A value result 9 of the DAI total quantity indicator:

The DAI total quantity indicator is used to indicate a quantity of bits in a HARQ-ACK codebook, and may also be referred to as a codebook volume or a codebook size. The codebook volume is less than a quantity of bits in a HARQ-ACK corresponding to the preconfigured downlink subframe set, but is greater than or equal to a quantity of downlink subframes in the real-time scheduling downlink subframe subset or a quantity of transport blocks. When the codebook volume is greater than the quantity of downlink subframes in the real-time scheduling downlink subframe subset or the quantity of transport blocks, the UE and the base station both determine that at least one NACK is padded at the end of the codebook. A specific quantity of padded NACKs is a pre-estimated quantity of bits in the codebook minus a quantity of downlink subframes that are in the real-time scheduling downlink subframe subset and in which downlink data is actually scheduled or the quantity of transport blocks. Specifically, the solution is already described in the foregoing embodiment, and details are no longer described herein.

For this embodiment of the present invention, after the access network device sends, to the UE, the DAI index indicator and the value of the DAI total quantity indicator that is set according to the method 8 for setting the DAI total quantity indicator, the UE can discover, according to the DAI index indicator, an error event of missing a subframe other than a trailing subframe in the real-time scheduling downlink subframe subset in detection. DAI total quantity indicators are independently set for downlink subframes at different moments. After downlink subframes at a same moment are arranged in the reverse order of the first order, the downlink subframes are counted according to an arrangement result starting from the last downlink subframe. That is, a value of a DAI total quantity indicator of the last downlink subframe is determined. Therefore, an error event of missing a trailing subframe in detection may be discovered according to a value of a DAI total quantity indicator of the last received downlink subframe. In conclusion, the access network device may receive feedback information corresponding to all downlink subframes in the real-time scheduling downlink subframe subset, or may receive feedback information corresponding to some downlink subframes in the real-time scheduling downlink subframe subset.

In the method for receiving feedback information provided in this embodiment of the present invention, an access network device sends a DAI index indicator and a DAI total quantity indicator to UE, so that the UE restores, according to the DAI index indicator and the DAI total quantity indicator, a codebook of feedback information corresponding to a real-time scheduling downlink subframe subset, or restore a codebook of partial feedback information. Because the DAI index indicator and the DAI total quantity indicator are both determined according to the real-time scheduling downlink subframe subset, the access network device only needs to receive, in an uplink subframe, feedback information corresponding to a downlink subframe actually scheduled by the access network device, and does not perform NACK padding in a downlink subframe that is not scheduled, thereby improving uplink resource utilization.

It should be noted that, the access network device may receive feedback information corresponding to all downlink subframes in the real-time scheduling downlink subframe subset, or may receive feedback information corresponding to some downlink subframes in the real-time scheduling downlink subframe subset.

To enable the access network device to determine whether the received feedback information corresponds to all the downlink subframes or some downlink subframes in the real-time scheduling downlink subframe subset, in an implementation manner of this embodiment of the present invention, after the foregoing step 1802 of receiving, by the access network device in an uplink subframe, the feedback information that is sent by the UE and on which channel coding has been performed, the method further includes: decoding, by the access network device, the received encoded feedback information, to obtain a codebook of the feedback information. Specifically, the access network device decodes the received encoded feedback information based on at least two assumption conditions. In each assumption condition, the access network device assumes that the last downlink subframe that is received by the UE in the preconfigured downlink subframe set is a different downlink subframe. For the different downlink subframe, the following two implementation manners may be included.

In the first implementation manner, using FIG. 6 as an example, the access network device assumes that the last downlink subframe received by the UE is related to a subframe sequence number. For example, in a first assumption, the access network device assumes that the UE receives at least one downlink subframe of a subframe sequence number 8, and in this case, the access network device clearly knows that the subframe 8 is the last subframe in the real-time scheduling downlink subframe set that is scheduled by the access network device for the UE. Therefore, in this case, the access network device assumes a codebook of all subframes to perform decoding, that is, assumes a codebook volume of 21 bits to perform decoding. In a second assumption, the access network device assumes that a subframe sequence number of the last subframe received by the UE is 6. Therefore, in this case, the access network device assumes that the UE misses all PDCCHs in the subframe sequence number 8 in detection, and assumes that the UE receives at least one downlink subframe of the subframe sequence number 6. Therefore, in this case, the access network device assumes a codebook of some subframes to perform decoding, that is, assumes a codebook volume of 16 bits to perform decoding. In this case, the obtained codebook corresponds to subframes 4, 5, and 6 with the subframe 8 excluded.

In the second implementation manner, using FIG. 12 as an example, the access network device assumes that the last downlink subframe received by the UE is related to a specific downlink subframe. For example, in this case, different subframes having a same subframe sequence number are included. For example, in FIG. 12, in a first assumption, the access network device assumes that the UE receives at least one downlink subframe of a subframe sequence number 8 and whose DAI total quantity indicators are 2, 3 and 4. Therefore, in this case, the access network device assumes a codebook of all subframes to perform decoding, that is, assumes a codebook volume of 20 bits to perform decoding. In a second assumption, the access network device assumes that the UE receives downlink subframes 8, whose subframe sequence numbers are 8, of carriers 1 to 5, and assumes that the UE misses all PDCCHs whose DAI total quantity indicators are 2, 3, and 4 of the subframe sequence number 8 in detection. Therefore, in this case, the access network device assumes a codebook of some subframes to perform decoding, that is, assumes a codebook volume of 17 bits to perform decoding.

Figure 20:
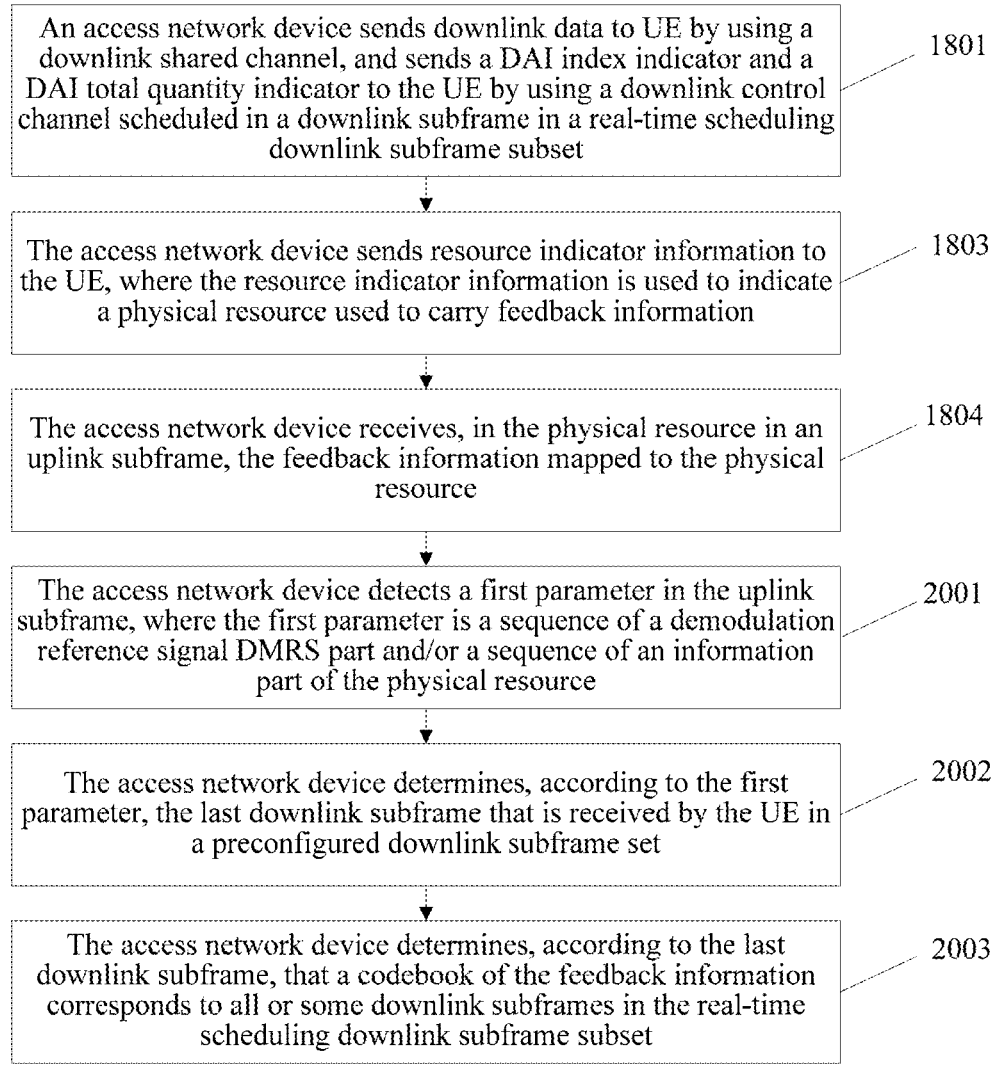
FIG. 20 is a flowchart of another method for receiving feedback information according to an embodiment of the present invention.

To enable the access network device to determine whether the received feedback information corresponds to all downlink subframes or some downlink subframes in the real-time scheduling downlink subframe subset, in another implementation manner of this embodiment of the present invention, as shown in FIG. 20, after the foregoing step 1804 of receiving, by the access network device in the physical resource in the uplink subframe, the feedback information mapped to the physical resource, the method further includes the following steps.

2001: The access network device detects a first parameter in the uplink subframe, where the first parameter is a sequence of a demodulation reference signal DMRS part and/or a sequence of an information part of the physical resource.

The sequence of the DMRS part may be a sequence of a DMRS part on a DMRS time-domain symbol of an uplink control channel. The sequence of the information part may be a spreading sequence on a time-domain symbol for transmitting feedback information on the uplink control channel.

2002: The access network device determines, according to the first parameter, the last downlink subframe that is received by the UE in the preconfigured downlink subframe set.

2003: The access network device determines, according to the last downlink subframe, that the codebook of the feedback information corresponds to all or some downlink subframes in the real-time scheduling downlink subframe subset.

It should be noted that, if it is determined in step 2002 that the last downlink subframe received by the UE is the last downlink subframe in the real-time scheduling downlink subframe subset, it indicates that the feedback information received by the access network device includes feedback information corresponding to the last downlink subframe in the real-time scheduling downlink subframe subset. If a downlink subframe other than the downlink subframe at the last moment in the real-time scheduling downlink subframe subset is missed in detection, the UE may discover the situation according to the DAI index indicator and the DAI total quantity indicator, and feeds back NACK information. Therefore, the access network device may determine, by determining whether the received feedback information includes the last downlink subframe in the real-time scheduling downlink subframe subset, whether the received feedback information corresponds to all downlink subframes in the real-time scheduling downlink subframe subset, or corresponds to some downlink subframes in the real-time scheduling downlink subframe subset.

In the method for receiving feedback information provided in this embodiment of the present invention, an access network device determines, by using a first parameter, the last downlink subframe that is received by the UE in a preconfigured downlink subframe set, and further determines, by using the last downlink subframe, whether received feedback information corresponds to all downlink subframes in a real-time scheduling downlink subframe subset or corresponds to some downlink subframes in a real-time scheduling downlink subframe subset. Therefore, the access network device can correctly decode the received feedback information, thereby preventing the access network device from performing blind detection.

Figure 21:
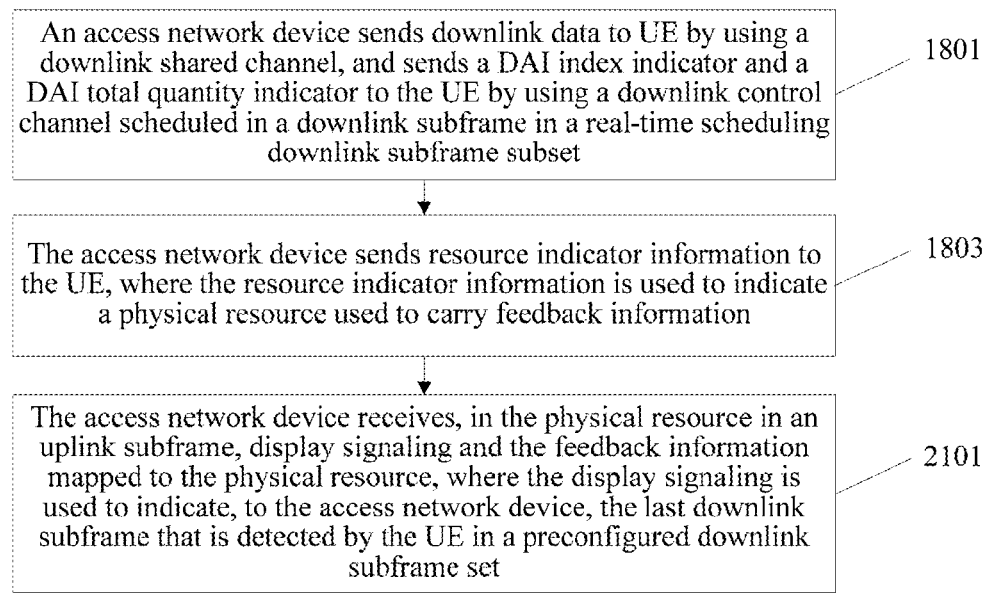
FIG. 21 is a flowchart of another method for receiving feedback information according to an embodiment of the present invention.

This embodiment of the present invention further provides another implementation manner, which is used to determine whether the received feedback information corresponds to all or some downlink subframes in the real-time scheduling downlink subframe subset. As shown in FIG. 21, the foregoing step 1804 of receiving, by the access network device in the physical resource in the uplink subframe, the feedback information mapped to the physical resource may be specifically implemented as step 2101:

2101: The access network device receives, in the physical resource in the uplink subframe, display signaling and the feedback information mapped to the physical resource, where the display signaling is used to indicate, to the access network device, the last downlink subframe that is detected by the UE in the preconfigured downlink subframe set.

Figure 22:
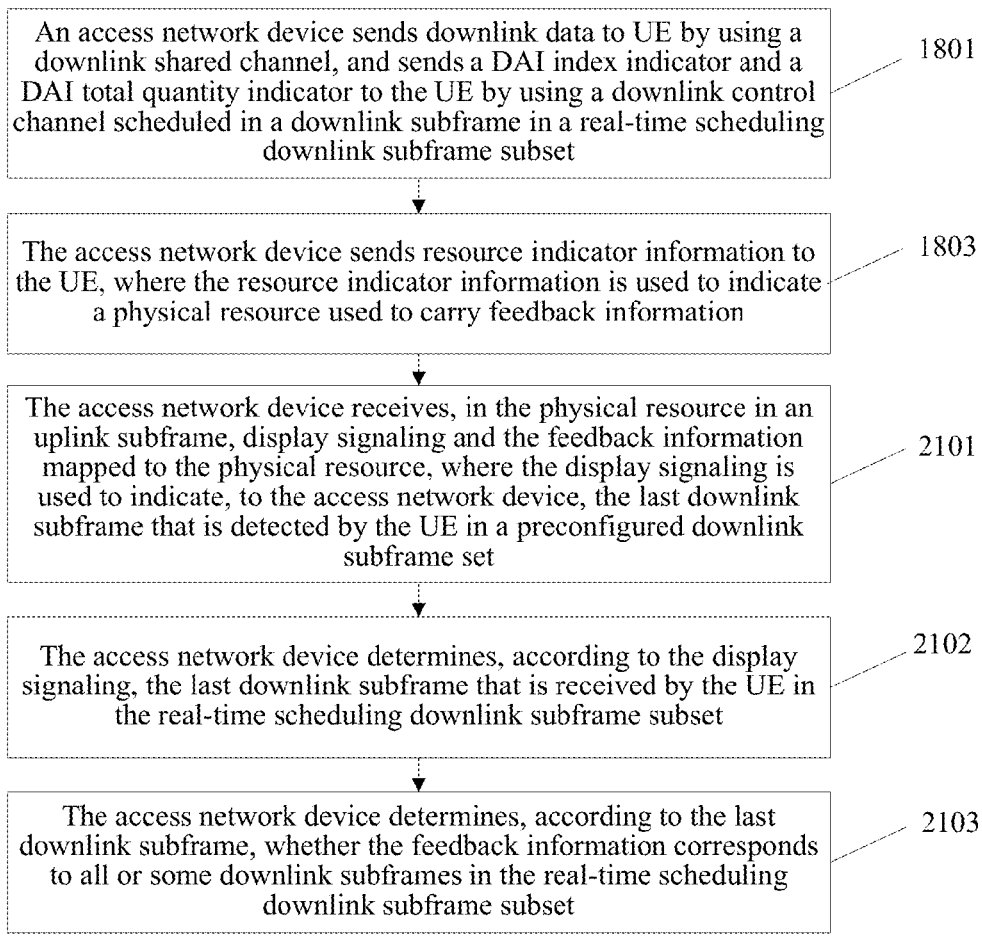
FIG. 22 is a flowchart of another method for receiving feedback information according to an embodiment of the present invention.

Further, in another implementation manner provided in this embodiment of the present invention, as shown in FIG. 22, after the foregoing step 2101, the method further includes the following steps:

2102: The access network device determines, according to the display signaling, the last downlink subframe that is received by the UE in the real-time scheduling downlink subframe subset.

2103: The access network device determines, according to the last downlink subframe, whether the feedback information corresponds to all or some downlink subframes in the real-time scheduling downlink subframe subset.

It should be noted that, if a downlink subframe that is not at the last moment in the real-time scheduling downlink subframe subset is missed in detection, the UE may discover the situation according to the DAI index indicator and the DAI total quantity indicator, and feed back NACK information. Therefore, if it is determined that the last downlink subframe received by the UE is the last downlink subframe in the real-time scheduling downlink subframe subset, it indicates that the feedback information received by the access network device includes feedback information corresponding to the last downlink subframe in the real-time scheduling downlink subframe subset. Further, it is determined that the feedback information received by the access network device corresponds to all downlink subframes in the real-time scheduling downlink subframe subset.

However, if it is determined that the last downlink subframe received by the UE is not the last downlink subframe in the real-time scheduling downlink subframe subset, it indicates that the feedback information received by the access network device does not include feedback information corresponding to the last downlink subframe in the real-time scheduling downlink subframe subset. Therefore, it is determined that the feedback information received by the access network device corresponds to some downlink subframes in the real-time scheduling downlink subframe subset.

In the method for receiving feedback information provided in this embodiment of the present invention, an access network device determines, by using display signaling, the last downlink subframe that is received by UE in a preconfigured downlink subframe set, and determines, by using the last downlink subframe, whether received feedback information corresponds to all downlink subframes in a real-time scheduling downlink subframe subset or corresponds to some downlink subframes in a real-time scheduling downlink subframe subset. Therefore, the access network device can correctly decode the received feedback information, thereby preventing the access network device from performing blind detection.

This embodiment of the present invention further provides another implementation manner. Specifically, the access network device notifies, by using display signaling, for example, by using a field such as a UL_DAI field in a PDCCH that schedules a PUSCH, the UE of a sequence number of the last currently scheduled subframe. If sequence numbers of the last subframe received by the UE and the subframe notified by using the display signaling are consistent, the access network device may receive the feedback information according to the method in the foregoing embodiment. If the sequence numbers are inconsistent, the UE may not send the feedback information, and the access network device cannot receive the feedback information. In this way, whether the UE sends the feedback information may be determined by performing energy detection on a physical resource of the feedback information.

Figure 23:
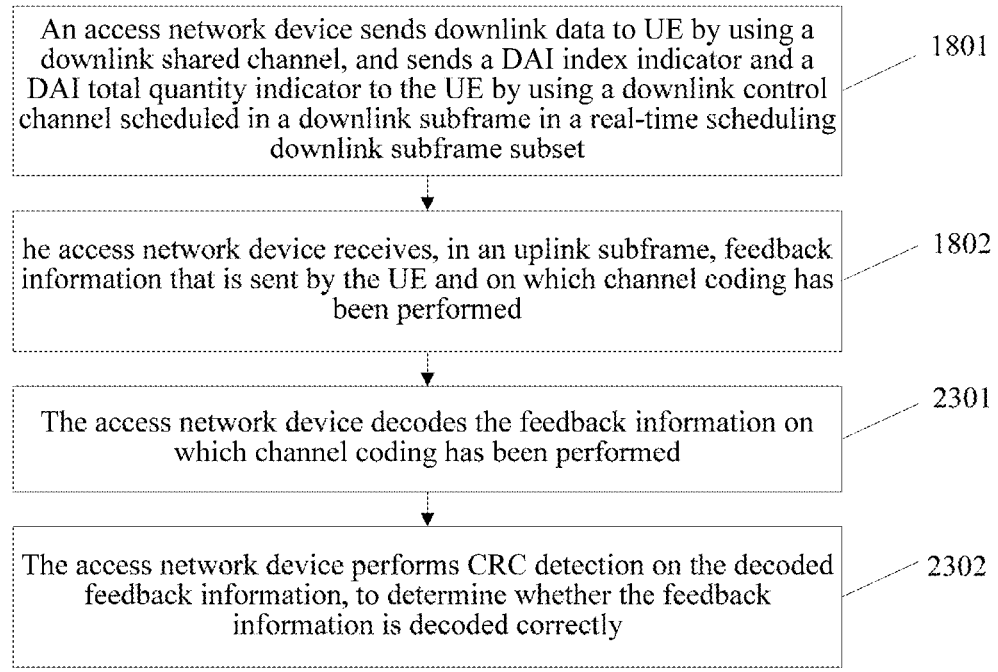
FIG. 23 is a flowchart of another method for receiving feedback information according to an embodiment of the present invention.

When the access network device cannot determine a downlink subframe corresponding to the received feedback information, to determine the downlink subframe corresponding to the received feedback information, this embodiment of the present invention further provides another implementation manner. As shown in FIG. 23, after the foregoing step 1802 of receiving, by the access network device in an uplink subframe, the feedback information that is sent by the UE and on which channel coding has been performed, the method further includes the following steps.

2301: The access network device decodes the feedback information on which channel coding has been performed.

The feedback information on which channel coding has been performed carries a cyclic redundancy check CRC bit.

2302: The access network device performs CRC detection on the decoded feedback information, to determine whether the feedback information is decoded correctly.

The access network device performs CRC detection on the decoded feedback information, to determine whether the feedback information is decoded correctly. If the feedback information is decoded correctly, the access network device can determine the downlink subframe corresponding to the feedback information.

In the method for receiving feedback information provided in this embodiment of the present invention, an access network device sends downlink data to UE by using a downlink shared channel, and sends a DAI index indicator and a DAI total quantity indicator to the UE by using a downlink control channel scheduled in a downlink subframe in a real-time scheduling downlink subframe subset, so that the UE determines a codebook of feedback information according to the DAI index indicator and the DAI total quantity indicator. Subsequently, the access network device receives, in an uplink subframe, the feedback information that is sent by the UE and on which channel coding has been performed. Compared with the prior art in which a large quantity of NACKs need to be padded to encode feedback information according to a preconfigured downlink subframe set, causing low uplink resource utilization, in the present invention, after the access network device sends the DAI index indicator and the DAI total quantity indicator to the UE, channel coding is performed on the received feedback information according to the codebook of the feedback information, and the codebook of the feedback information corresponds to all or some downlink subframes in the real-time scheduling downlink subframe subset. Therefore, the access network device needs to receive feedback information corresponding to a downlink shared channel in only an actually scheduled downlink subframe, and does not need to perform NACK padding in a downlink subframe that is not scheduled. Therefore, an uplink resource is not occupied, thereby improving uplink resource utilization.

Figure 24:
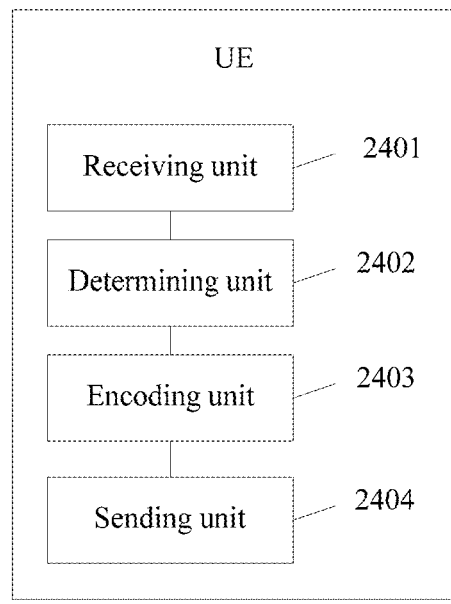
FIG. 24 is a schematic diagram of a logical structure of UE according to an embodiment of the present invention.

Corresponding to the foregoing method embodiments, to improve uplink resource utilization, an embodiment of the present invention further provides UE. As shown in FIG. 24, the UE includes: a receiving unit 2401, a determining unit 2402, an encoding unit 2403, and a sending unit 2404.

The receiving unit 2401 is configured to receive, in a downlink subframe in a preconfigured downlink subframe set, downlink data that is sent by an access network device by using a downlink shared channel, and a downlink assignment index DAI index indicator and a DAI total quantity indicator that are sent by the access network device by using a downlink control channel.

Related descriptions of the downlink shared channel are the same as the descriptions in the foregoing method embodiment, and details are no longer described herein.

The determining unit 2402 is configured to: determine an uplink subframe used to send feedback information corresponding to the downlink shared channel, where the preconfigured downlink subframe set is a set that is associated with the uplink subframe and that consists of all downlink subframes of all carriers preconfigured for the UE; and determine a codebook of the feedback information according to the DAI index indicator and the DAI total quantity indicator, where the codebook corresponds to all or some downlink subframes in a real-time scheduling downlink subframe subset, where the real-time scheduling downlink subframe subset is a set that consists of downlink subframes actually scheduled by the access network device, and the real-time scheduling downlink subframe subset belongs to the preconfigured downlink subframe set. Alternatively, in another implementation manner, optionally, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to the preconfigured downlink subframe set. Optionally, the padding bit may be located after locations of bits in the HARQ-ACK corresponding to the downlink subframe in the real-time scheduling downlink subframe subset. The real-time scheduling downlink subframe subset is a set that consists of downlink subframes actually scheduled by the access network device, and the real-time scheduling downlink subframe subset belongs to the preconfigured downlink subframe set. In this embodiment, when a base station schedules downlink data in a downlink subframe, it is possible that the base station cannot accurately determine a quantity of downlink subframes that are in the real-time scheduling downlink subframe subset and in which downlink data is actually scheduled for the UE. Therefore, in this case, a quantity of bits in one HARQ-ACK codebook may be pre-estimated. When the quantity of downlink subframes that are in the real-time scheduling downlink subframe subset and in which downlink data is actually scheduled is eventually less than the pre-estimated quantity of bits in the codebook, the UE and the base station both determine that at least one NACK is padded at the end of the codebook. A specific quantity of padded NACKs is the pre-estimated quantity of bits in the codebook minus the quantity of downlink subframes that are in the real-time scheduling downlink subframe subset and in which downlink data is actually scheduled or a quantity of transport blocks in the downlink subframe.

The encoding unit 2403 is configured to perform channel coding on the feedback information according to the codebook determined by the determining unit 2402.

The sending unit 2404 is configured to send, in the uplink subframe, the feedback information on which channel coding has been performed to the access network device.

Figure 25:
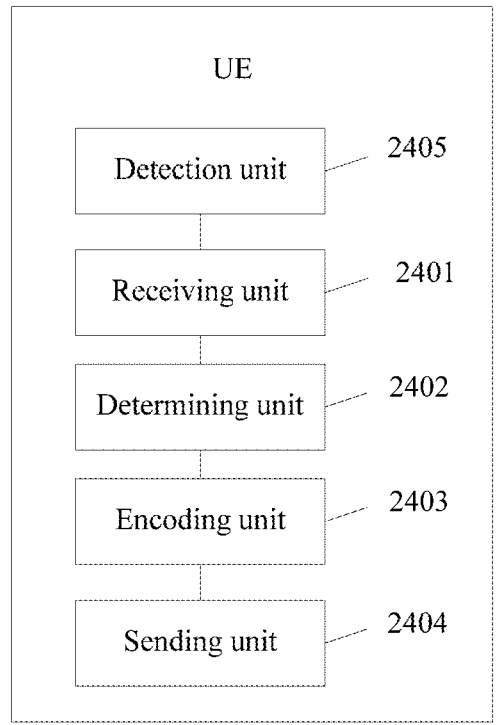
FIG. 25 is a schematic diagram of a logical structure of another UE according to an embodiment of the present invention.

In another embodiment of the present invention, as shown in FIG. 25, the UE further includes a detection unit 2405.

The detection unit 2405 is configured to detect a special downlink control channel, where the special downlink control channel is used to instruct the UE to terminate reception of downlink data on the second downlink shared channel.

Figure 26:
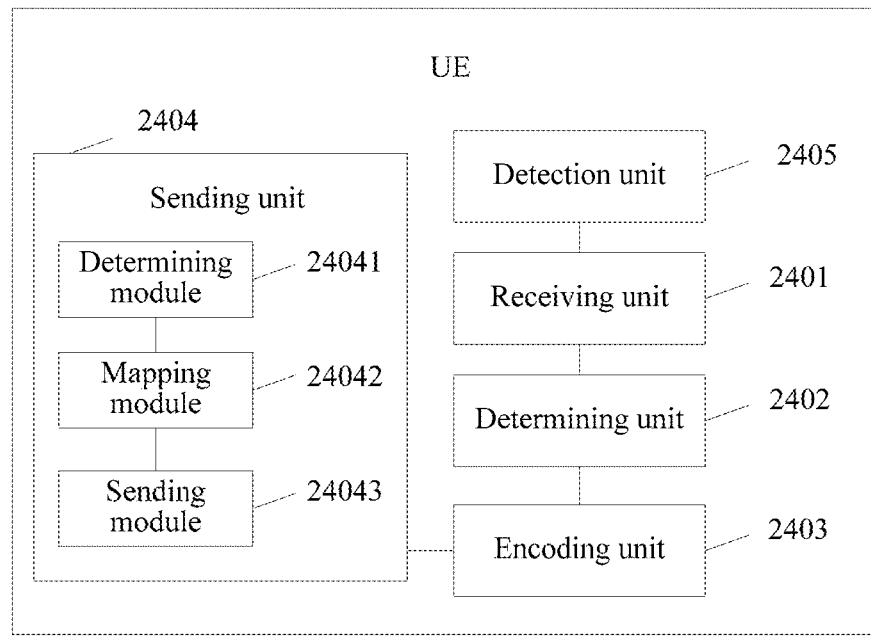
FIG. 26 is a schematic diagram of a logical structure of another UE according to an embodiment of the present invention.

With reference to FIG. 24, in another embodiment of the present invention, as shown in FIG. 26, the sending unit 2404 includes a determining module 24041, a mapping module 24042, and a sending module 24043.

The determining module 24041 is configured to determine a physical resource according to resource indicator information sent by the access network device.

The mapping module 24042 is configured to map the encoded feedback information to the physical resource.

The sending module 24043 is configured to send the mapped feedback information to the access network device by using the physical resource in the uplink subframe.

Values of the DAI index indicator and the DAI total quantity indicator are described below.

For a value result of the DAI index indicator and related content, refer to the foregoing descriptions.

In another embodiment of the present invention, the determining unit 2402 is further configured to determine the codebook of the feedback information according to the DAI index indicator and a DAI total quantity indicator, received by the receiving unit 2401 in a downlink subframe in the preconfigured downlink subframe set, of each downlink subframe.

In another embodiment of the present invention, the determining unit 2402 is further configured to determine the codebook of the feedback information according to the DAI index indicator and a DAI total quantity indicator, received by the receiving unit 2401 in a downlink subframe in the preconfigured downlink subframe set, of the last downlink subframe.

Figure 27:
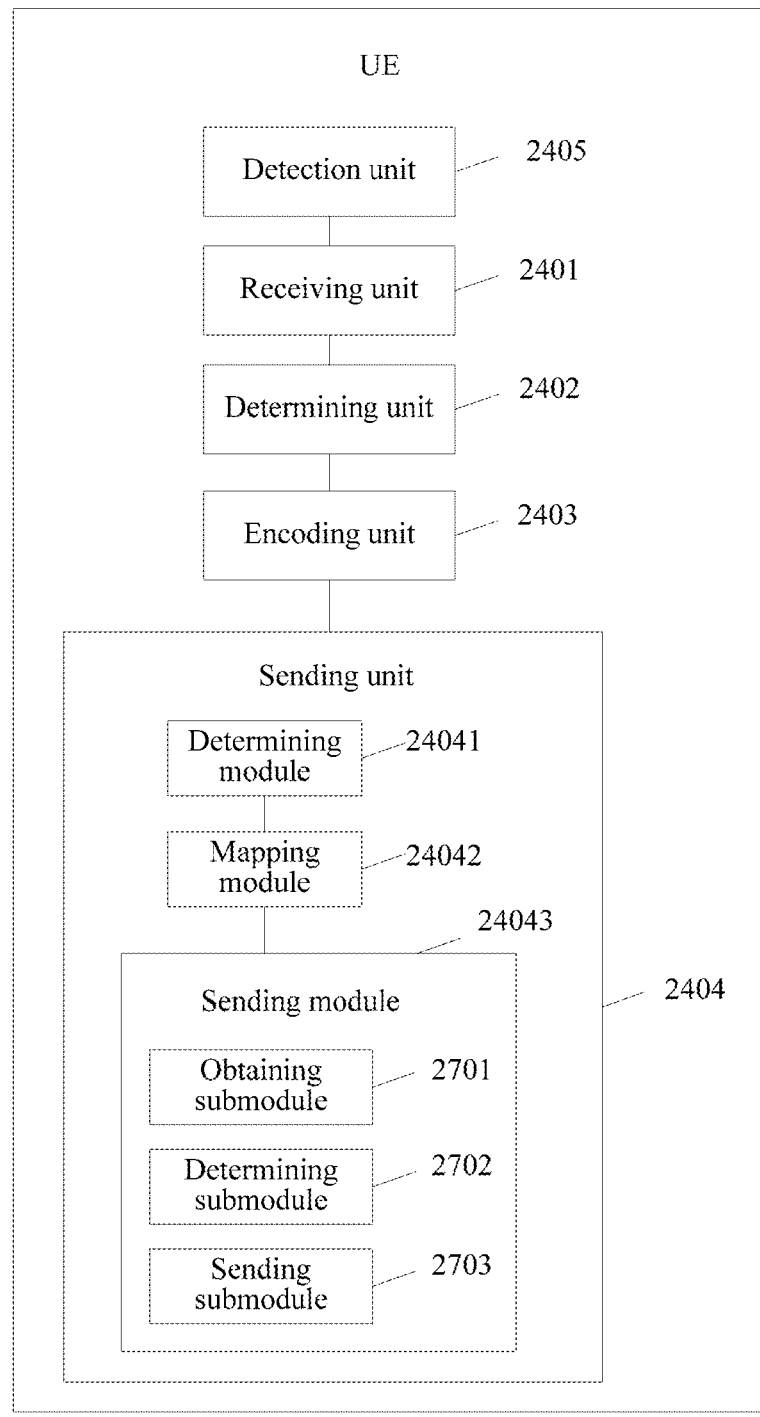
FIG. 27 is a schematic diagram of a logical structure of another UE according to an embodiment of the present invention.

In another embodiment of the present invention, as shown in FIG. 27, the sending module 24043 includes: an obtaining submodule 2701, a determining submodule 2702, and a sending submodule 2703.

The obtaining submodule 2701 is configured to obtain a correspondence between at least two downlink subframes received by the receiving unit in the preconfigured downlink subframe set and at least two candidate parameters of the physical resource, where the candidate parameter is a sequence of a demodulation reference signal DMRS part and/or a sequence of an information part of the physical resource.

The determining submodule 2702 is configured to determine a first parameter corresponding to the last downlink subframe received in the preconfigured downlink subframe set, where the first parameter is one of the at least two candidate parameters.

The sending submodule 2703 is configured to send, on the physical resource, the mapped feedback information according to the first parameter.

In another embodiment of the present invention, the sending module 24043 is further configured to send display signaling and the mapped feedback information to the access network device by using the physical resource in the uplink subframe, where the display signaling is used to indicate, to the access network device, the last downlink subframe that is detected by the UE in the preconfigured downlink subframe set.

Figure 28:
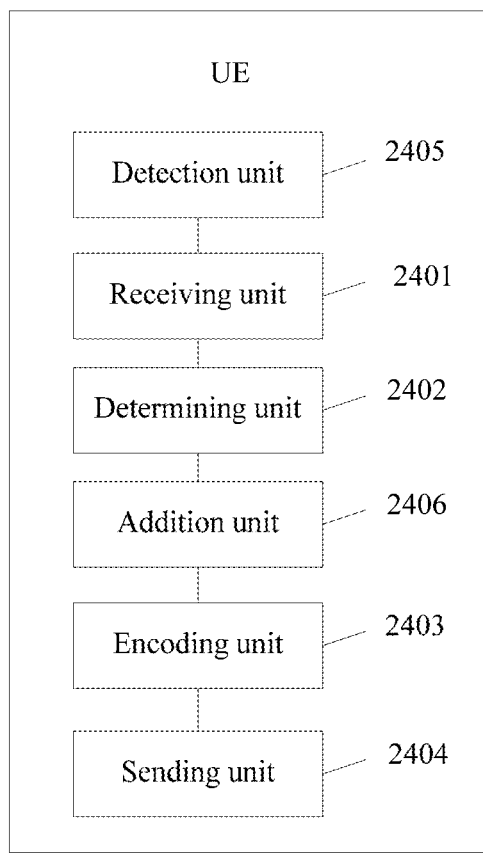
FIG. 28 is a schematic diagram of a logical structure of another UE according to an embodiment of the present invention.

In another embodiment of the present invention, as shown in FIG. 28, the UE further includes an addition unit 2406.

The addition unit 2406 is configured to add a cyclic redundancy check CRC bit to the codebook of the feedback information.

The UE provided in this embodiment of the present invention is configured to perform the method in the foregoing method embodiment, obtaining a same technical effect. For details, refer to the descriptions in the foregoing embodiment, and details are no longer described herein.

Figure 29:
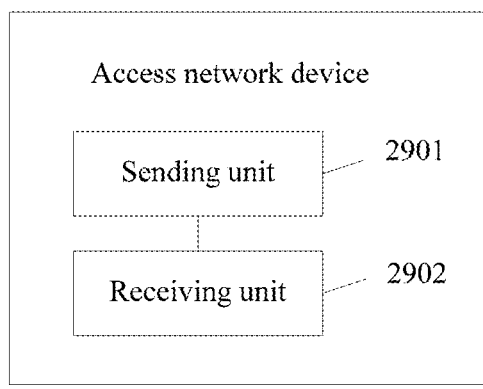
FIG. 29 is a schematic diagram of a logical structure of an access network device according to an embodiment of the present invention.

To improve uplink resource utilization, an embodiment of the present invention further provides an access network device. As shown in FIG. 29, the access network device includes: a sending unit 2901 and a receiving unit 2902.

The sending unit 2901 is configured to: send downlink data to user equipment UE by using a downlink shared channel, and send a downlink assignment index DAI index indicator and a DAI total quantity indicator to the UE by using a downlink control channel scheduled in a downlink subframe in a real-time scheduling downlink subframe subset, so that the UE determines a codebook of feedback information according to the DAI index indicator and the DAI total quantity indicator, where the real-time scheduling downlink subframe subset is a set that consists of downlink subframes actually scheduled by the access network device, the codebook of the feedback information corresponds to all or some downlink subframes in the real-time scheduling downlink subframe subset, and the codebook of the feedback information is a basis for the UE to perform channel coding on the feedback information. Alternatively, in another implementation manner, optionally, a HARQ-ACK codebook includes a HARQ-ACK corresponding to a downlink subframe in the real-time scheduling downlink subframe subset; or a HARQ-ACK codebook includes a HARQ-ACK corresponding to a downlink subframe in the real-time scheduling downlink subframe subset and at least one padding bit, where the padding bit may be a preset value, for example, a NACK. However, it should be noted that, regardless of whether a padding NACK is included, a quantity of bits in the HARQ-ACK codebook needs to be less than a quantity of bits in a HARQ-ACK corresponding to a preconfigured downlink subframe set. Optionally, the padding bit may be located after locations of bits in the HARQ-ACK corresponding to a downlink subframe in the real-time scheduling downlink subframe subset. The real-time scheduling downlink subframe subset is a set that consists of downlink subframes actually scheduled by the access network device, and the real-time scheduling downlink subframe subset belongs to the preconfigured downlink subframe set. In this embodiment, when a base station schedules downlink data in a downlink subframe, it is possible that the base station cannot accurately determine a quantity of downlink subframes that are in the real-time scheduling downlink subframe subset and in which downlink data is actually scheduled for the UE. Therefore, in this case, a quantity of bits in one HARQ-ACK codebook may be pre-estimated. When the quantity of downlink subframes that are in the real-time scheduling downlink subframe subset and in which downlink data is actually scheduled is eventually less than the pre-estimated quantity of bits in the codebook, the UE and the base station both determine that at least one NACK is padded at the end of the codebook. A specific quantity of padded NACKs is a pre-estimated quantity of bits in the codebook minus the quantity of downlink subframes that are in the real-time scheduling downlink subframe subset and in which downlink data is actually scheduled or a quantity of transport blocks in the downlink subframe.

The receiving unit 2902 is configured to receive, in an uplink subframe, the feedback information that is sent by the UE and on which channel coding has been performed.

Related descriptions of the downlink shared channel are the same as the descriptions in the foregoing method embodiment, and details are no longer described herein.

Figure 30:
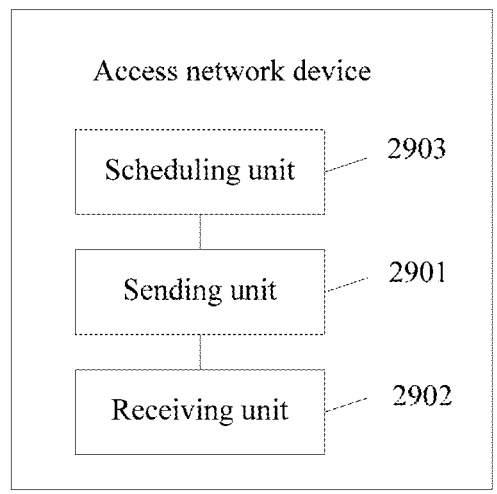
FIG. 30 is a schematic diagram of a logical structure of another access network device according to an embodiment of the present invention.

In another embodiment of the present invention, as shown in FIG. 30, the access network device further includes a scheduling unit 2903.

The scheduling unit 2903 is configured to schedule a special downlink control channel, where the special downlink control channel is used to enable the sending unit 2901 to terminate sending of the downlink data by using the second downlink shared channel.

Figure 31:
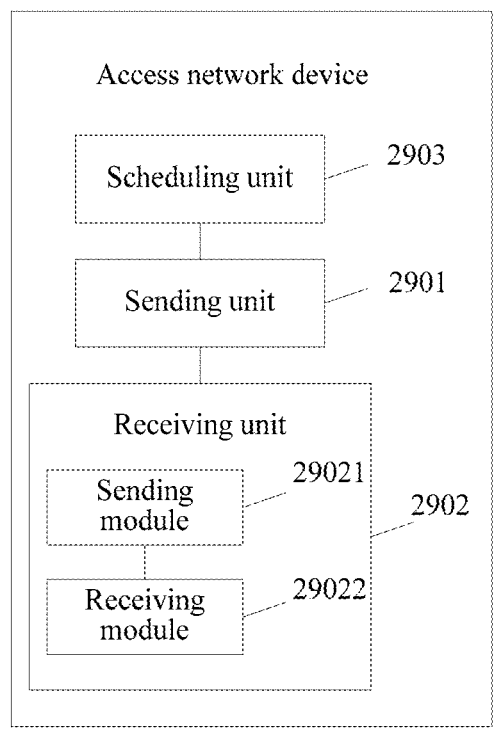
FIG. 31 is a schematic diagram of a logical structure of another access network device according to an embodiment of the present invention.

In another embodiment of the present invention, as shown in FIG. 31, the receiving unit 2902 includes: a sending module 29021 and a receiving module 29022.

The sending module 29021 is configured to send resource indicator information to the UE, where the resource indicator information is used to indicate a physical resource used to carry the feedback information.

The receiving module 29022 is configured to receive, in the physical resource in the uplink subframe, the feedback information mapped to the physical resource.

In another embodiment of the present invention, a value of a DAI index indicator corresponding to each downlink subframe in the real-time scheduling downlink subframe subset is: a count value obtained by performing an accumulative count on the subframes in the real-time scheduling downlink subframe subset in a preset order.

Related content such as the preset order and the real-time scheduling downlink subframe subset is the same as the descriptions in the foregoing method embodiment, and details are no longer described herein.

In another embodiment of the present invention, a value of the DAI total quantity indicator further includes a quantity of special downlink control channels scheduled by the scheduling unit.

In another embodiment of the present invention, values of DAI total quantity indicators corresponding to the last, the second-to-last, . . . , and the $X^{th}$-to-last downlink subframes that are arranged in the preset order in the real-time scheduling downlink subframe subset are respectively preset values $A_X$, $A_{X-1}$, . . . , and $A_1$, and values of DAI total quantity indicators corresponding to the other downlink subframes in the real-time scheduling downlink subframe subset are all set to a preset value $A_0$, where X is a natural number greater than 1.

In another embodiment of the present invention, values of DAI total quantity indicators corresponding to the last, the second-to-last, . . . , and the $X^{th}$-to-last downlink subframes that are arranged in the first preset order among the downlink subframes having the same sequence number in the real-time scheduling downlink subframe subset are respectively: preset values $A_X, A_{X-1}, \ldots,$ and $A_1$, and values of DAI total quantity indicators corresponding to the other downlink subframes of the downlink subframes having the same sequence number are all set to a preset value $A_0$, where X is a natural number greater than 1.

In another embodiment of the present invention, a value of a DAI total quantity indicator corresponding to each downlink subframe in the real-time scheduling downlink subframe subset is: a count value obtained by performing a count on the subframes in the real-time scheduling downlink subframe subset in a reverse order of the preset order in a preset count manner.

The preset count manner is an accumulative count or a descending count.

In another embodiment of the present invention, a value of a DAI total quantity indicator of each downlink subframe of downlink subframes having a same sequence number in the real-time scheduling downlink subframe subset that are arranged in a reverse order of a first preset order is: a count value obtained by performing, starting from a preset value, a count on the downlink subframes having the same sequence number in the real-time scheduling downlink subframe subset in the reverse order of the first preset order in a preset count manner.

The preset count manner is an accumulative count or a descending count.

Figure 32:
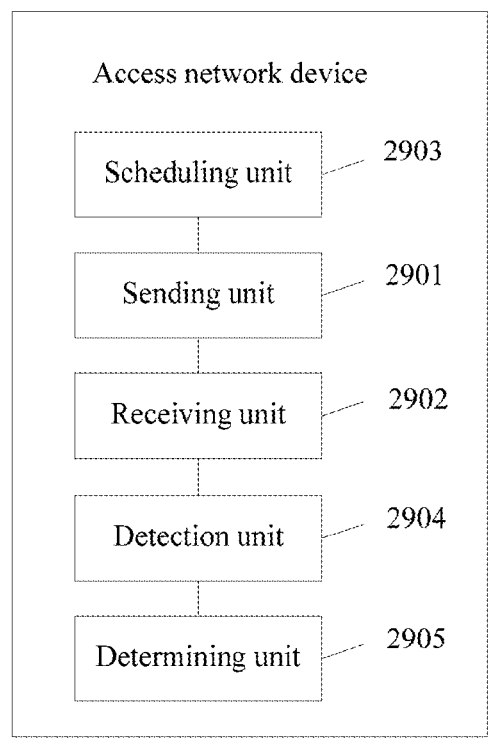
FIG. 32 is a schematic diagram of a logical structure of another access network device according to an embodiment of the present invention.

In another embodiment of the present invention, as shown in FIG. 32, the access network device further includes a detection unit 2904 and a determining unit 2905.

The detection unit 2904 is configured to detect a first parameter in the uplink subframe, where the first parameter is a sequence of a demodulation reference signal DMRS part and/or a sequence of an information part of the physical resource.

The determining unit 2905 is configured to: determine, according to the first parameter, the last downlink subframe that is received by the UE in the preconfigured downlink subframe set; and determine, according to the last downlink subframe, that the feedback information corresponds to all or some downlink subframes in the real-time scheduling downlink subframe subset.

In another embodiment of the present invention, the receiving unit 2902 is further configured to: receive, in the physical resource in the uplink subframe, display signaling and the feedback information mapped to the physical resource, where the display signaling is used to indicate, to the access network device, the last downlink subframe that is detected by the UE in the preconfigured downlink subframe set.

In another embodiment of the present invention, the determining unit 2905 is further configured to determine, according to the last downlink subframe, that the codebook of the feedback information corresponds to all or some downlink subframes in the real-time scheduling downlink subframe subset.

Figure 33:
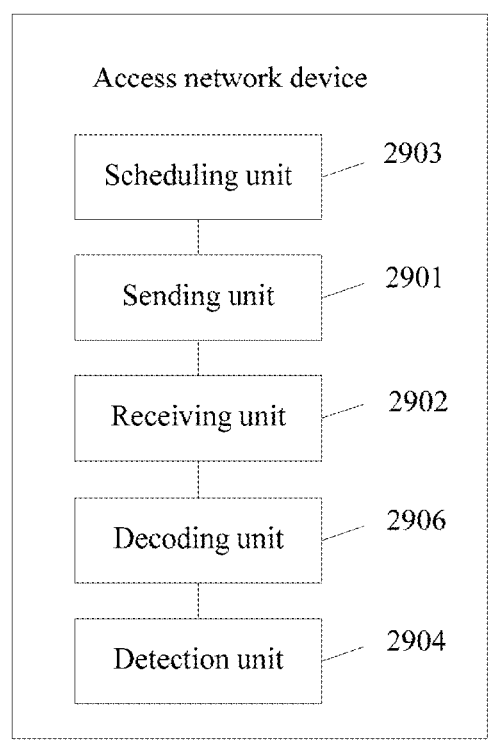
FIG. 33 is a schematic diagram of a logical structure of another access network device according to an embodiment of the present invention.

In another embodiment of the present invention, as shown in FIG. 33, the access network device further includes a decoding unit 2906.

The decoding unit 2906 is configured to decode the feedback information on which channel coding has been performed.

The detection unit 2904 is further configured to: perform CRC detection on the decoded feedback information, to determine whether the feedback information is decoded correctly.

The access network device provided in this embodiment of the present invention is configured to perform related steps in the foregoing method embodiment, and can achieve a same technical effect. For specific content, refer to the descriptions in the foregoing embodiment, and details are no longer described herein.

Figure 34:
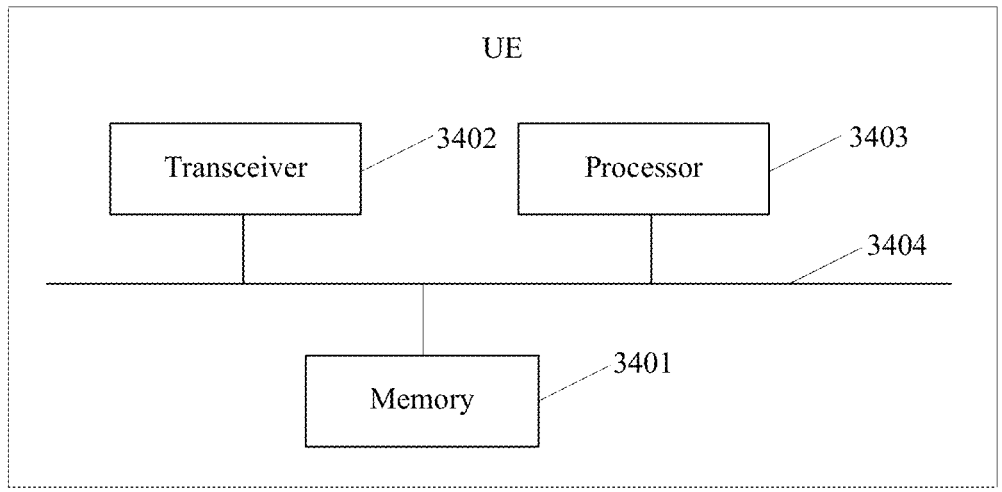
FIG. 34 is a schematic diagram of a logical structure of UE in a method for sending feedback information according to an embodiment of the present invention.

To improve uplink resource utilization, an embodiment of the present invention further provides an apparatus for transmitting feedback information. As shown in FIG. 34, FIG. 34 is a schematic structural diagram of hardware of the UE described in FIG. 24. The UE may include a memory 3401, a transceiver 3402, a processor 3403, and a bus 3404. Communication connection is performed between the memory 3401, the transceiver 3402, and the processor 3403 by using the bus 3404.

The memory 3401 may be a read-only memory (Read Only Memory, ROM), a static storage device, a dynamic storage device, or a random access memory (Random Access Memory, RAM). The memory 3401 may store an operating system and another application program. When the technical solution provided in this embodiment of the present invention is implemented by using software or firmware, program code used to implement the technical solution provided in this embodiment of the present invention is stored in the memory 3401, and is executed by the processor 3403.

The transceiver 3402 is configured to perform communication between the apparatus and another device or a communication network (for example, but not limited to, the Ethernet, a radio access network (Radio Access Network, RAN), and a wireless local area network (Wireless Local Area Network, WLAN)).

The processor 3403 may use a general-purpose central processing unit (Central Processing Unit, CPU), a microprocessor, an application-specific integrated circuit (Application Specific Integrated Circuit, ASIC), or one or more integrated circuits to execute the related program, to implement the technical solution provided in this embodiment of the present invention.

It should be noted that although only the memory 3401, the transceiver 3402, the processor 3403, and the bus 3404 are shown in the hardware in FIG. 34, in a specific implementation process, a person skilled in the art should understand that the terminal further includes another device required to implement normal operation. Meanwhile, according to a specific requirement, a person skilled in the art should understand that, a hardware device for implementing another function may be further included.

Specifically, when the UE shown in FIG. 34 is configured to implement the apparatus shown in the embodiment in FIG. 24, the transceiver 3402 in the apparatus is configured to receive, in a downlink subframe in a preconfigured downlink subframe set, downlink data that is sent by an access network device by using a downlink shared channel, and a downlink assignment index DAI index indicator and a DAI total quantity indicator that are sent by the access network device by using a downlink control channel.

A value of the DAI index indicator and a value of the DAI total quantity indicator are both the same as those in the descriptions in the foregoing method embodiment, and details are no longer described herein.

The processor 3403 is coupled to the memory 3401 and a receiver, is configured to control execution of a program instruction, and is specifically configured to: determine an uplink subframe used to send feedback information corresponding to the downlink shared channel, where the preconfigured downlink subframe set is a set that is associated with the uplink subframe and that consists of all downlink subframes of all carriers preconfigured for the UE; determine a codebook of the feedback information according to the DAI index indicator and the DAI total quantity indicator, where the codebook corresponds to all or some downlink subframes in a real-time scheduling downlink subframe subset, the real-time scheduling downlink subframe subset is a set that consists of downlink subframes actually scheduled by the access network device, and the real-time scheduling downlink subframe subset belongs to the preconfigured downlink subframe set; and perform channel coding on the feedback information according to the codebook.

The transceiver 3402 is further configured to send, in the uplink subframe, the feedback information on which channel coding has been performed to the access network device.

In another embodiment of the present invention, the processor 3403 is further configured to detect a special downlink control channel, where the special downlink control channel is used to instruct the UE to terminate reception of downlink data on a second downlink shared channel.

In another embodiment of the present invention, the processor 3403 is further configured to: determine a physical resource according to resource indicator information sent by the access network device; and map the encoded feedback information to the physical resource.

The transceiver 3402 is further configured to send the mapped feedback information to the access network device by using the physical resource in the uplink subframe.

In another embodiment of the present invention, the processor 3403 is further configured to determine the codebook of the feedback information according to the DAI index indicator and a DAI total quantity indicator, received by the UE in a downlink subframe in the preconfigured downlink subframe set, of each downlink subframe.

In another embodiment of the present invention, the processor 3403 is further configured to determine the codebook of the feedback information according to the DAI index indicator and a DAI total quantity indicator, received by the UE in a downlink subframe in the preconfigured downlink subframe set, of the last downlink subframe.

In another embodiment of the present invention, the processor 3403 is further configured to: obtain a correspondence between at least two downlink subframes received in the preconfigured downlink subframe set and at least two candidate parameters of the physical resource, where the candidate parameter is a sequence of a demodulation reference signal DMRS part and/or a sequence of an information part of the physical resource; and determine a first parameter corresponding to the last downlink subframe received in the preconfigured downlink subframe set, where the first parameter is one of the at least two candidate parameters.

The transceiver 3402 is further configured to send, on the physical resource, the mapped feedback information according to the first parameter.

In another embodiment of the present invention, the transceiver 3402 is further configured to send display signaling and the mapped feedback information to the access network device by using the physical resource in the uplink subframe, where the display signaling is used to indicate, to the access network device, the last downlink subframe that is detected by the UE in the preconfigured downlink subframe set.

In another embodiment of the present invention, the processor 3403 is further configured to add a cyclic redundancy check CRC bit to the codebook of the feedback information.

Figure 35:
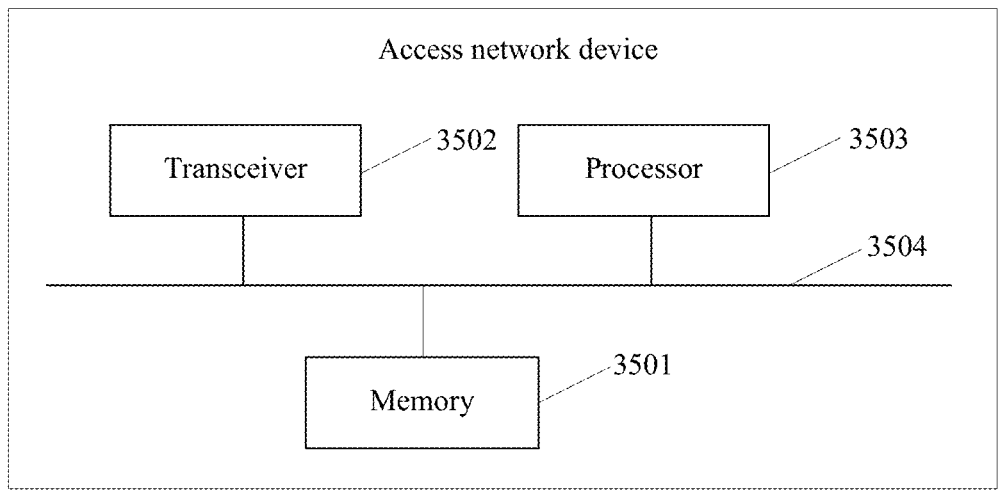
FIG. 35 is a schematic diagram of a logical structure of an access network device in a method for receiving feedback information according to an embodiment of the present invention.

To improve uplink resource utilization, an embodiment of the present invention further provides an apparatus for transmitting feedback information. As shown in FIG. 35, FIG. 35 is a schematic structural diagram of hardware of the access network device shown in FIG. 29. The access network device may include a memory 3501, a transceiver 3502, a processor 3503, and a bus 3505. Communication connection is performed between the memory 3501, the transceiver 3502, and the processor 3503 by using the bus 3505.

The transceiver 3502 is configured to perform communication between the apparatus and another device or a communication network.

The processor 3503 may use a general-purpose central processing unit (Central Processing Unit, CPU), a microprocessor, an application-specific integrated circuit (Application Specific Integrated Circuit, ASIC), or one or more integrated circuits to execute a related program, so as to implement the technical solution provided in this embodiment of the present invention.

The bus 3505 may include a path that transfers information between various parts (for example, the memory 3501, the transceiver 3502, and the processor 3503) of the apparatus.

It should be noted that, although only the memory 3501, the transceiver 3502, the processor 3503, and the bus 3505 are shown in the hardware shown in FIG. 35, in a specific implementation process, a person skilled in the art should understand that the terminal further includes another device required to implement normal operation. Meanwhile, according to a specific requirement, a person skilled in the art should understand that, a hardware device for implementing another function may be further included.

Specifically, when the access network device shown in FIG. 35 is configured to implement the apparatus in the embodiment shown in FIG. 29, the transceiver 3502 of the apparatus is configured to: send downlink data to user equipment UE by using a downlink shared channel, and send a downlink assignment index DAI index indicator and a DAI total quantity indicator to the UE by using a downlink control channel scheduled in a downlink subframe in the real-time scheduling downlink subframe subset, so that the UE determines a codebook of feedback information according to the DAI index indicator and the DAI total quantity indicator, where the real-time scheduling downlink subframe subset is a set that consists of downlink subframes actually scheduled by the access network device, the codebook of the feedback information corresponds to all or some downlink subframes in the real-time scheduling downlink subframe subset, and the codebook of the feedback information is a basis for the UE to perform channel coding on the feedback information; and receive, in an uplink subframe, the feedback information that is sent by the UE and on which channel coding has been performed.

A value of the DAI index indicator and a value of the DAI total quantity indicator are both the same as those in the descriptions in the foregoing method embodiment, and details are no longer described herein.

In another embodiment of the present invention, the processor 3503 is coupled to the memory 3501 and the transceiver 3502, is configured to control execution of a program instruction, and is specifically configured to schedule a special downlink control channel, where the special downlink control channel is used to enable the access network device to terminate sending of the downlink data by using the second downlink shared channel.

In another embodiment of the present invention, the transceiver 3502 is further configured to: send resource indicator information to the UE, where the resource indicator information is used to indicate a physical resource used to carry the feedback information; and receive, in the physical resource in the uplink subframe, the feedback information mapped to the physical resource.

In another embodiment of the present invention, the processor 3503 is further configured to: detect a first parameter in the uplink subframe, where the first parameter is a sequence of a demodulation reference signal DMRS part and/or a sequence of an information part of the physical resource; determine, according to the first parameter, the last downlink subframe that is received by the UE in the preconfigured downlink subframe set; and determine, according to the last downlink subframe, that the feedback information corresponds to all or some downlink subframes in the real-time scheduling downlink subframe subset.

In another embodiment of the present invention, the transceiver 3502 is further configured to receive, in the physical resource in the uplink subframe, display signaling and the feedback information mapped to the physical resource, where the display signaling is used to indicate, to the access network device, the last downlink subframe that is detected by the UE in the preconfigured downlink subframe set.

In another embodiment of the present invention, the processor 3503 is further configured to: determine, according to the display signaling, the last downlink subframe that is received by the UE in the real-time scheduling downlink subframe subset; and determine, according to the last downlink subframe, that the codebook of the feedback information corresponds to all or some downlink subframes in the real-time scheduling downlink subframe subset.

In another embodiment of the present invention, the processor 3503 is further configured to: decode the feedback information on which channel coding has been performed; and perform CRC detection on the decoded feedback information, to determine whether the feedback information is decoded correctly.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending feedback information, comprising:

receiving, by user equipment (UE) in a downlink subframe in a preconfigured downlink subframe set, downlink data that is sent by an access network device by using a downlink shared channel, and a downlink assignment index (DAI) index indicator and a DAI total quantity indicator that are sent by the access network device by using a downlink control channel;

determining, by the UE, an uplink subframe for sending feedback information corresponding to the downlink shared channel, wherein the preconfigured downlink subframe set is a set that is associated with the uplink subframe and that consists of all downlink subframes of carriers preconfigured for the UE;

determining, by the UE, a codebook of the feedback information according to the DAI index indicator and the DAI total quantity indicator, wherein the codebook corresponds to all downlink subframes in a real-time scheduling downlink subframe subset, the real-time scheduling downlink subframe subset is a set that consists of downlink subframes actually scheduled by the access network device, and the real-time scheduling downlink subframe subset is a subset of the preconfigured downlink subframe set;

performing, by the UE, channel coding on the feedback information according to the codebook; and sending, by the UE in the uplink subframe, the channel coded feedback information to the access network device;

wherein the value of a DAI index indicator corresponding to each downlink subframe in the real-time scheduling downlink subframe subset is: a count value obtained by performing an accumulative count on the subframes in the real-time scheduling downlink subframe subset in a preset order; and in the real-time scheduling downlink subframe subset, the value of a DAI total quantity indicator of each downlink subframe in a first order combination corresponding to a current subframe sequence number is: a sum of a current quantity and a historical quantity, wherein the current quantity is a total quantity of downlink shared channels scheduled in the downlink subframes in the first order combination corresponding to the current subframe sequence number, and the historical quantity is a total quantity of downlink shared channels scheduled in each downlink subframe in the first order combinations corresponding to subframe sequence numbers of all downlink subframes before a subframe moment of the current subframe sequence number in the real-time scheduling downlink subframe subset.

2. The method for sending feedback information according to claim 1, wherein the preset order is an order obtained by:
arranging downlink subframes having a same sequence number in the real-time scheduling downlink subframe subset in a first preset order to obtain a first order combination corresponding to each subframe sequence number; and
arranging the first order combination corresponding to each subframe sequence number in a second preset order, wherein the first preset order is an ascending order of carrier sequence numbers or a descending order of carrier sequence numbers, and the second preset order is a front-to-back order of subframe moments or a back-to-front order of subframe moments.

3. A method for receiving feedback information, comprising:
sending, by an access network device, downlink data to user equipment (UE) by using a downlink shared channel;
sending a downlink assignment index (DAI) index indicator and a DAI total quantity indicator to the UE by using a downlink control channel scheduled in a downlink subframe in a real-time scheduling downlink subframe subset, wherein the DAI index indicator and the DAI total quantity indicator indicate a codebook of feedback information, the real-time scheduling downlink subframe subset is a set that consists of downlink subframes actually scheduled by the access network device, the codebook of the feedback information corresponds to al downlink subframes in the real-time scheduling downlink subframe subset; and
receiving, by the access network device in an uplink subframe, the feedback information that is sent by the UE, wherein the feedback information is channel coded based on the codebook;

wherein the value of a DAI index indicator corresponding to each downlink subframe in the real-time scheduling downlink subframe subset is: a count value obtained by performing an accumulative count on the subframes in the real-time scheduling downlink subframe subset in a preset order; and in the real-time scheduling downlink subframe subset, the value of a DAI total quantity indicator of each downlink subframe in a first order combination corresponding to a current subframe sequence number is: a sum of a current quantity and a historical quantity, wherein the current quantity is a total quantity of downlink shared channels scheduled in the downlink subframes in the first order combination corresponding to the current subframe sequence number, and the historical quantity is a total quantity of downlink shared channels scheduled in each downlink subframe in the first order combinations corresponding to subframe sequence numbers of all downlink subframes before a subframe moment of the current subframe sequence number in the real-time scheduling downlink subframe subset.

4. The method for receiving feedback information according to claim 3, wherein the preset order is an order obtained by:
arranging downlink subframes having a same sequence number in the real-time scheduling downlink subframe subset in a first preset order to obtain a first order combination corresponding to each subframe sequence number; and
arranging the first order combination corresponding to each subframe sequence number in a second preset order, wherein the first preset order is an ascending order of carrier sequence numbers or a descending order of carrier sequence numbers, and the second preset order is a front-to-back order of subframe moments or a back-to-front order of subframe moments.

5. An apparatus, comprises:
a transceiver, configured to receive, in a downlink subframe in a preconfigured downlink subframe set, downlink data that is sent by an access network device by using a downlink shared channel, and a downlink assignment index (DAI) index indicator and a DAI total quantity indicator that are sent by the access network device by using a downlink control channel;
a processor communicatively coupled with the transceiver, wherein the processor is configured to:
determine an uplink subframe for sending feedback information corresponding to the downlink shared channel, wherein the preconfigured downlink subframe set is a set that is associated with the uplink subframe and that consists of all downlink subframes of carriers preconfigured for User Equipment (UE);
determine a codebook of the feedback information according to the DAI index indicator and the DAI total quantity indicator, wherein the codebook corresponds to all downlink subframes in a real-time scheduling downlink subframe subset, the real-time scheduling downlink subframe subset is a set that consists of downlink subframes actually scheduled by the access network device, and the real-time scheduling downlink subframe subset is a subset of the preconfigured downlink subframe set; and
perform channel coding on the feedback information according to the codebook; and
wherein the transceiver is further configured to send, in the uplink subframe, the channel coded feedback information to the access network device;
wherein the value of a DAI index indicator corresponding to each downlink subframe in the real-time scheduling downlink subframe subset is: a count value obtained by performing an accumulative count on the subframes in the real-time scheduling downlink subframe subset in a preset order; and in the real-time scheduling downlink subframe subset, the value of a DAI total quantity indicator of each downlink subframe in a first order combination corresponding to a current subframe sequence number is: a sum of a current quantity and a historical quantity, wherein the current quantity is a total quantity of downlink shared channels scheduled in the downlink subframes in the first order combination corresponding to the current subframe sequence number, and the historical quantity is a total quantity of downlink shared channels scheduled in each downlink subframe in the first order combinations corresponding to subframe sequence numbers of all downlink subframes before a subframe moment of the current subframe sequence number in the real-time scheduling downlink subframe subset.

6. The apparatus according to claim 5, wherein the preset order is an order obtained by:

arranging downlink subframes having a same sequence number in the real-time scheduling downlink subframe subset in a first preset order to obtain a first order combination corresponding to each subframe sequence number; and arranging the first order combination corresponding to each subframe sequence number in a second preset order, wherein the first preset order is an ascending order of carrier sequence numbers or a descending order of carrier sequence numbers, and the second preset order is a front-to-back order of subframe moments or a back-to-front order of subframe moments.

7. An apparatus, comprises:

a processor configured to:

determine a downlink assignment index (DAI) index indicator and a DAI total quantity indicator for a UE, wherein UE the DAI index indicator and the DAI total quantity indicator indicate a codebook of feedback information; and a transceiver communicatively coupled with the processor, wherein the transceiver is configured to:

send downlink data to user equipment (UE) by using a downlink shared channel;

send the downlink assignment index (DAI) index indicator and the DAI total quantity indicator to the UE by using a downlink control channel scheduled in a downlink subframe in a real-time scheduling downlink subframe subset, wherein the real-time scheduling downlink subframe subset is a set that consists of downlink subframes actually scheduled by a access network device, the codebook of the feedback information corresponds to all downlink subframes in the real-time scheduling downlink subframe subset; and receive, in an uplink subframe, the feedback information that is sent by the UE, wherein the feedback information is channel coded based on the codebook;

wherein the value of a DAI index indicator corresponding to each downlink subframe in the real-time scheduling downlink subframe subset is: a count value obtained by performing an accumulative count on the subframes in the real-time scheduling downlink subframe subset in a preset order; and in the real-time scheduling downlink subframe subset, the value of a DAI total quantity indicator of each downlink subframe in a first order combination corresponding to a current subframe sequence number is: a sum of a current quantity and a historical quantity, wherein the current quantity is a total quantity of downlink shared channels scheduled in the downlink subframes in the first order combination corresponding to the current subframe sequence number, and the historical quantity is a total quantity of downlink shared channels scheduled in each downlink subframe in the first order combinations corresponding to subframe sequence numbers of all downlink subframes before a subframe moment of the current subframe sequence number in the real-time scheduling downlink subframe subset.

8. The apparatus according to claim 7, wherein the preset order is an order obtained by:

arranging downlink subframes having a same sequence number in the real-time scheduling downlink subframe subset in a first preset order to obtain a first order combination corresponding to each subframe sequence number; and arranging the first order combination corresponding to each subframe sequence number in a second preset order, wherein the first preset order is an ascending order of carrier sequence numbers or a descending order of carrier sequence numbers, and the second preset order is a front-to-back order of subframe moments or a back-to-front order of subframe moments.

* * * * *